US012453688B2

(12) United States Patent
Press et al.

(10) Patent No.: US 12,453,688 B2
(45) Date of Patent: *Oct. 28, 2025

(54) COSMETIC COMPOSITIONS COMPRISING DRAGLINE SPIDER SILK

(71) Applicant: SEEVIX MATERIAL SCIENCES LTD., Jerusalem (IL)

(72) Inventors: Konstantin Press, Rishon Le-Zion (IL); Gregory Idelson, Maale Adumim (IL); Ariel Givant, Jerusalem (IL); Alon Meir, Jerusalem (IL); Noa Hadar, Givat Brenner (IL)

(73) Assignee: SEEVIX MATERIAL SCIENCES LTD., Jerusalem (IL)

( * ) Notice: Subject to any disclaimer, the term of this patent is extended or adjusted under 35 U.S.C. 154(b) by 443 days.

This patent is subject to a terminal disclaimer.

(21) Appl. No.: 17/972,186

(22) Filed: Oct. 24, 2022

(65) Prior Publication Data

US 2023/0293419 A1    Sep. 21, 2023

Related U.S. Application Data

(63) Continuation of application No. PCT/IL2021/050476, filed on Apr. 25, 2021.

(60) Provisional application No. 63/144,089, filed on Feb. 1, 2021, provisional application No. 63/134,343, filed on Jan. 6, 2021, provisional application No. 63/079,621, filed on Sep. 17, 2020, provisional application No. 63/048,135, filed on Jul. 5, 2020, provisional application No. 63/014,444, filed on Apr. 23, 2020.

(51) Int. Cl.
| | | |
|---|---|---|
| *C07K 14/435* | (2006.01) | |
| *A61K 8/25* | (2006.01) | |
| *A61K 8/28* | (2006.01) | |
| *A61K 8/29* | (2006.01) | |
| *A61K 8/64* | (2006.01) | |
| *A61K 8/81* | (2006.01) | |
| *A61K 47/42* | (2017.01) | |
| *A61Q 17/04* | (2006.01) | |
| *C07K 17/14* | (2006.01) | |

(52) U.S. Cl.
CPC ............. *A61K 8/64* (2013.01); *A61K 8/25* (2013.01); *A61K 8/28* (2013.01); *A61K 8/29* (2013.01); *A61K 8/8129* (2013.01); *A61Q 17/04* (2013.01); *C07K 14/43518* (2013.01)

(58) Field of Classification Search
CPC . A61Q 19/00; A61K 8/64; A61K 8/29; A61K 47/42; A61K 2800/412; C07K 14/43518
See application file for complete search history.

(56) References Cited

U.S. PATENT DOCUMENTS

| | | | |
|---|---|---|---|
| 3,755,560 A | 8/1973 | Dickert et al. | |
| 4,421,769 A | 12/1983 | Dixon et al. | |
| 5,011,681 A | 4/1991 | Ciotti et al. | |
| 7,057,023 B2 | 6/2006 | Islam et al. | |
| 7,521,228 B2 | 4/2009 | Lewis et al. | |
| 7,674,882 B2 | 3/2010 | Kaplan et al. | |
| 7,754,851 B2 | 7/2010 | Scheibel et al. | |
| 8,030,024 B2 | 10/2011 | Scheibel et al. | |
| 8,222,479 B2 | 7/2012 | Zhao et al. | |
| 8,461,301 B2 | 6/2013 | Gat et al. | |
| 8,642,734 B2 | 2/2014 | Johansson et al. | |
| 9,233,067 B2 | 1/2016 | Lammel et al. | |
| 9,475,852 B2 | 10/2016 | Bogush et al. | |
| 9,993,525 B2 | 6/2018 | Nazhat et al. | |
| 10,253,213 B2 | 4/2019 | Leimer et al. | |
| 10,981,959 B2 | 4/2021 | Ittah et al. | |
| 11,142,553 B2 | 10/2021 | Taniike et al. | |
| 11,376,329 B2 | 7/2022 | Kluge et al. | |
| 2005/0054830 A1 | 3/2005 | Islam et al. | |
| 2007/0113355 A1* | 5/2007 | Knight ............. | C07K 14/43586 8/127 |
| 2007/0196429 A1 | 8/2007 | Scheibel et al. | |
| 2009/0232963 A1 | 9/2009 | Kaplan et al. | |
| 2010/0143487 A1 | 6/2010 | Masters | |
| 2010/0317587 A1 | 12/2010 | Chung et al. | |
| 2011/0020409 A1 | 1/2011 | Altman et al. | |
| 2011/0189292 A1 | 8/2011 | Lebreton et al. | |
| 2012/0022005 A1 | 1/2012 | Gat et al. | |
| 2013/0109762 A1 | 5/2013 | Lammel et al. | |
| 2014/0315828 A1* | 10/2014 | Pavlovic ................ | A61L 27/52 530/353 |
| 2015/0056256 A1 | 2/2015 | Essaidi | |
| 2015/0087046 A1 | 3/2015 | Hedhammar | |

(Continued)

FOREIGN PATENT DOCUMENTS

| | | |
|---|---|---|
| CA | 3014537 A1 | 8/2017 |
| CN | 101133080 A | 2/2008 |

(Continued)

OTHER PUBLICATIONS

Hardy et al. Composite materials based on silk proteins. Apr. 22, 2010. Progress in Polymer Science. vol. 35. pp. 1093-1115. (Year: 2010).*
Radu et al. Grafting versus Crosslinking of Silk Fibroin-g-PNIPAM via Tyrosine-NiPAM Bridges. Nov. 13, 2019. (Year: 2019).*
Huemmerich et al, Primary Structure Elements of Spider Dragline Silks and Their Contribution to Protein Solubility, Biochemistry 2004, 43, 42, 13604-13612, 2004. https://doi.org/10.1021/bi048983q.
Lammel et al, Controlling silk fibroin particle features for drug delivery, Biomaterials, vol. 31, Issue 16, 2010, pp. 4583-4591, ISSN 0142-9612. DOI: 10.1016/j.biomaterials.2010.02.024.

(Continued)

*Primary Examiner* — Tracy Liu
(74) *Attorney, Agent, or Firm* — The Roy Gross Law Firm, LLC; Roy D. Gross

(57) ABSTRACT

Cosmeceutical compositions comprising a major ampullate spidroin protein (MaSp)-based fiber are disclosed. Articles comprising the compositions are further disclosed.

6 Claims, 33 Drawing Sheets

Specification includes a Sequence Listing.

(56) References Cited

U.S. PATENT DOCUMENTS

| | | | |
|---|---|---|---|
| 2015/0165092 A1 | 6/2015 | Kaplan et al. | |
| 2015/0284565 A1 | 10/2015 | Scheibel et al. | |
| 2015/0376247 A1* | 12/2015 | Osawa | C08L 89/00 |
| | | | 106/501.1 |
| 2016/0046679 A1 | 2/2016 | Kluge et al. | |
| 2016/0298265 A1 | 10/2016 | Lewis et al. | |
| 2019/0002510 A1 | 1/2019 | Ittah et al. | |
| 2019/0040110 A1 | 2/2019 | Ittah et al. | |
| 2020/0270316 A1 | 8/2020 | Romer et al. | |
| 2021/0101946 A1 | 4/2021 | Lo et al. | |
| 2021/0138071 A1 | 5/2021 | Santos et al. | |
| 2021/0155812 A1* | 5/2021 | Omenetto | A61L 27/227 |
| 2021/0401685 A1* | 12/2021 | Martínez Rovira | A61Q 19/08 |
| 2022/0127768 A1 | 4/2022 | Yoshioka et al. | |
| 2022/0177530 A1 | 6/2022 | Altman | |
| 2022/0235099 A1 | 7/2022 | Kamikubo et al. | |
| 2023/0042322 A1 | 2/2023 | Ittah et al. | |

FOREIGN PATENT DOCUMENTS

| | | | | |
|---|---|---|---|---|
| CN | 101395178 | A | 3/2009 | |
| CN | 102475909 | A | 5/2012 | |
| CN | 101253193 | B | 11/2012 | |
| CN | 101018806 | B | 5/2014 | |
| CN | 107595661 | A | 1/2018 | |
| CN | 109477252 | A | 3/2019 | |
| CN | 111214385 | A | 6/2020 | |
| EP | 1609801 | A1 | 12/2005 | |
| EP | 1773875 | B1 | 9/2014 | |
| EP | 1558444 | B1 | 9/2016 | |
| JP | 2002369878 | A | 12/2002 | |
| JP | 2008507260 | A | 3/2008 | |
| JP | 2009505668 | A | 2/2009 | |
| JP | 2011504374 | A | 2/2011 | |
| JP | 2012531889 | A | 12/2012 | |
| JP | 2013512265 | A | 4/2013 | |
| JP | 2015532690 | A | 11/2015 | |
| JP | 2018531040 | A | 10/2018 | |
| JP | 2019510541 | A | 4/2019 | |
| JP | WO2019082935 | A1 | 1/2021 | |
| JP | 2021054819 | A | 4/2021 | |
| JP | 2021155361 | A | 10/2021 | |
| TW | I-290930 | B * | 12/2007 | |
| WO | 2004090205 | A2 | 10/2004 | |
| WO | 2006002827 | A1 | 1/2006 | |
| WO | 2006002843 | A1 | 1/2006 | |
| WO | 2006002853 | A1 | 1/2006 | |
| WO | 2006008163 | A2 | 1/2006 | |
| WO | 2007025719 | A1 | 3/2007 | |
| WO | 2007078239 | A3 | 12/2007 | |
| WO | 2011063990 | A2 | 6/2011 | |
| WO | 2011069643 | A2 | 6/2011 | |
| WO | 2011113592 | A1 | 9/2011 | |
| WO | 2012175153 | A2 | 12/2012 | |
| WO | 2013071107 | A1 | 5/2013 | |
| WO | 2014037453 | A1 | 3/2014 | |
| WO | 2016038387 | A1 | 2/2016 | |
| WO | 2016057851 | A1 | 4/2016 | |
| WO | 2017025964 | A1 | 2/2017 | |
| WO | WO-2017138002 | A1 * | 8/2017 | C07K 14/43518 |
| WO | 2019067737 | A1 | 4/2019 | |
| WO | 2020014595 | A1 | 1/2020 | |
| WO | 2020183465 | A1 | 9/2020 | |
| WO | 2021001840 | A1 | 1/2021 | |
| WO | 2021011431 | A1 | 1/2021 | |
| WO | 2021121647 | A1 | 6/2021 | |
| WO | 2021214780 | A1 | 10/2021 | |
| WO | 2022020212 | A2 | 1/2022 | |

OTHER PUBLICATIONS

Stothard, P. Protein Molecular Weight. Protein molecular weight. [www.bioinformatics.org/sms/prot_mw.html], 2022.

Scheibel, Spider silks: recombinant synthesis, assembly, spinning, and engineering of synthetic proteins. Microb Cell Fact 3, 14 (2004). https://doi.org/10.1186/1475-2859-3-14.

Ayoub et al , Blueprint for a High-Performance Biomaterial: Full-Length Spider Dragline Silk Genes, PLoS One, Jun. 2007, Issue 6, https://doi.org/10.1371/journal.pone.0000514.

Yang, Yan-Xiang & Qian, Zhi-Gang & Zhong, Jian-Jiang & Xia, Xiao-Xia. (2016). Hyper-production of large proteins of spider dragline silk MaSp2 by *Escherichia coli* via synthetic biology approach. Process Biochemistry. 51. 10.1016/j.procbio.2016.01.006.

Ittah S, Barak N, Gat U. A proposed model for dragline spider silk self-assembly: insights from the effect of the repetitive domain size on fiber properties. Biopolymers. May 2010;93(5):458-68. doi: 10.1002/bip.21362. PMID: 20014164.

Ittah S, Michaeli A, Goldblum A, Gat U. A model for the structure of the C-terminal domain of dragline spider silk and the role of its conserved cysteine. Biomacromolecules. Sep. 2007;8(9):2768-73. doi: 10.1021/bm7004559. Epub Aug. 14, 2007. PMID: 17696395.

Ittah S, Cohen S, Garty S, Cohn D, Gat U. An essential role for the C-terminal domain of a dragline spider silk protein in directing fiber formation. Biomacromolecules. Jun. 2006;7(6):1790-5. doi: 10.1021/bm060120k. PMID: 16768399.

Huemmerich D, Scheibel T, Vollrath F, Cohen S, Gat U, Ittah S. Novel assembly properties of recombinant spider dragline silk proteins. Curr Biol. Nov. 23, 2004;14(22):2070-4. doi: 10.1016/j.cub.2004.11.005. PMID: 15556872.

Gatesy J, Hayashi C, Motriuk D, Woods J, Lewis R. Extreme diversity, conservation, and convergence of spider silk fibroin sequences. Science. Mar. 30, 2001;291(5513):2603-5. doi: 10.1126/science.1057561. PMID: 11283372.

An B, Tang-Schomer M, Huang W, He J, Jones J, Lewis RV, Kaplan DL. Physical and biological regulation of neuron regenerative growth and network formation on recombinant dragline silks. Biomaterials. Apr. 2015;48:137-146. doi: 10.1016/j.biomaterials.2015.01.044. Epub Feb. 11, 2015. PMID: 25701039; PMCID: PMC4353650.

https://www.bioinformatics.org/sms/prot_mw.html, The Sequence Manipulation Suite: Protein Molecular Weight, accessed on Dec. 2, 2019.

Rising A, Widhe M, Johansson J, Hedhammar M. Spider silk proteins: recent advances in recombinant production, structure-function relationships and biomedical applications. Cell Mol Life Sci. Jan. 2011;68(2):169-84. doi: 10.1007/s00018-010-0462-z. Epub Jul. 29, 2010. PMID: 20668909.

Lewicka M, Hermanson O, Rising AU. Recombinant spider silk matrices for neural stem cell cultures. Biomaterials. Nov. 2012;33(31):7712-7. doi: 10.1016/j.biomaterials.2012.07.021. Epub Aug. 3, 2012. PMID: 22863380.

Knight E, Przyborski S. Advances in 3D cell culture technologies enabling tissue-like structures to be created in vitro. J Anat. Dec. 2015;227(6):746-56. doi: 10.1111/joa.12257. Epub Nov. 20, 2014. PMID: 25411113; PMCID: PMC4694114.

B. Liebmann, D. Hummerich, T. Scheibel, M. Fehr, Formulation of poorly water-soluble substances using self-assembling spider silk protein, Colloids and Surfaces A: Physicochemical and Engineering Aspects, vol. 331, Issues 1-2, 2008, pp. 126-132, ISSN 0927-7757, https://doi.org/10.1016/j.colsurfa.2008.04.005.

Murphy AR, Kaplan DL. Biomedical applications of chemically-modified silk fibroin. J Mater Chem. Jun. 23, 2009;19(36):6443-6450. doi: 10.1039/b905802h. PMID: 20161439; PMCID: PMC2790051.

Hardy JG, Bertin A, Torres-Rendon JG, Leal-Egaña A, Humenik M, Bauer F, Walther A, Cölfen H, Schlaad H, Scheibel TR. Facile Photochemical Modification of Silk Protein-Based Biomaterials. Macromol Biosci. Nov. 2018;18(11):e1800216. doi: 10.1002/mabi.201800216. Epub Sep. 19, 2018. PMID: 30230222.

Chen, J., Venkatesan, H. and Hu, J. (2018), Chemically Modified Silk Proteins. Adv. Eng. Mater., 20: 1700961. https://doi.org/10.1002/adem.201700961.

(56) References Cited

OTHER PUBLICATIONS

Doblhofer E, Heidebrecht A, Scheibel T. To spin or not to spin: spider silk fibers and more. Appl Microbiol Biotechnol. Nov. 2015;99(22):9361-80. doi: 10.1007/s00253-015-6948-8. Epub Sep. 11, 2015. PMID: 26362683.
Sequence—Reference Material 1—Cited in a Third Party Observation in Japan, Oct. 2021.
Sequence—Reference Material 2—Cited in a Third Party Observation in Japan, Oct. 2021.
Sequence—Reference Material 3—Cited in a Third Party Observation in Japan, Oct. 2021.
PCT International Search Report for International Application No. PCT/IL2021/050475, mailed Aug. 19, 2021, 4pp.
PCT Written Opinion for International Application No. PCT/IL2021/050475, mailed Aug. 19, 2021, 6pp.
PCT International Preliminary Report on Patentability for International Application No. PCT/IL2021/050475, issued Oct. 25, 2022, 7pp.
Galarneau A, Mehlhorn D, Guenneau F, Coasne B, Villemot F, Minoux D, Aquino C, Dath JP. Specific Surface Area Determination for Microporous/Mesoporous Materials: The Case of Mesoporous FAU-Y Zeolites. Langmuir. Nov. 27, 2018;34(47):14134-14142. doi: 10.1021/acs.langmuir.8b02144. Epub Nov. 14, 2018. PMID: 30379547.
Wong Po Foo C, Patwardhan SV, Belton DJ, Kitchel B, Anastasiades D, Huang J, Naik RR, Perry CC, Kaplan DL. Novel nanocomposites from spider silk-silica fusion (chimeric) proteins. Proc Natl Acad Sci U S A. Jun. 20, 2006;103(25):9428-33. doi: 10.1073/pnas.0601096103. Epub Jun. 12, 2006. PMID: 16769898; PMCID: PMC1476692.
Heidebrecht A, Eisoldt L, Diehl J, Schmidt A, Geffers M, Lang G, Scheibel T. Biomimetic fibers made of recombinant spidroins with the same toughness as natural spider silk. Adv Mater. Apr. 1, 2015;27(13):2189-94. doi: 10.1002/adma.201404234. Epub Feb. 16, 2015. PMID: 25689835.
Amazon.com, "Amazon Brand—Solimo Sport Sunscreen Lotion, Formulated without Octinoxate & Oxybenzone, 8 Fluid Ounce". Available online: [https://a.co/d/b8wTPxi]; 2019, 12pp.
Arcidiacono, S. et al. Aqueous Processing and Fiber Spinning of Recombinant Spider Silks. Macromolecules 2002, 35, 4, 1262-1266. https://doi.org/10.1021/ma011471o.
Carravetta, V. et al. An atomistic explanation of the ethanol-water azeotrope. Phys. Chem. Chem. Phys., 2022,24,26037-26045. DOI: https://doi.org/10.1039/D2CP03145K.
Hardy, J. G. & Scheibel, T. R. Composite materials based on silk proteins. Progress in Polymer Science. vol. 35, Issue 9, Sep. 2010, pp. 1093-1115. https://doi.org/10.1016/j.progpolymsci.2010.04.005.
Horsley, L. H. Table of Azeotropes and Nonazeotropes. Anal. Chem. 1947, 19, 8, 508-600. https://doi.org/10.1021/ac60008a002.
Huang X, Liu G, Wang X. New secrets of spider silk: exceptionally high thermal conductivity and its abnormal change under stretching. Adv Mater. Mar. 15, 2012;24(11):1482-6. doi: 10.1002/adma.201104668. Epub Mar. 5, 2012. PMID: 22388863.
Koperska, M.A. et al. Fibroin degradation—Critical evaluation of conventional analytical methods. Polymer Degradation and Stability. vol. 120, Oct. 2015, pp. 357-367. https://doi.org/10.1016/j.polymdegradstab.2015.07.006.
Muhammad, R., Nah, Y. C., & Oh, H. (2023). Spider silk-derived nanoporous activated carbon fiber for $CO_2$ capture and $CH_4$ and $H_2$ storage. Journal of CO2 Utilization, 69, 102401. https://doi.org/10.1016/j.jcou.2023.102401.
Y. Park, Y. Lim and J. Lee, "n-Propanol aqueous solution shows nonlinearity in liquid level depending on water proportion," 2015 15th International Conference on Control, Automation and Systems (ICCAS), Busan, Korea (South), 2015, pp. 258-260, doi: 10.1109/ICCAS.2015.7364917.
Roberts AD, Lee JM, Magaz A, Smith MW, Dennis M, Scrutton NS, Blaker JJ. Hierarchically Porous Silk/Activated-Carbon Composite Fibres for Adsorption and Repellence of Volatile Organic Compounds. Molecules. Mar. 7, 2020;25(5):1207. doi: 10.3390/molecules25051207. PMID: 32156015; PMCID: PMC7179458.
Teagarden DL, Baker DS. Practical aspects of lyophilization using non-aqueous co-solvent systems. Eur J Pharm Sci. Mar. 2002;15(2):115-33. doi: 10.1016/s0928-0987(01)00221-4. PMID: 11849908.
Andersen, F.A., 2005. Amended final report of the safety assessment of t-butyl alcohol as used in cosmetics. International journal of toxicology, 24, pp. 1-20.
Lu, Z., Su, Z., Song, S., Zhao, Y., Ma, S. and Zhang, M., 2018. Toward high-performance fibrillated cellulose-based air filter via constructing spider-web-like structure with the aid of TBA during freeze-drying process. Cellulose, 25(1), pp. 619-629.

* cited by examiner

```
SEQUENCE LISTING

Sequence total quantity: 8
SEQ ID NO: 1           moltype = AA  length = 555
FEATURE                Location/Qualifiers
REGION                 1..555
                       note = Synthetic
source                 1..555
                       mol_type = protein
                       organism = synthetic construct
SEQUENCE: 1
AAAAAAASGS GGYGPENQGP SGPVAYGPGG PVSSAAAAAA AGSGPGGYGP ENQGPSGPGG   60
YGPGGSGSSA AAAAAAASGP GGYGPGSQGP SGPGGSGGYG PGSQGPSGPG ASSAAAAAAA  120
ASGPGGYGPG SQGPSGPGAY GPGGPGSSAA ASGPGGYGPG SQGPSGPGGS GGYGPGSQGP  180
SGPGGPGASA AAAAAAASG PGGYGPGSQG PSGPGAYGPG GPGSSAAASG PGGYGPGSQG  240
PSGPGAYGPG GPGSSAAAAA AAGSGPGGYG PGNQGPSGPG GYGPGGPGSS AAAAAAASGP  300
GGYGPGSQGP SGPGVYGPGG PGSSAAAAAA AGSGPGGYGP GNQGPSGPGG YGPGGSGSSA  360
AAAAAAASGP GGYGPGSQGP SGPGGSGGYG PGSQGPSGPG ASSAAAAAAA ASGPGGYGPG  420
SQGPSGPGAY GPGGPGSSAA ASGPGGYGPG SQGPSGPGAY GPGGPGSSAA AAAAASGPGG  480
YGPGSQGPSG PGGSRGYGPG SQGPGGPGAS AAAAAAAAAS GPGGYGPGSQ GPSGPGYQGP  540
SGPGAYGPSP SASAS                                                  555

SEQ ID NO: 2           moltype = AA  length = 27
FEATURE                Location/Qualifiers
REGION                 1..27
                       note = Synthetic
source                 1..27
                       mol_type = protein
                       organism = synthetic construct
SEQUENCE: 2
SGPGGYGPGS QGPSGPGGYG PGGPGSS                                      27

SEQ ID NO: 3           moltype = AA  length = 35
FEATURE                Location/Qualifiers
REGION                 1..35
                       note = Synthetic
source                 1..35
                       mol_type = protein
```

```
                    organism = synthetic construct
SEQUENCE: 3
AAAAAAAASG PGGYGPGSQG PSGPGGYGPG GPGSS                                35

SEQ ID NO: 4            moltype = AA  length = 40
FEATURE                 Location/Qualifiers
REGION                  1..40
                        note = Synthetic
source                  1..40
                        mol_type = protein
                        organism = synthetic construct
SEQUENCE: 4
MSYYHHHHHH DYDIPTTENL YFQGAMDPEF KGLRRRAQLV                           40

SEQ ID NO: 5            moltype = AA  length = 50
FEATURE                 Location/Qualifiers
REGION                  1..50
                        note = Synthetic
source                  1..50
                        mol_type = protein
                        organism = synthetic construct
SEQUENCE: 5
MSYYHHHHHH DYDIPTTENL YFQGAMDPEF KGLRRRAQLV RPLSNLDNAP                 50

SEQ ID NO: 6            moltype = AA  length = 54
FEATURE                 Location/Qualifiers
REGION                  1..54
                        note = Synthetic
source                  1..54
                        mol_type = protein
                        organism = synthetic construct
SEQUENCE: 6
MSYYHHHHHH DYDIPTTENL YFQGAMDPEF KGLRRRAQLV DPPGCRNSAR AGSS            54

SEQ ID NO: 7            moltype = AA  length = 97
FEATURE                 Location/Qualifiers
REGION                  1..97
                        note = Synthetic
source                  1..97
                        mol_type = protein
                        organism = synthetic construct
SEQUENCE: 7
VAASRLSSPA ASSRVSSAVS SLVSSGPTNG AAVSGALNSL VSQISASNPG LSGCDALVQA      60
LLELVSALVA ILSSASIGQV NVSSVSQSTQ MISQALS                              97

SEQ ID NO: 8            moltype = AA  length = 114
FEATURE                 Location/Qualifiers
REGION                  1..114
                        note = Synthetic
source                  1..114
                        mol_type = protein
                        organism = synthetic construct
SEQUENCE: 8
GPSGPGAYGP SPSASASVAA SRLSSPAASS RVSSAVSSLV SSGPTNGAAV SGALNSLVSQ      60
ISASNPGLSG CDALVQALLE LVSALVAILS SASIGQVNVS SVSQSTQMIS QALS           114
```

COSMETIC COMPOSITIONS COMPRISING DRAGLINE SPIDER SILK

CROSS REFERENCE TO RELATED APPLICATIONS

This application is a Bypass Continuation of PCT Patent Application No. PCT/IL2021/050476 having International filing date of Apr. 25, 2021, which claims the benefit of priority under 35 USC § 119(e) of U.S. Provisional Patent Application Nos. 63/014,444, filed Apr. 23, 2020, entitled "ANTI-MICROBIAL COMPOSITIONS", 63/048,135, filed Jul. 5, 2020, entitled "COSMETIC COMPOSITIONS COMPRISING DRAGLINE SPIDER SILK", 63/144,089, filed Feb. 1, 2021 entitled "COSMETIC COMPOSITIONS COMPRISING DRAGLINE SPIDER SILK", 63/079,621 filed Sep. 17, 2020, entitled "MODIFIED SPIDER SILK FIBER AND USE THEREOF", 63/134,343 filed Jan. 6, 2021 entitled "EXTRUDATE COMPOSITIONS COMPRISING DRAGLINE SPIDER SILK" the contents of which are all incorporated herein by reference in their entirety.

REFERENCE TO AN ELECTRONIC SEQUENCE LISTING

The contents of the electronic sequence listing (06939-P0010B-SVX-P-011-US SQL.xml; Size: 11,615 bytes; and Date of Creation: Oct. 24, 2022) is herein incorporated by reference in its entirety.

FIELD OF THE INVENTION

The present invention, in some embodiments thereof, is directed to compositions comprising proteins derived from a MaSp (major ampullate spidroin) protein, and the preparation of same and use as anti-microbial materials.

BACKGROUND OF THE INVENTION

Dragline spider silk is known in the art as the silk used by the orb-web weaving spiders to construct the frame and radii of their webs as well a lifeline when they fall or escape danger. To be able to perform these tasks, the dragline fiber displays a remarkably high toughness due to combination of high elasticity and strength, which places it as the toughest fiber, whether natural or man-made. For instance, dragline is six times as strong as high-tensile steel in its diameter and three times tougher than Kevlar that is one of the strongest synthetic fibers ever made.

Dragline silk consists of two main polypeptides, mostly referred to as major ampullate spidroin (MaSp) 1 and 2, and also to ADF-3 and ADF-4 in Araneus diadematus. These proteins have apparent molecular masses in the range of 200-720 kDa, depending on sample age and conditions of analysis. The known dragline silk spidroins are composed of highly iterated blocks of alternating alanine-rich segments, forming crystalline β-sheets in the fiber, and glycine-rich segments which are more flexible and mainly lack ordered structure. The C-terminal region is non-repetitive, highly conserved between species, and adopts a-helical conformation. The N-terminal region of dragline silk proteins was also found to be highly conserved between different spidroins, and also between different spider species.

SUMMARY OF THE INVENTION

In one aspect, there is a cosmeceutical composition comprising a cosmeceutical effective amount of a composite, wherein the composite comprises a derivatized porous major ampullate spidroin protein (MaSp)-based fiber bound to a metal oxide particle, wherein: said derivatized porous MaSp-based fiber is characterized by a BET surface area of at least 10 m2/g; the derivatized porous MaSp-based fiber comprises a functional moiety covalently bound to a tyrosine of the porous MaSp-based fiber; the functional moiety comprises a polymer and a metal oxide chelating group; said metal oxide particle is bound to the derivatized porous MaSp-based fiber via said metal oxide chelating group.

In one embodiment, the cosmeceutical composition further comprises a cosmetically acceptable carrier.

In one embodiment, the cosmeceutical composition is characterized as a sunscreen composition.

In one embodiment, the cosmeceutical effective amount is between 10% w/w and 50% w/w of the composite within the composition.

In one embodiment, the cosmeceutical composition is characterized as a hair coloring composition.

In one embodiment, the metal oxide particle is selected from titania, zirconia, silica or any combination thereof.

In one embodiment, the metal oxide particle is characterized by a particle size between 10 and 5,000 nm.

In one embodiment, a w/w ratio of the derivatized porous MaSp-based fiber to said metal oxide particle within said composition is between 0.01 and 100.

In one embodiment, the polymer comprises polyglutaraldehyde (PGA), and wherein a w/w ratio of said polymer to said porous MaSp-based fiber is between 0.001 and 5.

In one embodiment, the functional moiety is covalently bound to a side chain of said tyrosine via a diazo bond, a silyl group, or any combination thereof.

In another aspect, there is a cosmeceutical composition, comprising a cosmeceutically effective amount of the derivatized porous MaSp-based fiber bound to a dye or to a pigment, wherein the derivatized porous MaSp-based fiber is characterized by a BET surface area of at least 10 m2/g; the derivatized porous MaSp-based fiber comprises a functional moiety covalently bound to a tyrosine of the porous MaSp-based fiber; the functional moiety comprises amino, carboxy, nitro, sulfonate, carbonyl, ester, anhydride, carbonate ester, carbamate, cyano, hydroxy, a polymer, or any combination thereof.

In one embodiment, the polymer is a cationic polymer selected from the group consisting of polyethyleneimine (PEI), polylysine, polyaniline, or any combination thereof.

In one embodiment, the effective amount comprises a w/w concentration of the derivatized porous MaSp-based fiber within the cosmeceutical composition being between 20% and 99.9% w/w.

In one embodiment, the functional moiety is covalently bound to a side chain of said tyrosine via a diazo bond, a silyl group, or any combination thereof.

In one embodiment, the cosmeceutical composition is characterized by a pH value of between 3 and 7.

In one embodiment, the cosmeceutical composition further comprising a cosmetically acceptable carrier, and wherein said composition is a cosmeceutical composition, a hair coloring composition or both.

In one embodiment, the cosmeceutical composition is characterized by a positive zeta potential and is suitable for binding to a hair of a subject in need thereof.

In another aspect, there is a cosmeceutical composition comprising a porous major ampullate spidroin protein (MaSp)-based fiber bound to a cosmetic active ingredient, wherein said porous MaSp-based fiber is characterized by a BET surface area of at least 10 m2/g.

In one embodiment, a w/w concentration of said cosmetic active ingredient within said composition is between 1 and 80%, and wherein a w/w ratio between said cosmetic active ingredient and said porous MaSp based fiber is from 10:1 to 1:10.

In one embodiment, a release rate of said cosmetic active ingredient from said composition is reduced by at least 10%, compared to a control.

In one embodiment, the cosmeceutical composition further comprising between 1 and 95% w/w of any one of a solvent, a film-forming agent, and a thickener.

In one embodiment, the composition is characterized by a viscosity from 50 to 3000 cP at 25° C.

In one embodiment, the cosmeceutical comprising a cosmetically acceptable carrier, and wherein said composition is formulated for application to a skin or to a hair of a subject in need thereof.

In one embodiment, the MaSp-based fiber is characterized by a degradation temperature (Td) between 280° C. and 350° C. as determined by differential scanning calorimetry (DSC).

In one embodiment, the MaSp-based fiber is characterized by a glass transition temperature (Tg) between 200° C. and 250° C., as determined by DSC.

In one embodiment, the MaSp-based fiber comprises a repetitive region comprising an amino acid sequence as set forth in Formula 10: (X1)ZX2 GPGGYGPX3X4X5GPX6GX7GGX8GPGGPGX9X10; wherein X1 is, independently, at each instance A or G, Z is an integer between 5 to 30, X2 is S or G; X3 is G or E; X4 is G, S or N; X5 is Q or Y; X6 is G or S; X7 is P or R; X8 is Y or Q; X9 is G or S; and X10 is S or G.

In another aspect, there is a method for reducing or preventing a UV-related damage to a subject, comprising applying an effective amount of the cosmeceutical composition of the invention on a skin of said subject; thereby reducing or preventing said UV-related damage to said subject.

In another aspect, there is a method for coloring a hair, comprising contacting at least a portion of the hair with an effective amount of the cosmeceutical composition of the invention under suitable conditions, thereby coloring the hair.

In one embodiment, suitable condition comprise a pH of less than 9.

In another aspect, there is a method for supplementing a subject with a cosmetic active ingredient, comprising administering to said subject the cosmeceutical composition of the invention; thereby supplementing said subject with said cosmetic active ingredient.

In one embodiment, the method is for reducing or preventing damage to (i) a skin of said subject, (ii) a hair of said subject or both (i) and (ii), and wherein said damage is related to exposure to a condition selected from UV radiation, thermal radiation, an environmental pollutant, an oxidizing agent, a reducing agent, an irritant, or any combination thereof.

In one embodiment, the method is for skin rejuvenation, skin moisturizing, skin conditioning, wrinkles reduction, skin relief, hair coloring, and hair shaping, or any combination thereof, and wherein said method is enhancing or prolonging stability of said cosmetic active ingredient, wherein enhancing or prolonging is by at least 10% compared to a pristine cosmetic active ingredient.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 19A and 19B represent images of porous fibers. FIGS. 19C and 19D represent images of non-porous particles.

FIG. 21A represents the release of Lactic acid (LA). FIG. 21B represents the release of Glycolic acid (GA). FIG. 21C represents the release of Hyaluronic acid (HA).

DETAILED DESCRIPTION OF THE INVENTION

Figure 1A:
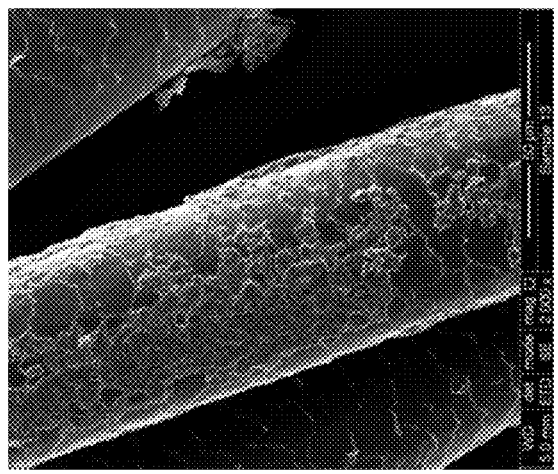
FIGS. 1A-B are SEM images of a healthy (FIG. 1A) versus damaged (FIG. 1B) human hair treated with an exemplary hair composition of the invention comprising 1-10% w/w of an aminated MaSp-based (SVX) fiber. Aminated MaSp-based (SVX) fiber preferably attach to the damaged area of the human hair, resulting in an almost complete coverage (FIG. 1B).

The present invention, in some embodiments thereof, is related to hair coloring compositions comprising chemically modified MaSp-based fibers bound to a dye or pigment. As demonstrated herein below, the inventors successfully implemented various derivatized porous MaSp-based fibers in hair coloring compositions. Some of these hair coloring compositions resulted in a uniform and stable hair coating, upon contacting the hair coloring composition with hair (e.g., human hair). Exemplary hair coloring composition which have been successfully implemented for hair coating include but are not limited to aminated MaSp-based fibers (e.g. MaSp-based fibers chemically modified by 4-(2-aminoethyl) aniline, 3-amonipropyltriethoxysilane and/or by polyethylene imine, PEI).

The present invention, in some embodiments thereof, is related to sunscreen compositions, comprising metal oxide (e.g., titania) nanoparticles complexed by chemically modified MaSp-based fibers. Exemplary sunscreen compositions, include but are not limited to titania nanoparticles bound to MaSp-based fibers chemically modified by salicylic acid covalently bound to a polymer, such as polyglutaraldehyde (PGA). A dispersion of titanium dioxide nanoparticles complexed by salicylate bound to PGA-derivatized MaSp-based fibers, exhibited a superior sunscreen effect, compared to pristine MaSp-based fibers.

The present invention, in some embodiments thereof, is related to cosmeceutical compositions, comprising non-derivatized MaSp-based fibers bound to a cosmetic active ingredient such as: hyaluronic acid (HA), retinyl acetate RA), etc. Exemplary cosmeceutical compositions of the invention exhibited a sustained release of HA and RA therefrom, compared to a fast release from silk and cellulose fibers. Furthermore, exemplary cosmeceutical compositions of the invention enable a prolonged residence time of various cosmetic ingredients on the skin surface and improve bio stability of cosmetic ingredients.

According to one aspect, the present invention provides a derivatized porous major ampullate spidroin protein (MaSp)-based fiber, wherein the derivatized porous MaSp-based fiber comprises a functional moiety covalently bound to an amino acid of the porous MaSp-based fiber. In some embodiments, the porous MaSp-based fiber is characterized by a BET surface area of at least 10 m2/g. In some embodiments, the porous MaSp-based fiber is as described hereinbelow.

In some embodiments, the derivatized porous MaSp-based fiber comprises a functional moiety covalently bound to a side chain of an amino acid of the porous MaSp-based fiber, and the porous MaSp-based fiber is characterized by a BET surface area of at least 10 m2/g.

In some embodiments, the derivatized porous MaSp-based fiber comprises a functional moiety covalently bound to a side chain of an amino acid of the porous MaSp-based fiber, and the porous MaSp-based fiber is characterized by at least one of: (i) a BET surface area of at least 10 m2/g; (ii) a degradation temperature of between 280 and 350° C.; (iii) glass transition temperature of between 200 and 250° C., and (iv) an amino acid sequence comprising a repetitive region, wherein each repetitive region comprises, independently, an amino acid sequence as set forth in Formula 10 below, or a combination of (i), (ii), (iii) and (iv).

In some embodiments, the derivatized porous MaSp-based fiber comprises a functional moiety covalently bound to a side chain of an amino acid of the porous MaSp-based fiber, wherein the porous MaSp-based fiber comprises a repetitive region, wherein each repetitive region comprises, independently, an amino acid sequence as set forth in Formula 10 below and the derivatized porous MaSp-based fiber is characterized by at least one of: (i) a BET surface area of at least 10 m2/g; (ii) a degradation temperature of between 280 and 350° C.; (iii) glass transition temperature of between 200 and 250° C., or a combination of (i), (ii) and (iii). In some embodiments, the term "porous MaSp-based fiber" and the term "MaSp-based fiber" are used herein interchangeably.

In some embodiments, the functional moiety is covalently bound to an amino acid of the porous MaSp-based fiber. In some embodiments, the functional moiety is covalently bound to an amino acid, wherein the amino acid is selected from tyrosine, serine, cysteine and lysine, threonine, histidine, arginine, aspartic acid and glutamic acid or any combination thereof. In some embodiments, the functional moiety is covalently bound to a side chain of an amino acid, wherein the amino acid is selected from tyrosine, serine, cysteine and lysine, threonine, histidine, arginine, aspartic acid and glutamic acid or any combination thereof. In some embodiments, the functional moiety is covalently bound to a side chain of any of tyrosine, serine, cysteine and lysine or any combination thereof. In some embodiments, the functional moiety is covalently bound to a side chain (e.g. phenol ring) of tyrosine.

In some embodiments, the derivatized porous MaSp-based fiber of the invention comprises a functional moiety covalently bound to a side chain of at least one tyrosine via a diazo bond, a silyl group or both. In some embodiments, the derivatized porous MaSp-based fiber of the invention comprises a diazotized tyrosine, a silylated tyrosine or both. In some embodiments, between 1 and 99%, between 10 and 99%, between 10 and 90%, between 10 and 80%, between 10 and 70%, between 10 and 60%, including any range or value therebetween of the tyrosine residues (or side chains) within the derivatized porous MaSp-based fiber of the invention, are diazotized and/or silylated.

In some embodiments, the derivatized porous MaSp-based fiber of the invention comprises a functional moiety covalently bound to a side chain of at least one tyrosine via a diazo bond, also referred to herein as "diazotized tyrosine". In some embodiments, the diazotized tyrosine comprises the functional moiety covalently bound to the phenyl ring of the tyrosine via a diazo bond:

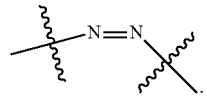 [SMILES: */N=N\*]

In some embodiments, the functional moiety is covalently bound to the porous MaSp-based fiber via any one of diazo, silyl, carbonyl, amide, ester, maleimide, or any combination thereof.

In some embodiments, the functional moiety is covalently bound to at least one tyrosine residue of the porous MaSp-based fiber. In some embodiments, the functional moiety is covalently bound to at least one tyrosine residue via a bond selected from diazo, silyl, ester, carbamate, carbonyl, (O- or S)-thiocarbamate, or any combination thereof. In some embodiments, the functional moiety is covalently bound to at least one tyrosine residue via a diazo bond. In some embodiments, the functional moiety is covalently bound to at least one tyrosine residue via a linker comprising any reactive group capable of forming (i) a diazo bond with the phenol ring of tyrosine (e.g. alkyl diazonium or aryldiazonium group), and/or (ii) a Si-C with the phenol ring of tyrosine (e.g. alkoxysilyl, or halosilyl).

In some embodiments, the composition is substantially devoid of functional moieties and/or polymers adsorbed to the MaSp-based fiber.

In some embodiments, the derivatized porous MaSp-based fiber of the invention comprising the functional moiety covalently bound to the MaSp-based fiber via a diazo bond is represented by Formula 1:

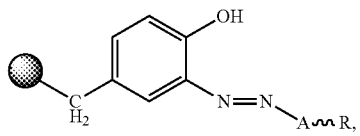

wherein

represents the MaSp-based fiber, A is selected from aryl (e.g. phenyl, or a bicyclic/fused aromatic ring, such as naphthalene), heteroaryl (e.g. C5-6 aromatic ring comprising 1, 2, 3, or 4 heteroatoms selected from O, N and S), and alkyl (e.g. C1-C10 linear or branched alkyl) substituted or non-substituted; wherein R is or comprises the functional moiety of the invention, and wherein a wavy bond represents a linker (or spacer), as described herein.

In some embodiments, the derivatized porous MaSp-based fiber of the invention comprising the functional moiety covalently bound to the MaSp-based fiber via a silyl group is represented by Formula 2:

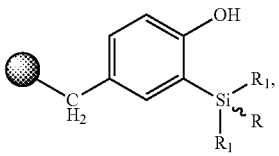

wherein a wavy bond and R are as described herein, and each $R_1$ independently comprises any one of hydrogen, an optionally substituted alkyl (e.g. C1-C10 linear or branched alkyl), hydroxy or alkoxy (e.g. C1-C10 alkoxy).

In some embodiments, the functional moiety of the invention comprises any one of a hydroxy group, a mercapto group, an amino group, a carboxylate group, nitro, sulfonate, carbonyl, anhydride, carbonate ester, carbamate, a nitrile group, and a polymer or any combination thereof. In some embodiments, the functional moiety comprises a hydroxy group, a mercapto group, an amino group, a carboxylate group, and a polymer or any combination thereof. In some embodiments, the functional moiety is covalently bound an amino acid of the porous MaSp-based fiber via linear or a branched linker. In some embodiments, each derivatized amino acid of the porous MaSp-based fiber comprises one or more functional moieties covalently bound thereto.

In some embodiments, the functional moiety of the invention is attached to a tyrosine residue via a diazoaryl. In some embodiments, the functional moiety of the invention is bound to the diazoaryl via a linker. In some embodiments, the term "linker" and the term "spacer" are used herein interchangeably.

In some embodiments, the functional moiety (or R) comprises an electrophilic and/or a nucleophilic group. Numerous electrophiles and nucleophiles are well-known in the art.

Non-limiting examples of electrophilic reactive groups include but are not limited to aldehyde, ketone, carboxy, ester, imine, oxime, acyl halide, an active ester (e.g. N-hydroxy succinimide), a chloroformate, an anhydride, an epoxide, an isocyanate, nitro, sulfonate, trialkylammonium, and halo including any alkyl and/or aryl derivative (such as carboxyalkyl, carboxyaryl, alkyl carbonyl, haloalkyl, haloaryl etc.) or any combination thereof.

Non-limiting examples of nucleophilic reactive groups include but are not limited to hydroxy, a mercapto, an amino, phosphine or any combination thereof.

In some embodiments, the functional moiety comprises a plurality of electrophilic and/or a nucleophilic groups. In some embodiments, the functional moiety comprises a polyamine (e.g. a linear polyamine such as spermine or spermidine; or a branched polyamine such as tris(2-aminoethyl)amine). In some embodiments, the functional moiety comprises a polyol (e.g. pentaerythritol, xylitol). In some embodiments, the functional moiety comprises di-, or tri-carboxylic acid (e.g. citric acid, malic acid, succinic acid).

In some embodiments, the functional moiety (or R) comprises any one of alkyl (e.g. C1-10 alkyl linear or branched, such as methyl, ethyl, propyl, butyl, isobutyl, pentyl, isopentyl, hexyl, heptyl, octyl, nonyl, decyl), C1-10 alkoxy (e.g. methoxy, ethoxy, propoxy, ocyloxy), a vinyl group (e.g. vinyloxy), C1-10 alkylamino (e.g. methyl amino, ethyl amino, propyl amino, butyl amino, pentyl amino, hexylamino), protected amine (e.g. by an amine protecting group selected from Fmoc, Boc, Benzyl, CBz, etc.), hydroxy (optionally protected by a hydroxy protecting group, such as tert-butyl, or trimethylsilyl), mercapto (optionally protected by a thiol protecting group), silyl, siloxane (e.g. trialkoxysilane), nitro, sulfonate, cyano, halo, trialkylammonium, aldehyde, ketone, carboxy, ester, imine, oxime, acyl halide, an active ester (e.g. N-hydroxy succinimide), a chloroformate, an anhydride, an epoxide, an isocyanate or any combination thereof.

In some embodiments, the linker (or spacer) comprises an alkyl optionally substituted by any one of carboxy, halo, hydroxy, amino, cycloalkyl, alkyl, nitro, sulfonate, cyano or any combination or derivative thereof. In some embodiments, the linker comprises optionally substituted alkoxy, thioalkyl, aminoalkyl, glycol or any combination thereof. In some embodiments, alkyl including any derivative thereof is as described hereinbelow. In some embodiments, the linker comprises a di-substituted alkyl (e.g. aminohexanoic acid), or a di-substituted heteroalkyl group. In some embodiments, the linker comprises C1-C10 alkyl, a C1-C10 aminoalkyl, a C1-C10 alkoxy, a C1-C10 mercaptoalkyl, a carbonyl derivative (e.g., —C(O)NH—, —C(O)O—, —C(O)—, —C(O)S—, —C(NH)NH—, —C(NH)O—, —C(NH)S—), and optionally comprises one or more heteroatoms (e.g. S, N, O) within the backbone of the linker, or any combination thereof.

In some embodiments, the linker (or spacer) comprises natural and/or unnatural amino acid, alkyl, an amide bond, an ester bond, and a thioester bond, a urea bond, including any derivative or a combination thereof). In some embodiments, the linker of the invention comprises a click reaction product (e.g., a covalent linkage such as a cyclization reaction product, and/or a succinimide-thioether moiety formed via a click reaction). Additional linkers or spacers are well-known in the art.

Click reactions are well-known in the art and comprise inter alia Michael addition of maleimide and thiol (resulting in the formation of a succinimide-thioether); azide alkyne cycloaddition; Diels-Alder reaction (e.g., direct and/or inverse electron demand Diels Alder); dibenzyl cyclooctyne 1,3-nitrone (or azide) cycloaddition; alkene tetrazole photoclick reaction etc.

The term "heteroalkyl," as used herein, refers to an alkyl group, as defined herein, in which one or more of the constituent carbon atoms have been replaced by nitrogen, oxygen, or sulfur. In some embodiments, the heteroalkyl group can be further substituted with 1, 2, 3, or 4 substituent groups as described herein for alkyl groups. Examples of heteroalkyl groups are polyglycols or polyalkoxylates, such as polyethyleneglycol.

In some embodiments, the derivatized porous MaSp-based fiber of the invention is as represented hereinbelow:

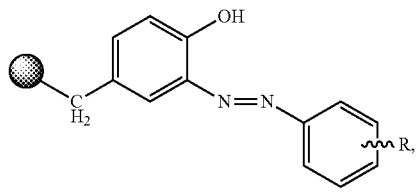

wherein a wavy bond represents a linker, wherein the linker is as described herein. In some embodiments, R is as described herein. In some embodiments, the linker is or comprises an optionally substituted C1-C6, or C1-C10 alkyl. In some embodiments, R comprises amino, halo, nitro, carbonyl, ester, or carboxy.

In some embodiments, the derivatized porous MaSp-based fiber of the invention is as represented hereinbelow:

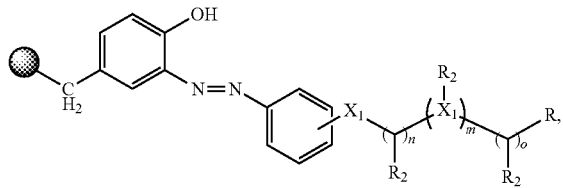

wherein R is as described herein; n, m and o is are integers each independently being of between 0 and 20, wherein each R2 independently is or comprises H, or a substituent selected from halogen, —NO$_2$, —CN, —OH, —CONH$_2$, —CONR$_2$, —CNNR$_2$, —CSNR$_2$, —CONH—OH, —CONH—NH$_2$, —NHCOR, —NHCSR, —NHCNR, —NC(=O)OR, —NC(=O)NR, —NC(=S)OR, —NC(=S)NR, —SO$_2$R, —SOR, —SR, —SO$_2$OR, —SO$_2$N(R)$_2$, —NHNR$_2$, —NNR, $C_1$-$C_6$ haloalkyl, optionally substituted $C_1$-$C_6$ alkyl, —NH$_2$, —NH($C_1$-$C_6$ alkyl), —N($C_1$-$C_6$ alkyl)$_2$, $C_1$-$C_6$ alkoxy, $C_1$-$C_6$ haloalkoxy, hydroxy($C_1$-$C_6$ alkyl), hydroxy ($C_1$-$C_6$ alkoxy), alkoxy($C_1$-$C_6$ alkyl), alkoxy($C_1$-$C_6$ alkoxy), $C_1$-$C_6$ alkyl-NR$_2$, $C_1$-$C_6$ alkyl-SR, —CONH($C_1$-$C_6$ alkyl), —CON($C_1$-$C_6$ alkyl)$_2$, —CO$_2$H, —CO$_2$R, —OCOR, —OCOR, —OC(=O)OR, —OC(=O)NR, —OC(=S)OR, —OC(=S)NR, or a combination thereof; and wherein X1 is a heteroatom (e.g. O, S, N, NH) or is absent. In some embodiments, n, m and o are integers each independently being 0 or between 0 and 20, between 1 and 20, between 1 and 3, between 3 and 5, between 5 and 7, between 7 and 10, between 10 and 15, between 15 and 20, including any range between. In some embodiments, R is or comprises amino, carboxy,

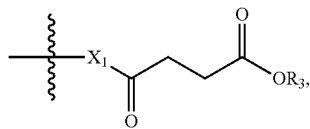

or a combination thereof; wherein X1 is as described herein, and R3 is or comprises H, optionally substituted $C_1$-$C_{10}$ alkyl, optionally substituted aryl, optionally substituted heteroaryl, or any combination thereof. In some embodiments, X1 is or comprises N, or NH. In some embodiments, R2 is or comprises H, or an optionally substituted $C_1$-$C_6$ alkyl.

In some embodiments, the derivatized porous MaSp-based fiber of the invention is as represented hereinbelow:

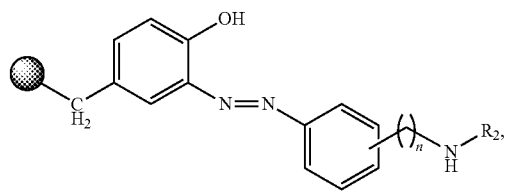

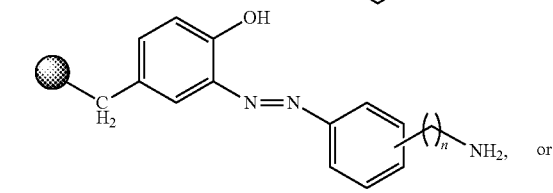

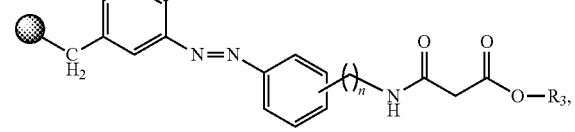

wherein n, R2 and R3 are as described herein.

In some embodiments, the derivatized porous MaSp-based fiber of the invention is as represented hereinbelow:

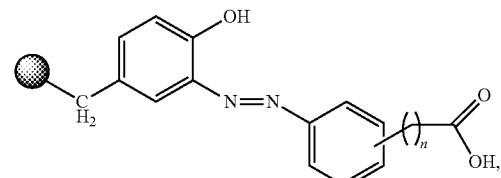

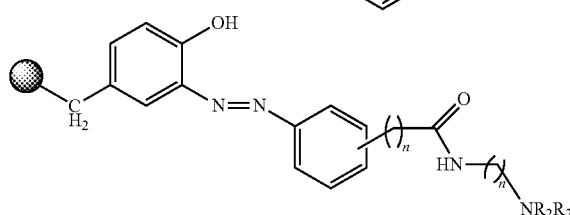

wherein each $R_2$ and n are as described hereinabove.

In some embodiments, the derivatized porous MaSp-based fiber of the invention is as represented hereinbelow:

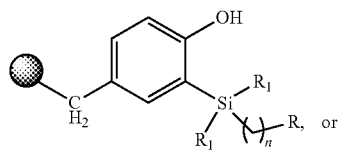

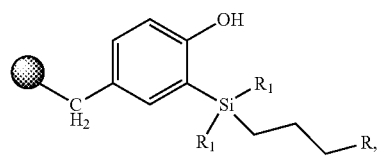

wherein R and n are as described herein, and wherein each $R_1$ independently comprises any one of hydrogen, an alkyl (e.g. $C_1$-$C_6$ alkyl or $C_1$-$C_{10}$ alkyl), hydroxy or $C_1$-$C_{10}$ alkoxy (e.g. methoxy, ethoxy, propoxy, pentoxy, etc.).

In some embodiments, the derivatized porous MaSp-based fiber of the invention is as represented hereinbelow:

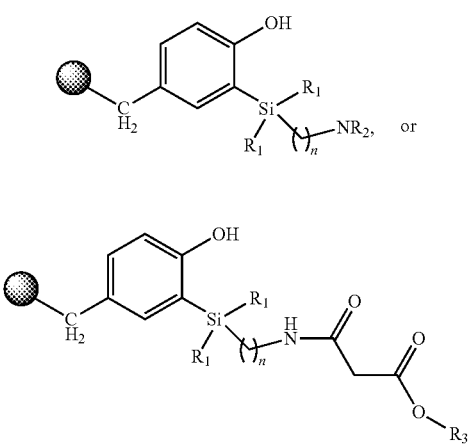

wherein R1, n, R3 and R2 are as described herein.

In some embodiments, the functional moiety is covalently bound to any one of histidine, arginine, aspartate, glutamate or any combination thereof. One skilled in the art will appreciate, that the functional moiety can be covalently bound to a carboxylic side chain residue via an amino-, hydroxy- or mercapto-substituted linker.

In some embodiments, the derivatized porous MaSp-based fiber is as represented hereinbelow:

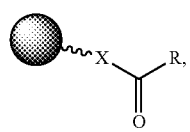

wherein X represents a sidechain heteroatom selected from O, S and N; and R is as described hereinabove. In some embodiments, X represents a heteroatom of any one of the amino acids of the MaSp-based fiber.

In some embodiments, the derivatized porous MaSp-based fiber is as represented hereinbelow:

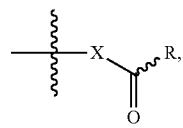

wherein X represents a sidechain heteroatom of any one of the amino acids of the MaSp-based fiber;

represents an attachment point to the MaSp-based fiber, wavy bond represents a linker, and R is as described herein. In some embodiments, R comprises amino, halo, nitro, carbonyl, ester, or carboxy.

In some embodiments, the functional moiety is covalently bound to a hydroxy group of at least one tyrosine residue of the MaSp-based fiber.

In some embodiments, the derivatized porous MaSp-based fiber is as represented hereinbelow:

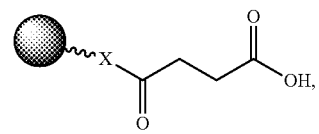

wherein X is as described herein.

In some embodiments, the functional moiety is covalently bound to at least one amino acid of the MaSp-based fiber via a silyl bond. In some embodiments, the amino acid is a nucleophilic amino acid (e.g. serine, cysteine, threonine and lysine). In some embodiments, the derivatized porous MaSp-based fiber is as represented hereinbelow:

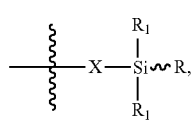

wherein X represents a sidechain heteroatom (e.g. S, NH, or O) of any one of the amino acids of the MaSp-based fiber;

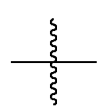

represents an attachment point to the MaSp-based fiber, wavy bond represents a linker, and R is as described herein, and each $R_1$ independently comprises any one of hydrogen, an alkyl, hydroxy or alkoxy.

In some embodiments, the derivatized porous MaSp-based fiber is as represented hereinbelow:

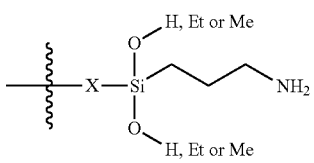

wherein X represents a sidechain heteroatom of any one of the amino acids of the MaSp-based fiber;

and represents an attachment point to the MaSp-based fiber. In some embodiments, X represents a sidechain heteroatom of cysteine and/or of tyrosine.

In some embodiments, the derivatized porous MaSp-based fiber is as represented hereinbelow:

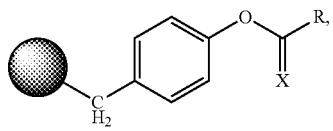

wherein X represents a heteroatom selected from O, S and N; and R is as described hereinabove.

In some embodiments, the functional moiety is covalently bound to the MaSp-based fiber via at least one nucleophilic amino acid selected from serine, cysteine, threonine and lysine. In some embodiments, the functional moiety is covalently bound to a nucleophilic amino acid of the MaSp-based fiber via a bond selected from silyl, ester, carbamate, carbonyl, (O- or S)-thiocarbamate or a combination thereof.

In some embodiments, the functional moiety provides reactivity to the MaSp-based fiber. One skilled in the art will appreciate, that a functional moiety such as amine can react with an electrophile (e.g. haloalkyl or ester). Thus, by introducing a functional moiety to the MaSp-based fiber, the MaSp-based fiber can be subsequently reacted with any reagent (e.g. a small molecule or a polymer) having reactivity to the functional moiety. In some embodiments, the functional moiety induces or increases reactivity of the MaSp-based fiber. In some embodiments, the functional moiety induces or increases reactivity of the MaSp-based fiber towards any reagent capable of reacting therewith.

In some embodiments, the derivatized porous MaSp-based fiber of the invention comprises the functional moiety (e.g. amino or carboxy) covalently bound to a polymer. In some embodiments, the polymer is covalently attached to the functional moiety via a functional group having reactivity to the functional moiety (e.g. the functional moiety is or comprises carboxy, and the functional group of the polymer is amino, mercapto or hydroxy; or the functional moiety is or comprises amino, and the functional group of the polymer is halo, carbonyl, or carboxy). A skilled artisan will appreciate, that there are additional well-known reactive groups that can be utilized for the covalent attachment of the polymer to the functional moiety of the invention (e.g. via a click reaction). In some embodiments, the polymer is covalently attached to the functional moiety via any of —C(O) NH—, —C(O)O—, —C(O)—, —C(O)S—, —C(NH) NH—, —C(NH)O—, —C(NH)S—, —NC(O)—, —N(C)—, or a combination thereof.

In some embodiments, the functional moiety of the derivatized porous MaSp-based fiber is covalently bound to a polymer. In some embodiments, the polymer is positively and/or negatively charged. In some embodiments, the polymer is neutral.

In some embodiments, the polymer is selected from a cationic polymer (e.g. PEI, polylysine, polyarginine, chitosan) including any derivative and/or copolymer thereof), an anionic polymer (e.g. PAA) and/or a non-ionic polymer (e.g. PVA, PVC, silane, polyamide), etc. Other cationic polymers, anionic polymers, and/or non-ionic polymers are well-known in the art.

In some embodiments, the polymer is selected from the group consisting of polyglutaraldehyde (PGA), polyvinylaclohol (PVA), polyacrylic acid (PAA), polyacrylate, polyethyleneimine (PEI), polyacrylamide (PAAm), polylysine, polyarginine, polyaniline, polyurethane, polyamide (e.g. nylon), polyvinyl chloride, polysilane, chitosan, N-halamine polymer, N-halamide polymer, polysilane-co-polyolefin, silane crosslinked polyolefin, and polyvinyl pyrrolidone (PVP) including any combination or copolymer thereof. In some embodiments, the polymer is a linear polymer. In some embodiments, the polymer is a branched polymer. In some embodiments, the polymer is a copolymer. In some embodiments, the polymer is a graft-copolymer.

In some embodiments, the polymer is covalently bound to a nucleophilic functional group or to an electrophilic functional group of the derivatized porous MaSp-based fiber. One skilled in the art will appreciate, that an aminated MaSp-based fiber can be reacted with a carboxy group of a polymer (e.g. PAA) or a carbonyl group of a polymer (e.g. PGA), so as to obtain the derivatized MaSp-based fiber covalently bound to a polymer. Furthermore, a carboxylated MaSp-based fiber can be reacted with amino group of a polymer (e.g. PEI) or with hydroxy group of a polymer (e.g. PVA). The inventors successfully synthesized conjugates of the derivatized MaSp-based fiber (e.g. comprising functional moieties bound to the tyrosine of the MaSp-based fiber via a diazo bond or via a silyl group, as described above) with various polymers such as PGA, PAA, PVA, PEI, PAAm or a combination thereof (such as PGA-co-PEI). Furthermore, the inventors successfully synthesized above-mentioned conjugates using a MaSp-based protein having a mutant amino acid sequence (also used herein as "mutant MaSp-based protein").

The inventors successfully synthesized a derivatized MaSp-based fiber modified with PAAm via in-situ polymerization on the aminated MaSp-based fiber represented by Formula 3:

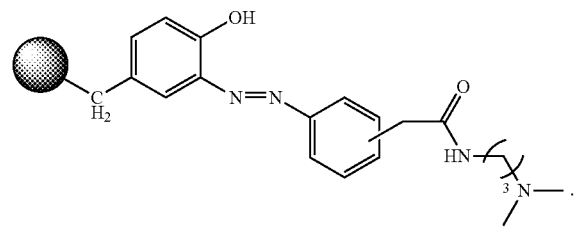

In some embodiments, the derivatized MaSp-based fiber modified with PAAm is as represented below:

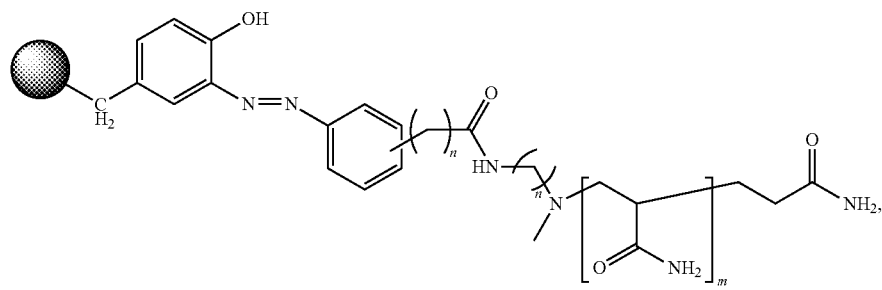

wherein each n is independently between 0 and 10, between 0 and 20, between 1 and 20, between 1 and 3, between 3 and 5, between 5 and 7, between 7 and 10, between 10 and 15, between 15 and 20, including any range between. In some embodiments, m is between 1 and 10000, between 1 and 10, between 10 and 100, between 100 and 1000, between 1000 and 10000, including any range between.

In some embodiments, the w/w ratio between the MaSp-based fiber and the polymer is 0.01:1 to 1:1, 0.02:1 to 1:1, 0.05:1 to 1:1, 0.09:1 to 1:1, 0.1:1 to 1:1, 0.5:1 to 1:1, or 0.9:1 to 1:1, including any range therebetween.

In some embodiments, the w/w ratio between the MaSp-based fiber and the polymer is 100:1 to 1:100, 95:1 to 1:100, 80:1 to 1:100, 60:1 to 1:100, 50:1 to 1:100, 30:1 to 1:100, 20:1 to 1:100, 10:1 to 1:100, 9:1 to 1:100, 5:1 to 1:100, 2:1 to 1:100, 100:1 to 1:80, 95:1 to 1:80, 80:1 to 1:80, 60:1 to 1:80, 50:1 to 1:80, 30:1 to 1:80, 20:1 to 1:80, 10:1 to 1:80, 9:1 to 1:80, 5:1 to 1:80, 2:1 to 1:80, 100:1 to 1:50, 95:1 to 1:50, 80:1 to 1:50, 60:1 to 1:50, 50:1 to 1:50, 30:1 to 1:50, 20:1 to 1:50, 10:1 to 1:50, 9:1 to 1:50, 5:1 to 1:50, 2:1 to 1:50, 100:1 to 1:10, 95:1 to 1:10, 80:1 to 1:10, 60:1 to 1:10, 50:1 to 1:10, 30:1 to 1:10, 20:1 to 1:10, 10:1 to 1:10, 9:1 to 1:10, 5:1 to 1:10, or 2:1 to 1:10, including any range therebetween.

In some embodiments, the functional group of the derivatized MaSp-based fiber is bound to a polymer comprising a plurality of reactive groups. In some embodiments, the reactive groups comprising a nucleophilic group (such as amino, hydroxy, thiol), an electrophilic group (such as carbonyl, carboxy, ester, succinimide ester, halo, nitro, and azide) or both. In some embodiments, a polyaldehyde-based polymer (e.g. poly-glutaraldehyde) bound MaSp-based fiber is represented by Formula 4:

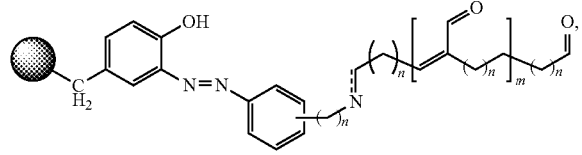

wherein a dashed line represents an optional bond; and m and n are integers. In some embodiments, each n is independently between 0 and 10, between 0 and 20, between 1 and 20, between 1 and 3, between 3 and 5, between 5 and 7, between 7 and 10, between 10 and 15, between 15 and 20, including any range between. In some embodiments, m is between 1 and 10000, between 1 and 10, between 10 and 100, between 100 and 1000, between 1000 and 10000, including any range between.

In some embodiments, the derivatized MaSp-based fiber is bound to a polymer comprising a plurality of chelating agents. In some embodiments, the chelating agent comprises (i) metal chelating group capable of binding a metal or a salt thereof, (ii) a metal oxide chelating group, or both (i) and (ii).

In some embodiments, the metal chelating group is capable of complexing (via a coordinative bond) a metal or a salt thereof.

In some embodiments, the metal or the salt thereof comprises a transition metal. Non-limiting examples of transition metals include but are not limited to gold (Au), copper (Cu), palladium (Pd), zinc (Zn), aluminum (Al), tungsten (W), titanium (Ti), silicon (Si), zirconium (Zr), hafnium (Hf), hafnium (Hf), tin (Sn), gallium (Ga), molybdenum (Mo), nickel (Ni), vanadium (V), platinum (Pt), tantalum (Ta), germanium (Ge) and Niobium (Nb), or any combination thereof.

In some embodiments, the metal chelating group comprises a thiol, an amine, a phenol, a carboxy including any derivatives thereof. In some embodiments, the metal chelating group comprises a crown ether. In some embodiments, the metal chelating group is a cyclic molecule comprising a plurality of carboxy and/or hydroxy groups configured for complexing the metal or the salt thereof. In some embodiments, metal chelating group are well-known in the art comprising DOTA, NOTA, NODA, EDTA, HBED-CC including any salt, a derivative, or a combination thereof. In some embodiments, the metal chelating group comprises iminodiacetate (IDA), a salt or a derivative thereof.

In some embodiments, the polymer comprising a plurality of metal chelating groups is represented hereinbelow:

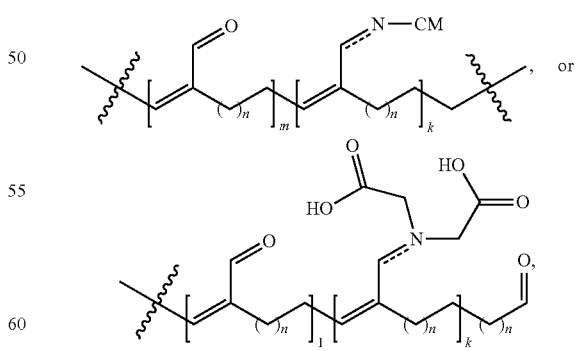

wherein CM represents a chelating agent; wherein k is from 10 to 10000, from 10 to 100, from 100 to 1000, from 100 to 10000, including any range between; m is from 0 to 10, from 0 to 3, from 3 to 5, from 5 to 10, including any range between; and each n represent an integer being independently between 0 and 10, between 0 and 20, between 1 and 20, between 1 and 3, between 3 and 5, between 5 and 7, between 7 and 10, between 10 and 15, between 15 and 20, including any range between.

In another aspect, the derivatized MaSp-based fiber comprises a functional moiety (e.g. a polymer) bound to a metal oxide chelating group, wherein the functional moiety is as described herein. In some embodiments, the metal oxide chelating group has an affinity to a metal oxide or to a particle comprising thereof. In some embodiments, the metal oxide chelating group is capable of complexing (e.g. via a coordinative bond) a metal oxide or a particle comprising thereof. In some embodiments, the metal oxide particle is as described herein.

In some embodiments, the term "complexing" refers to a stable (e.g. chemically stable) complexation of the metal and/or metal oxide, including any particle comprising thereof. In some embodiments, stable complexation refers to the ability of the derivatized MaSp-based fiber bound to the metal (also referred to herein as the "composite" or "stable composite") retains at least 60%, at least 70%, at least 80%, at least 90%, at least 95%, at least 99% of it's initial metal content upon exposure to a solvent (e.g. organic solvent, aqueous solvent, etc.), or storage under ambient conditions for a time period of for at least one month (m), at least 2 m, at least 6 m, at least 12 m, at least 2 years (y), at least 3 y, at least 10 y, including any range therebetween.

In some embodiments, the weight per weight (w/w) ratio of the functional moiety to the porous MaSp-based fiber within the derivatized fiber of the invention is between 0.01 and 30%, between 0.01 and 0.1%, between 0.1 and 0.5%, between 0.5 and 1%, between 1 and 5%, between 5 and 10%, between 10 and 20%, between 20 and 30%, including any range therebetween.

In some embodiments, loading of the functional moiety within derivatized porous MaSp-based fiber is between 0.01 µmol/g and 10 mmol/g, between 0.01 µmol/g and 0.1 µmol/g, between 0.1 µmol/g and 0.5 µmol/g, between 0.5 µmol/g and 1 µmol/g, between 1 µmol/g and 10 µmol/g, between 10 µmol/g and 30 µmol/g, between 30 µmol/g and 50 µmol/g, between 50 µmol/g and 100 µmol/g, between 100 µmol/g and 500 µmol/g, between 0.5 and 1 mmol/g, between 1 and 5 mmol/g, between 5 and 10 mmol/g, including any range therebetween.

In some embodiments, at least 1%, at least 5%, at least 10%, at least 15%, at least 20%, at least 30%, at least 40%, at least 50%, at least 55%, at least 60%, at least 65%, at least 70%, at least 80%, at least 90%, at least 95%, at least 99% including any range therebetween, of the tyrosine residues within the derivatized MaSp-based fiber of the invention are substituted with the functional moiety, wherein the functional moiety is as described herein. In some embodiments, the substitution degree of the tyrosine residues within the derivatized MaSp-based fiber is between 1 and 99%, between 1 and 5%, between 5 and 10%, between 10 and 20%, between 20 and 30%, between 30 and 40%, between 40 and 50%, between 50 and 60%, between 60 and 70%, between 70 and 80%, between 80 and 90%, between 90 and 99%, including any range therebetween.

In some embodiments, the derivatized porous MaSp-based fiber of the invention comprises a functional moiety covalently bound to a side chain of at least one tyrosine so that the substitution degree of the tyrosine residues (or side chains) within the derivatized MaSp-based is between 1 and 90%, between 1 and 99%, between 10 and 99%, between 10 and 90%, between 10 and 80%, between 10 and 70%, between 10 and 60%, including any range or value therebetween.

In some embodiments, the substitution degree of the tyrosine residues (or side chains) within the derivatized MaSp-based fiber is at most 90%, at most 80%, at most 70%, at most 65%, at most 60%, including any range therebetween. The inventors successfully substituted up to about 60% of the tyrosine residues (or side chains) by various functional moieties, wherein some of the functional moieties are described in the examples section.

In some embodiments, the functional moiety is selectively bound to at least one tyrosine residue of the MaSp-based fiber. In some embodiments, selectively comprises at least 60%, at least 70%, at least 80%, at least 90%, at least 95%, at least 99% selectivity including any range therebetween.

In some embodiments, the functional moiety provides a positive and/or a negative charge to the MaSp-based fiber. In some embodiments, the functional moiety modifies a surface charge of the MaSp-based fiber. In some embodiments, the functional moiety modifies a property of the MaSp-based fiber, wherein the property is selected from wettability, water contact angle, dispersivity or solubility (e.g. in water and/or organic solvent).

In some embodiments, the derivatized (e.g. amino derivatized) porous MaSp-based fiber is characterized by a positive zeta-potential value being between 1 and 50 at pH of about 7. As exemplified herein, aminated MaSp-based fiber is characterized by a positive zeta-potential value of about 20 at pH of about 7, wherein the unmodified MaSp-based fiber has zeta-potential value of about −20 at pH of about 7.

In some embodiments, the derivatized (e.g. amino derivatized) porous MaSp-based fiber has greater zeta-potential value by at least 50%, at least 70%, at least 100%, at least 150%, at least 200%, at least 300%, at least 400%, at least 500%, at least 600%, at least 700%, at least 800%, at least 1000%, compared to zeta-potential value of the unmodified porous MaSp-based fiber.

In some embodiments, the derivatized (e.g. carboxy derivatized) porous MaSp-based fiber is characterized by a zeta-potential value being between −20 and −100 at pH of about 7. As exemplified herein, carboxylated MaSp-based fiber is characterized by zeta-potential value of about −40 at pH of about 7, wherein the unmodified MaSp-based fiber has zeta-potential value of about −20 at pH of about 7.

In some embodiments, the derivatized (e.g. carboxy derivatized) porous MaSp-based fiber has lower zeta-potential value by at least 50%, at least 70%, at least 100%, at least 150%, at least 200%, at least 300%, at least 400%, at least 500%, at least 600%, at least 700%, at least 800%, at least 1000%, compared to zeta-potential value of the unmodified porous MaSp-based fiber. One skilled in the art will appreciate, that the exact zeta-potential value will depend on pH and on the loading (i.e. w/w ratio) of the functional group within the porous MaSp-based fiber.

In some embodiments, the derivatized MaSp-based fiber retains the porosity of the pristine (e.g. non-derivatized) MaSp-based fiber. In some embodiments, the derivatized MaSp-based fiber is characterized by a BET surface area of at least 10 m2/g.

SEM images of the derivatized MaSp-based fibers are represented in FIGS. 3A and 3B. As demonstrated by FIGS. 3A-B, the outstanding porosity (e.g. defined by a BET surface area of at least 10 m2/g) of the derivatized MaSp-based fibers is sequence independent, since both MaSp-based protein and the mutant MaSp-based protein exhibit a highly porous structure. Furthermore, the porosity of the derivatized MaSp-based fibers is substantially retained, as compared to porosity of the non-modified MaSp-based fibers.

In some embodiments, the derivatized porous MaSp-based fiber of the invention comprises the functional moiety covalently bound to any one of a polymer, a linker and a chelating moiety or any combination thereof. In some embodiments, the functional moiety is covalently bound to a linker, wherein the linker is as described herein. In some embodiments, the functional moiety is covalently bound to a chelating moiety, wherein the chelating moiety is any one of a metal chelating group, a metal oxide chelating group or a combination thereof, wherein the metal chelating group and the metal oxide chelating group are as described herein.

The inventors successfully implemented PEI and/or amino-modified derivatized fibers of the invention together with various dyes in hair coloring compositions, as described in the Examples section.

In some embodiments, the composition of the invention comprises the derivatized porous MaSp-based fiber of the invention and optionally an additional component selected from an addition polymer, a dye and/or a pigment.

In some embodiments, the composition comprises 0.01% to 50%, 0.01% to 1%, 1% to 5%, 5% to 10%, 10% to 15%, 15% to 20%, and 20% to 50% (w/w) of the MaSp-based fiber, including any range between; and an additional component.

In some embodiments, the composition comprises 0.001% to 95% (w/w), 0.005% to 95% (w/w), 0.009% to 95% (w/w), 0.01% to 95% (w/w), 0.05% to 95% (w/w), 0.09% to 95% (w/w), 0.1% to 95% (w/w), 0.5% to 95% (w/w), 0.9% to 95% (w/w), 1% to 95% (w/w), 5% to 95% (w/w), 10% to 95% (w/w), 15% to 95% (w/w), 20% to 95% (w/w), 30% to 95% (w/w), 50% to 95% (w/w), 0.01% to 80% (w/w), 0.05% to 80% (w/w), 0.09% to 80% (w/w), 0.1% to 80% (w/w), 0.5% to 80% (w/w), 0.9% to 80% (w/w), 1% to 80% (w/w), 5% to 80% (w/w), 10% to 80% (w/w), 15% to 80% (w/w), 20% to 80% (w/w), 30% to 80% (w/w), 50% to 80% (w/w), 0.001% to 50% (w/w), 0.005% to 50% (w/w), 0.009% to 50% (w/w), 0.01% to 95% (w/w), 0.01% to 50% (w/w), 0.05% to 50% (w/w), 0.09% to 50% (w/w), 0.1% to 50% (w/w), 0.5% to 50% (w/w), 0.9% to 50% (w/w), 1% to 50% (w/w), 5% to 50% (w/w), 10% to 50% (w/w), 15% to 50% (w/w), 20% to 50% (w/w), or 30% to 50% (w/w), of the derivatized porous MaSp-based fiber, including any range therebetween.

In some embodiments, the composition of the invention consists essentially of the derivatized porous MaSp-based fiber of the invention and optionally of the additional component, as described herein. In some embodiments, at least 80%, at least 85%, at least 90%, at least 92%, at least 95%, at least 97%, at least 99%, at least 99.9%, by weight of the composition, including any range between, consists of the derivatized porous MaSp-based fiber of the invention and optionally of the additional component, as described herein.

In some embodiments, the derivatized porous MaSp-based fiber consists essentially of any one of the derivatized porous MaSp-based fibers described herein. In some embodiments, the derivatized porous MaSp-based fiber of the invention is substantially devoid of an additional fiber (e.g. derivatized fiber), and/or of an additional polymer, and/or of an additional organic or inorganic material or particle.

In some embodiments, at least 80%, at least 85%, at least 90%, at least 92%, at least 95%, at least 97%, at least 99%, at least 99.9%, by weight of the derivatized porous MaSp-based fiber of the invention, including any range between, consists of any one of the derivatized porous MaSp-based fibers described herein.

In some embodiments, the derivatized porous MaSp-based fiber and/or the composition of the invention is stable. In some embodiments, the derivatized porous MaSp-based fiber of the invention is referred to as stable, if the derivatized fiber retains its physical and/or chemical properties, and/or is chemically and/or physically stable upon dispersion in a solution, and/or prolonged storage under ambient storage conditions, and/or to a thermal exposure to a temperature up to 300° C., up to 200° C., up to 100° C., up to 80° C., up to 60° C., including any range between.

In some embodiments, the composition of the invention is referred to as stable, if the derivatized porous MaSp-based fiber of the invention is stably bound to the additional component (e.g. the composition is chemically stable upon dispersion in a solution, and/or prolonged storage under ambient storage conditions, and/or to a thermal exposure to a temperature up to 300° C., up to 200° C., up to 100° C., up to 80° C., up to 60° C., including any range between).

In some embodiments, the ambient conditions comprise exposure to any one of: an inert chemical such as a solvent (organic solvent and/or aqueous solvent, wherein the solvent is inert, i.e. is devoid of chemical reactivity with any of the components of the composition); a thermal exposure to a temperature up to 300° C., up to 200° C., up to 100° C., up to 80° C., up to 60° C., including any range between; exposure to UV/vis radiation (and/or electromagnetic radiation, IR radiation, microwave radiation, etc.); exposure to moisture and/or atmospheric gases, etc. In some embodiments, the ambient conditions comprise repetitive exposure to an inert chemical. In some embodiments, the ambient conditions comprise exposure to a temperature below the melting point and/or decomposition point of the any of the components of the composite (e.g. the MaSp-based fiber or of the derivatized MaSp-based fiber). One skilled in the art will appreciate that the exact definition of ambient storage conditions may include additional parameters or conditions well-known in the art.

In some embodiments, the composition and/or the derivatized porous MaSp-based fiber of the invention is referred to as stable, if it substantially maintains its structure, and its physical properties (e.g. mechanical stability, porosivity, tensile strength etc.) and chemical properties (wettability, zeta potential, hydrophobicity/hydrophilicity, reactivity), and/or wherein the additional component remains in contact with or bound to the derivatized MaSp-based fiber of the invention (e.g. substantially devoid of disintegration).

In some embodiments, the composition and/or the derivatized MaSp-based fiber of the invention is referred to as chemically stable if it substantially maintains it's chemical composition.

In some embodiments, the composition and/or the derivatized MaSp-based fiber of the invention is substantially chemically and/or physically stable for at least one month (m), at least 2 m, at least 6 m, at least 12 m, at least 2 years (y), at least 3 y, at least 10 y, including any range therebetween, wherein substantially is as described hereinbelow. In some embodiments, the composition and/or the derivatized MaSp-based fiber of the invention of the invention is substantially stable for a time period described herein, at ambient storage conditions.

In some embodiments, the derivatized (e.g. amino derivatized) porous MaSp-based fiber is characterized by a positive zeta-potential value being between 1 and 50 at pH of about 7. As exemplified herein, aminated MaSp-based fiber is characterized by a positive zeta-potential value of about 20 at pH of about 7, wherein the unmodified MaSp-based fiber has zeta-potential value of about −20 at pH of about 7.

In some embodiments, the derivatized (e.g. amino derivatized) porous MaSp-based fiber has greater zeta-potential value by at least 50%, at least 70%, at least 100%, at least 150%, at least 200%, at least 300%, at least 400%, at least 500%, at least 600%, at least 700%, at least 800%, at least 1000%, compared to zeta-potential value of the unmodified porous MaSp-based fiber.

In some embodiments, the derivatized (e.g. carboxy derivatized) porous MaSp-based fiber is characterized by a zeta-potential value being between −20 and −100 at pH of about 7. As exemplified herein, carboxylated MaSp-based fiber is characterized by zeta-potential value of about −40 at pH of about 7, wherein the unmodified MaSp-based fiber has zeta-potential value of about −20 at pH of about 7.

In some embodiments, the derivatized (e.g. carboxy derivatized) porous MaSp-based fiber has lower zeta-potential value by at least 50%, at least 70%, at least 100%, at least 150%, at least 200%, at least 300%, at least 400%, at least 500%, at least 600%, at least 700%, at least 800%, at least 1000%, compared to zeta-potential value of the unmodified porous MaSp-based fiber. One skilled in the art will appreciate, that the exact zeta-potential value will depend on pH and on the loading (i.e. w/w ratio) of the functional group within the porous MaSp-based fiber.

In some embodiments, the derivatized porous MaSp-based fiber of the invention comprises the functional moiety covalently bound to any one of a polymer, a linker and a chelating moiety or any combination thereof. In some embodiments, the functional moiety is covalently bound to a linker, wherein the linker is as described herein. In some embodiments, the functional moiety is covalently bound to a chelating moiety, wherein the chelating moiety is any one of a metal chelating group, a metal oxide chelating group or a combination thereof, wherein the metal chelating group and the metal oxide chelating group are as described herein.

In some embodiments, the derivatized porous MaSp-based fiber of the invention comprises wherein a dye or a pigment bound to the functional moiety, wherein the functional moiety is as described hereinabove. In some embodiments, the dye or the pigment is bound to the functional moiety via a covalent bond or a non-covalent bond. In some embodiments, the dye or the pigment is bound to the functional moiety via any one of hydrogen bond, Van-der Waals interaction, electrostatic interaction, p-p stacking or any combination thereof.

Non-limiting examples of dyes include but are not limited to: anionic dyes (e.g. Congo red, Alizarin Pure Blue B, Acid red 88, Trypan blue), cationic dyes (e.g. methine dyes, anthraquinone dyes, azo dyes, Coomassie, methylene blue), and neutral dyes (e.g. Neutral Orange RL, Neutral Red GRL, Neutral Gray 2BL), brilliant carmine 6B, lake red C, watching red, diazo yellow, hansa yellow, phthalocyanine blue, phthalocyanine green, alkali blue, and aniline black or any combination thereof. Other neutral or charged organic dyes are well-known in the art.

In some embodiments, the pigments which are used are classified according to the Color Index Generic Name or Color Index Constitution Numbers. These numbers may be prefixed with C.I.

In some embodiments, the pigment is a yellow pigment, for example, and without limitation, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 155, 167, 172, or 180.

In some embodiments, the pigment is a magenta pigment, for example and without limitation, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245.

In some embodiments, the pigment is a violet pigment e.g., C.I. Pigment Violets 19, 23, 32, 33, 36, 38, 43, or 50.

In some embodiments, the pigment is a cyan pigment including, without limitation, C.I. Pigment Blues 1, 2, 3, 15, 15:1, 15:2, 15:3, 15:34, 15:4, 16, 18, 22, 25, 60, 65, and 66; or C.I. Vat Blues 4 and 60.

Examples of pigments other than the magenta, cyan, and yellow pigments include, without being limited thereto, C.I. Pigment Greens 7 and 10; C.I. Pigment Browns 3, 5, 25, and 26; and C.I. Pigment Oranges 1, 2, 5, 7, 13, 14, 15, 16, 24, 34, 36, 38, 40, 43, and 63.

In some embodiments, the w/w ratio between the MaSp-based fiber and the dye or pigment is 0.01:1 to 10:1, 0.01:1 to 0.05:1, 0.05:1 to 0.1:1, 0.1:1 to 0.2:1, 0.2:1 to 0.3:1, 0.3:1 to 0.4:1, 0.4:1 to 0.5:1, 0.5:1 to 0.7:1, 0.7:1 to 0.9:1, 0.5:1 to 1:1, 0.9:1 to 1:1, 1:1 to 1.5:1, 1.5:1 to 2:1, 2:1 to 3:1, 3:1 to 5:1, 5:1 to 7:1, 7:1 to 10:1, 10:1 to 30:1, 30:1 to 50:1, 50:1 to 100:1, including any range therebetween.

In some embodiments, the dye or pigment is adsorbed to the derivatized porous MaSp-based fiber.

In some embodiments, the dye or pigment is stably bound to the derivatized porous MaSp-based fiber. In some embodiments, the composition comprising the dye or pigment bound to the derivatized porous MaSp-based fiber is stable (e.g. retains at least 60%, at least 70%, at least 80%, at least 90%, at least 95%, at least 99% of it's color intensity) after repetitive washings.

In some embodiments, the composition of the invention is a coating composition.

In some embodiments, the composition comprising the dye or pigment bound to the derivatized porous MaSp-based fiber is for coating a substrate. In some embodiments, the porous MaSp-based fiber facilitates adhesion or binding to the substrate. In some embodiments, the substrate is any one of a glass substrate, a polymeric substrate, a metal substrate. In some embodiments, the substrate comprises a body tissue. In some embodiments, the substrate is any one of skin, hair, nail or any combination thereof.

In some embodiments, the substrate is a charged substrate. In some embodiments, the composition comprising the dye or pigment bound to the derivatized porous MaSp-based fiber reduces degradation (e.g. chemical degradation and/or physical degradation) of the dye or of the pigment, compared to a control. In some embodiments, the control comprises a coating compositing devoid of derivatized porous MaSp-based fiber.

Composite

In another aspect, there is a composite comprising the derivatized porous MaSp-based fiber of the invention bound to any one of a metal, a metal salt, or to a metal oxide particle or any combination thereof. In some embodiments, the metal oxide particle is bound to the derivatized porous MaSp-based fiber via a coordinative bond, via an electrostatic interaction or both.

In some embodiments, the composite of the invention comprises the derivatized porous MaSp-based fiber of the invention bound to a metal component selected from metal, a metal salt, or to a metal oxide or any combination thereof, wherein the metal component is in a form of a particulate matter or in a form of distinct atoms, and wherein the metal component is in an elemental state or in an oxidized state. In some embodiments, the metal component comprises a metal, and/or a metal salt, wherein the metal component comprises the first metal and/or the second metal of the invention.

In some embodiments, the composite of the invention comprises the derivatized porous MaSp-based fiber of the invention bound to a metal component as described herein, via one or more chelating agents of the invention.

In some embodiments, the metal component is coordinatively bound (i.e. via a coordinative bond, or complexed) to the derivatized MaSp-based fiber via one or more chelating agents of the invention, and wherein the one or more chelating agents of the invention is covalently bound to the functional moiety of the invention (e.g. a polymer, as described herein). In some embodiments, the composite of the invention comprises the derivatized porous MaSp-based fiber of the invention bound to the metal component, wherein the derivatized porous MaSp-based fiber comprises a plurality of chelating agents covalently bound to the polymer, as described herein. In some embodiments, the chelating agent is as described hereinabove (e.g. comprising (i) metal chelating group capable of binding a metal or a salt thereof, (ii) a metal oxide chelating group, or both).

In some embodiments, the composite of the invention comprises a metal oxide particle bound to the derivatized porous MaSp-based fiber via a chelating agent. In some embodiments, the chelating agent is the metal oxide chelating group, as described hereinabove. In some embodiments, the metal oxide particle is complexed by the chelating agent. In some embodiments, the metal oxide particle is stably bound the derivatized porous MaSp-based fiber (e.g. the composite is chemically stable upon dispersion in a solution, and/or prolonged storage under ambient storage conditions, and/or to a thermal exposure to a temperature up to 300° C., up to 200° C., up to 100° C., up to 80° C., up to 60° C., including any range between).

In some embodiments, the ambient conditions comprise exposure to any one of: an inert chemical such as a solvent (organic solvent and/or aqueous solvent, wherein the solvent is inert, i.e. is devoid of chemical reactivity with any of the components of the composite); a thermal exposure to a temperature up to 300° C., up to 200° C., up to 100° C., up to 80° C., up to 60° C., including any range between; exposure to UV/vis radiation (and/or electromagnetic radiation, IR radiation, microwave radiation, etc.); exposure to moisture and/or atmospheric gases, etc. In some embodiments, the ambient conditions comprise repetitive exposure to an inert chemical. In some embodiments, the ambient conditions comprise exposure to a temperature below the melting point and/or decomposition point of the any of the components of the composite (e.g. the MaSp-based fiber or of the derivatized MaSp-based fiber). One skilled in the art will appreciate that the exact definition of ambient storage conditions may include additional parameters or conditions well-known in the art.

In some embodiments, the composite of the invention is referred to as stable, if it substantially maintains its structure, and its physical properties (e.g. mechanical stability, porosivity, tensile strength, electrical conductivity etc.) and chemical properties (wettability, zeta potential, hydrophobicity/hydrophilicity, reactivity), and/or wherein the metal component remains in contact with or bound to the derivatized MaSp-based fiber of the invention (e.g. substantially devoid of disintegration), wherein substantially is as described herein.

In some embodiments, the composite of the invention is referred to as chemically stable if the composite substantially maintains its chemical composition.

In some embodiments, the composite of the invention is substantially chemically and/or physically stable for at least one month (m), at least 2 m, at least 6 m, at least 12 m, at least 2 years (y), at least 3 y, at least 10 y, including any range therebetween, wherein substantially is as described hereinbelow. In some embodiments, the composite of the invention is substantially stable for a time period described herein, at ambient storage conditions.

In some embodiments, the composite of the invention comprises the derivatized MaSp-based fiber of the invention doped with the metal component. In some embodiments, the metal component is homogenously distributed within the composite (e.g. on or within the porous nanofibrils).

In some embodiments, the metal oxide is selected from the group consisting of titanium oxide, aluminum oxide, iron (II/III) oxide, zirconium oxide, zinc oxide, silicon oxide or any mixture thereof. In some embodiments, the metal oxide chelating group has an affinity and/or selectivity to titanium oxide. In some embodiments, the chelating agent has an affinity and/or selectivity to the metal oxide particle. In some embodiments, the chelating agent has an affinity and/or selectivity to a titanium oxide particle. In some embodiments, the metal oxide particle is as described hereinabove.

In some embodiments, the derivatized porous MaSp-based fiber comprises a functional moiety covalently bound to a metal oxide chelating group. In some embodiments, the metal oxide chelating group is covalently bound to the functional moiety via linker, wherein the linker is as described herein. In some embodiments, the metal oxide chelating group is covalently bound to the functional moiety via PGA linker. In some embodiments, each PGA chain is covalently bound to a plurality of metal oxide chelating groups.

In some embodiments, the functional moiety of the derivatized porous MaSp-based fiber covalently bound to a metal oxide chelating group is represented as follows:

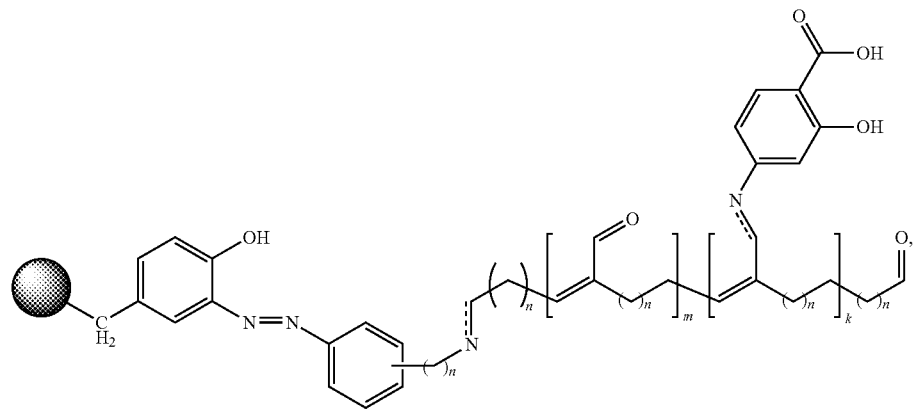

wherein a dashed line represents an optional bond, and each n is an integer being independently from 1 to 10000.

In some embodiments, the metal oxide chelating group comprises a carboxy and/or hydroxy group. In some embodiments, the metal oxide chelating group comprises a small molecule and/or a polymer. In some embodiments, the metal oxide chelating group is a mono-dentate, a bi-dentate, a tri-dentate, and a tetra-dentate ligand. In some embodiments, the metal oxide chelating group comprising a ligand having an affinity and/or selectivity to titania. In some embodiments, the metal oxide chelating group comprises a ligand comprising one or more carboxylic groups, and optionally one or more hydroxy groups. In some embodiments, the metal oxide chelating group comprises a ligand a cyclic multi-dentate ligand or a linear ligand.

In some embodiments, the metal oxide chelating group is a polymer comprising carboxy side chain groups and/or hydroxy side chain groups (such as PVA, polyacrylate, polyglycolate, etc., including any mixture or a copolymer thereof).

Non-limiting examples of metal oxide chelating groups include but are not limited to from salicylic acid, phosphonic acid, hydroxamic acid, malonic acid, pyrogallol, 5-hydroxy-1,4-naphtoquinone, quinone or any combination thereof. Other metal oxide chelating groups having affinity to titania are well-known in the art.

In some embodiments, the metal oxide chelating group comprises an oxidized tyrosine sidechain (e.g. dihydroxyphenyl or quinone). In some embodiments, the derivatized MaSp-based fiber comprises at least one oxidized tyrosine residue (e.g. in a form of dihydroxyphenyl or quinone). One skilled in the art will appreciate, that oxidized tyrosine can be obtained for example by reacting a MaSp based fiber with tyrosinase, thereby obtaining at least a portion of tyrosine residues being in an oxidized state (e.g. in a form of dihydroxyphenyl or quinone).

In some embodiments, the metal oxide chelating group is bound to a polymer, wherein the polymer is described herein. In some embodiments, the metal oxide chelating group is covalently bound to a polymer, wherein the polymer is as described herein. In some embodiments, the chelating moiety is covalently bound to the functional group of the derivatized MaSp-based fiber.

In some embodiments, the composite of the invention comprises the derivatized porous MaSp-based fiber comprising a plurality metal oxide chelating groups bound thereto, wherein at least a part (e.g. between 20 and 99%, between 20 and 30%, between 30 and 40%, between 40 and 60%, between 60 and 80%, between 80 and 90%, between 90 and 99%, including any range between) of the metal oxide chelating groups is bound to the metal oxide (e.g. metal oxide particle of the invention).

One skilled in the art will appreciate, that there are many options of covalent binding of the chelating moieties (e.g. metal oxide chelating groups) to a polymer. For example, an aminated chelating moiety can be bound to a carboxylated MaSp-based fiber. Alternatively, a carboxylated chelating moiety can be bound to an aminated MaSp-based fiber. Additionally, an aminated chelating moiety can be bound to a polymer comprising a carboxy group or a carbonyl group (e.g. PGA). Alternatively, a carboxylated chelating moiety can be bound to a polymer comprising a hydroxy group or an amino group (e.g. polylysine or PEI). The inventors successfully synthesized an aminated MaSp-based fiber bound to PGA, wherein PGA is further bound to a metal oxide chelating group (salicylic acid), as represented hereinabove.

In some embodiments, the composite of the invention comprises the derivatized porous MaSp-based fiber comprising a functional moiety covalently bound to a metal chelating group. In some embodiments, the metal chelating group is covalently bound to the functional moiety via linker, wherein the linker is as described herein. In some embodiments, the metal chelating group is covalently bound to the functional moiety via PGA linker. In some embodiments, each PGA chain is covalently bound to a plurality of metal chelating groups, as described above.

In some embodiments, the composite of the invention comprises the derivatized porous MaSp-based fiber comprising a plurality metal chelating groups bound thereto, wherein at least a part (e.g. between 20 and 99%, between 20 and 30%, between 30 and 40%, between 40 and 60%, between 60 and 80%, between 80 and 90%, between 90 and 99%, including any range between) of the metal chelating groups is bound to a metal, wherein the metal is as described herein. In some embodiments, at least a part of the metal chelating groups is bound to Pd or to a salt thereof (such as Pd(acetate)$_2$, PdCl$_2$). In some embodiments, at least a part of the metal chelating groups is bound to the metal at the elemental state (e.g. ground state, also referred to as 0 oxidation state). In some embodiments, at least a part of the metal chelating groups is bound to the metal at the oxidized state (e.g. +2). In some embodiments, the metal chelating groups is bound to at least partially reduced metal.

In some embodiments, the composition of the invention comprises the derivatized fiber of the invention doped with a metal (a first and/or a second metal, as described herein), wherein the metal is coordinatively bound to the polymer comprising a plurality of metal chelating groups. In some embodiments, the composition of the invention comprises Pd complexed by polyglutaraldehyde comprising a plurality of metal chelating groups (such as IDA), wherein the polyglutaraldehyde is covalently bound to the derivatized MaSp-based fiber of the invention.

In some embodiments, the polymer comprising a plurality of metal chelating groups complexing a metal or a metal cation is represented below:

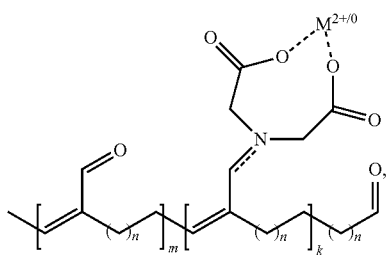

wherein k is from 10 to 10000, M represents the transition metal (e.g. Pd or a salt thereof) and each m and n represent an integer being independently from 0 to 10.

In another aspect of the invention, the metal atom (or the first metal) complexed by the polymer of the invention is further bound to an additional metal atom, wherein the additional metal atom is the same or different. In some embodiments, the metal atom complexed by the polymer of the invention is further bound to a plurality of metal atoms, thereby forming an aggregate. In some embodiments, the first metal (e.g. Pd) complexed by the polymer of the invention is uniformly distributed on the outer surface of the derivatized fiber of the invention. In some embodiments, the first metal (e.g. Pd) forms a metal layer (or first metal layer) on top of the derivatized fiber of the invention. In some embodiments, the metal layer (e.g. first metal layer and/or second metal layer) is 1 to 10 atoms thick, including any range between. In some embodiments, the first metal (e.g. Pd) is in a colloidal form. In some embodiments, the first metal (e.g. Pd) is in a form of particles in a range between 1 and 500 nm.

In some embodiments, the first metal either in a form of a particulate or in a form of distinct atoms, forms an aggregation center appropriate for binding of a second metal on top thereof. In some embodiments, Pd (in the elemental state) complexed by the polymer of the invention as described herein, forms an aggregation center so as to allow deposition of the second metal (e.g. Cu). In some embodiments, the second metal is deposited via electroless plating. In some embodiments, the first metal is capable of facilitating electroless deposition of the second metal.

In some embodiments, the second metal (e.g. Cu) is in a colloidal form. In some embodiments, the second metal (e.g. Cu) is in a form of particles in a range between 1 and 500 nm, between 1 and 10 nm, between 10 and 50 nm, between 50 and 100 nm, between 100 and 200 nm, between 200 and 500 nm, including any range between.

In some embodiments, the second metal either in a form of a particulate matter or in a form of distinct atoms, wherein the distinct atoms are in an elemental state or in an oxidized state. In some embodiments, the second metal either in a form of a particulate matter or in a form of distinct atoms is homogenously distributed on top of the derivatized fiber of the invention. In some embodiments, the first metal and/or the second metal are in a form of a homogenous layer on top of the derivatized fiber of the invention. In some embodiments, the first metal and/or the second metal are in an amorphous state or in a crystalline state (e.g. forming a substantially crystalline particle). In some embodiments, at least a portion of the first metal and/or the second metal is in a crystalline state.

By "uniform" or "homogenous" it is meant to refer to size (or thickness) distribution that varies within a range of less than e.g., ±60%, ±50%, ±40%, ±30%, ±20%, or ±10%, including any value therebetween.

In some embodiments, the term "layer", refers to a substantially uniform-thickness of a substantially homogeneous substance. In some embodiments, the shell comprises a single layer, or a plurality of layers.

In some embodiments, the derivatized MaSp-based fiber comprises a layer of the second metal (e.g. $Cu^0$) deposited on top of or bound to the first metal (e.g. Pd), wherein the first metal is complexed by polyglutaraldehyde covalently bound to the MaSp-based fiber. In some embodiments, the first metal (e.g. Pd) is chelated or complexed by a metal chelating moiety (e.g. IDA). In some embodiments, the metal chelating moiety is covalently bound to polyglutaraldehyde as exemplified hereinabove. The inventors successfully doped the derivatized MaSp-based fiber with $Cu^0$, wherein the derivatized MaSp-based fiber comprises PGA bound to IDA metal chelating group.

In some embodiments, the first metal and/or the second metal, as described herein are in a form of a form of a particulate matter or in a form of distinct atoms, and wherein each of the first metal and the second metal is independently in an elemental state or in an oxidized state.

In some embodiments, the metal layer (e.g. the first metal layer) in contact with or bound to the polymeric layer forms a plurality of aggregation sites for the second metal. In some embodiments, the first metal has a high affinity to the coating polymer of the polymeric layer. In some embodiments, the first metal is bound to the coating polymer.

In some embodiments, the second metal is bound to or aggregated on top of the first metal. In some embodiments, the second metal is in an elemental state. In some embodiments, the second metal is in an oxidized state (e.g. +1, or +2). In some embodiments, the second metal forms a layer on top of the first metal layer. In some embodiments, the second metal has an affinity to the first metal. In some embodiments, the second metal and the first metal are in a form of a layered structure, wherein each metal layer is separated. In some embodiments, the second metal and the first metal are mixed together within the metal layer. In some embodiments, the second metal and the first metal are mixed together, so as to form one metal layer on top of the polymeric layer. In some embodiments, the fiber is at least partially coated by any of the first metal and of the second metal or by a combination of the first and the second metal.

In some embodiments, the first metal and optionally the second metal are transition metals, as described herein. Transition metals are well-known in the art and are referred to metals comprising d-electrons.

In some embodiments, the first metal has a reduction potential suitable for a chemical reduction. In some embodiments, the first metal and the second metal are compatible with the electroless deposition method. In some embodiments, the first metal is capable of directly reducing the second metal.

In some embodiments, at least 20%, at least 30%, at least 40%, at least 50%, at least 60%, at least 70%, at least 80%, at least 90%, at least 95% at least 99% of the chelating agents, including any range therebetween, are bound to the metal oxide particle.

In some embodiments, a w/w ratio of the derivatized porous MaSp-based fiber to the metal oxide particle is between 0.01:1 and 100:1, 0.01:1 to 10:1, 0.01:1 to 0.05:1, 0.05:1 to 0.1:1, 0.1:1 to 0.2:1, 0.2:1 to 0.3:1, 0.3:1 to 0.4:1, 0.4:1 to 0.5:1, 0.5:1 to 0.7:1, 0.7:1 to 0.9:1, 0.5:1 to 1:1, 0.9:1 to 1:1, 1:1 to 1.5:1, 1.5:1 to 2:1, 2:1 to 3:1, 3:1 to 5:1, 5:1 to 7:1, 7:1 to 10:1, 10:1 to 30:1, 30:1 to 50:1, 50:1 to 100:1, including any range therebetween.

In some embodiments, the metal oxide particle is characterized by a particle size between 25 and 5000 nm, between 25 and 50 nm, between 50 and 100 nm, between 100 and 150 nm, between 150 and 200 nm, between 200 and 300 nm, between 300 and 500 nm, between 500 and 1000 nm, between 1000 and 2000 nm, between 2000 and 3000 nm, between 3000 and 4000 nm, between 4000 and 5000 nm, including any range between.

In some embodiments, the composite is stable for at least 1 month (m), at least 2 m, at least 3 m, at least 4 m, at least 5 m, at least 6 m, at least 7 m, at least 8 m, at least 9 m, at least 10 m, at least 12 m, including any range therebetween.

In some embodiments, the metal oxide within the metal oxide particle is in an amorphous state. In some embodiments, the metal oxide within the metal oxide particle is in a crystalline state. In some embodiments, at least a portion of the metal oxide within the metal oxide particle is in an amorphous state.

In some embodiments, the composite is characterized by an increased dispersibility in an aqueous solution and/or organic solution, compared to a pristine (e.g. being devoid of MaSp-based fiber) metal oxide particle. A composite of the invention comprising titanium oxide particles having a particle size of above 300 nm exhibited a significantly improved dispersibility in an aqueous solution and/or organic solution, compared to pristine Titania particles. An aqueous dispersion comprising titanium oxide particles bound to salicylate- or PVA-derivatized MaSp-based fiber (e.g. exemplary composites of the invention) demonstrated superior stability over a control dispersion comprising non-derivatized MaSp-based fibers. Furthermore, a composite comprising titanium oxide particles bound to salicylate-derivatized MaSp-based fibers demonstrated superior dispersibility (e.g. capable of forming a stable dispersion), wherein a w/w ratio of the titanium oxide particles to the derivatized MaSp-based fibers is about 1:1.

In some embodiments, an aqueous dispersion formed by the composite of the invention further comprises a surfactant. Exemplary surfactants, which have been implemented for the formation of stable dispersion include but are not limited to TRITON and sodium dodecyl sulfate (SDS).

In some embodiments, the composite is characterized by an increased absorption of a UV-radiation, compared to a control. In some embodiments, the control is a derivatized or a non-derivatized MaSp-based fiber devoid of metal oxide particles.

Porous MaSp-Based Fiber

According to some embodiments, the present invention provides a composition comprising a derivatized porous MaSp-based fiber. In some embodiments, the derivatized MaSp-based fiber is present at a concentration of 0.1% to 90%, by total weight.

In some embodiments, the porous MaSp-based fiber comprises at least one MaSp-based fiber. In some embodiments, the at least one MaSp-based fiber is present at a concentration of 0.1% to 25%, 0.1% to 20%, 0.1% to 15%, 0.5% to 30%, 1% to 30%, 5% to 30%, or 10% to 30%, by total weight, including any range therebetween.

In some embodiments, the porous MaSp-based fiber is a MaSp-based polymer in the form of particles having a size in the range of 0.5 μm to 1.5 μm. In some embodiments, the MaSp-based fiber is an insoluble polymer. In some embodiments, the porous MaSp-based fiber has a DSC pattern exhibiting at least an endothermic peak in the range of from 200° C. to 280° C. In some embodiments, the porous MaSp-based fiber is characterized by an amide peak in the range of 1615 cm-1 to 1635 cm-1 as measured by FTIR analysis.

According to some embodiments, there is provided a composition comprising a MaSp-based polymer (e.g. synthetic MaSp-based polymer), wherein the MaSp-based polymer has at least one characterization selected from: a) being an insoluble polymer; b) being in the form of particles having a size in the range of 0.5 μm to 1.5 μm; c) a DSC pattern exhibiting at least an endothermic peak in the range of from 200° C. to 280° C.; and d) an amide peak in the range of 1615 cm-1 and 1638 cm-1 as measure by FTIR analysis.

In some embodiments, the MaSp-based fiber is characterized by a degradation temperature (Td) between 280° C. and 350° C., between 290° C. and 350° C., between 300° C. and 350° C., between 310° C. and 350° C., between 320° C. and 350° C., between 280° C. and 330° C., between 290° C. and 330° C., between 300° C. and 330° C., between 310° C. and 330° C., or between 320° C. and 330° C., as determined by differential scanning calorimetry (DSC), including any range therebetween. Each possibility represents a separate embodiment of the invention.

In some embodiments, the MaSp-based fiber is characterized by a glass transition temperature (Tg) between 200° C. and 250° C., between 210° C. and 250° C., between 220° C. and 250° C., between 230° C. and 250° C., between 200° C. and 240° C., between 210° C. and 240° C., between 220° C. and 240° C., between 230° C. and 240° C., between 200° C. and 230° C., or between 210° C. and 230° C., as determined by DSC, including any range therebetween. Each possibility represents a separate embodiment of the invention.

In some embodiments, the MaSp-based fiber is characterized by a Tg between 260° C. and 320° C., between 270° C. and 320° C., between 280° C. and 320° C., between 290° C. and 320° C., between 260° C. and 310° C., between 270° C. and 310° C., between 280° C. and 310° C., or between 290° C. and 310° C., as determined by DSC, including any range therebetween. Each possibility represents a separate embodiment of the invention.

In some embodiments, the MaSp-based fiber is characterized by a DSC pattern exhibiting at least an endothermic peak between 280° C. and 350° C., between 290° C. and 350° C., between 300° C. and 350° C., between 310° C. and 350° C., between 280° C. and 330° C., between 290° C. and 330° C., between 300° C. and 330° C., between 310° C. and 330° C., or between 320° C. and 330° C., including any range therebetween. Each possibility represents a separate embodiment of the invention.

The term "degradation temperature ($T_d$)" as used herein, refers to a temperature at which decomposition occurs. Thermal decomposition is a process of extensive chemical species change caused by heat.

As used herein, the term "glass transition temperature ($T_g$)" refers to the temperature at which a material undergo a transition from a rubbery, viscous amorphous liquid ($T>T_g$), to a brittle, glassy amorphous solid ($T<T_g$). This liquid-to-glass transition (or glass transition for short) is a reversible transition. The glass transition temperature ($T_g$) is generally lower than the melting temperature ($T_m$), of the crystalline state of the material, if one exists.

According to some embodiments, there is provided the porous MaSp-based fiber comprising a synthetic MaSp-based polymer in the form of particles. In some embodiments, the particles have a size in the range of 0.5 µm to 1.5 µm, 0.7 µm to 1.5 µm, 0.8 µm to 1.5 µm, 0.9 µm to 1.5 µm, 0.5 µm to 1 µm, 0.7 µm to 1 µm, 0.8 µm to 1 µm, 0.9 µm to 1 µm, 0.5 µm to 1.3 µm, 0.5 µm to 1.2 µm, 0.7 µm to 1.3 µm, 0.7 µm to 1.2 µm, or 0.9 µm to 1.2 µm, including any range therebetween.

In some embodiments, the MaSp-based fiber comprises or consists of an insoluble MaSp-based polymer. In some embodiments, the insoluble MaSp-based polymer is in the form of particles. In some embodiments, the insoluble MaSp-based polymer is insoluble in organic solvents. In some embodiments, the insoluble MaSp-based polymer is insoluble in an aqueous solution. As used herein, the terms "MaSp-based polymer" and "MaSp-based fiber" are used herein interchangeably.

As used herein, the term "insoluble" refers to a material that, when exposed to an excess of solvent, does not dissolve, but may disperse to varying degrees. In some embodiments the term "insoluble" refers to a material that is less than 10%, less than 5%, less than 2%, or less than 1% soluble in a solvent. In some embodiments, "insoluble" refers to a material that can be partially dissolved in a solvent only at a concentration of less than 0.01% by weight. Solvents according to the present invention include organic solvents and aqueous solutions. In some embodiments, the solvent comprises an aqueous surfactant solution. In some embodiments, the solvent comprises urea aqueous solution.

In some embodiments, the MaSp-based fiber is characterized by a defined differential scanning calorimetry (DSC) pattern. In some embodiments, by "DSC pattern" it is meant to refer to the position of the peaks. In some embodiments, by "peak" it is meant to refer to exothermic peak. Herein throughout, "the position of the peaks" or "peak position" refers to the peaks along the temperature axis in a thermogram pattern, and, in some embodiments, may refers to the peak position at any peak intensity. One skilled in the art will appreciate that the data obtained in DSC measurements depend, in part, on the instrument used and the environmental conditions at the time measurements are carried out (e.g., humidity).

In some embodiments, the MaSp-based polymer is characterized by a DSC pattern exhibiting at least an endothermic peak in the range of from 200° C. to 280° C. In some embodiments, the disclosed composition is characterized by a DSC pattern exhibiting at least an endothermic peak in the range of from 200° C. to 270° C., 200° C. to 260° C., 200° C. to 250° C., 210° C. to 280° C., 212° C. to 280° C., 215° C. to 280° C., 216° C. to 280° C., 220° C. to 280° C., 210° C. to 250° C., 212° C. to 250° C., 215° C. to 250° C., 216° C. to 250° C., 220° C. to 250° C., 210° C. to 245° C., 210° C. to 242° C., or 215° C. to 245° C., including any range therebetween.

In some embodiments, the MaSp-based polymer is characterized by a DSC pattern exhibiting at least an endothermic peak with at least 5° C. to 100° C., at least 10° C. to 100° C., at least 15° C. to 100° C., at least 12° C. to 100° C., at least 25° C. to 100° C., at least 5° C. to 80° C., at least 10° C. to 80° C., at least 15° C. to 80° C., at least 12° C. to 80° C., at least 25° C. to 80° C., at least 5° C. to 50° C., at least 10° C. to 50° C., at least 15° C. to 50° C., at least 12° C. to 50° C., or at least 25° C. to 50° C., lower than the DSC pattern of an corresponding composition comprising a (MaSp)-based fiber.

In some embodiments, the MaSp-based polymer is devoid of DSC peaks in the range of about −100° C. to about 190° C. In some embodiments, the disclosed compound is devoid of DSC peaks in the range of about −100° C. to about 25° C. In some embodiments, the disclosed composition is characterized by at least a DSC pattern exhibiting devoid of an exothermic peak in the range of 40° C. to 70° C.

In some embodiments, the MaSp-based polymer is devoid of DSC peaks in the range of about −100° C. to about −50° C. In some embodiments, the disclosed compound is devoid of DSC peaks in the range of about −50° C. to about 0° C. In some embodiments, the disclosed compound is devoid of DSC peaks in the range of about −0° C. to about −25° C.

In some embodiments, the MaSp-based polymer is characterized by having an amide peak in the range of 1615 cm-1 to 1635 cm-1, as measured by FTIR analysis. In some embodiments, the disclosed composition is characterized by having an amide peak in the range of 1620 cm-1 to 1635 cm-1, 1620 cm-1 to 1630 cm-1, 1621 cm-1 to 1630 cm-1, or 1620 cm-1 to 1625 cm-1, including ay range therebetween, as measured by FTIR analysis.

In some embodiments, the MaSp-based polymer is devoid of a peak in the range of 1700 cm-1 to 1800 cm-1, as measured by FTIR analysis.

In one embodiment, the MaSp-based polymer of the invention assembles by self-assembly. By "self-assembly" it is meant that monomers, i.e., the synthetic spider silk protein of the invention, bind each other spontaneously, in an energetically favorable manner, under normal physiologic conditions, or at room temperature, to create the macromolecular structure having the properties described herein. Furthermore, the MaSp-based polymers of the invention are extremely resilient, and once assembled, may withstand extreme chemical assaults, such as solubilization in 10% surfactant solution and boiling for at least 1 hour.

"Tenacity" or "tensile strength" refers to the amount of weight a filament can bear before breaking. The maximum specific stress that is developed is usually in the filament, yarn or fabric by a tensile test to break the materials. According to specific embodiments, the MaSp-based polymer of the invention has tensile strength of about 100-3000 MPa (MPa=N/mm2), about 300-3000 MPa, about 500-2700 MPa, about 700-2500 MPa, about 900-2300 MPa, about 1100-2000 MPa, about 1200-1800 MPa, about 1300-1700 MPa or about 1400-1600 MPa. More specifically, about 1500 MPa.

"Toughness" refers to the energy needed to break the MaSp-based polymer. This is the area under the stress strain curve, sometimes referred to as "energy to break" or work to rupture. According to particular embodiments, the MaSp-based polymer of the invention a toughness of about 20-1000 MJ/m3, about 50-950 MJ/m3, about 100-900 MJ/m3, about 120-850 MJ/m3, about 150-800 MJ/m3, about 180-700 MJ/m3, about 180-750 MJ/m3, about 250-700 MJ/m3, about 280-600 MJ/m3, about 300-580 MJ/m3, about 310-560 MJ/m3, about 320-540 MJ/m3 or about 350-520 MJ/m3, most specifically about 350-520 MJ/m3.

"Elasticity" refers to the property of a body which tends to recover its original size and shape after deformation. Plasticity, deformation without recovery, is the opposite of elasticity. On a molecular configuration of the MaSp-based polymer, recoverable or elastic deformation is possible by stretching (reorientation) of inter-atomic and inter-molecular structural bonds. Conversely, breaking and re-forming of intermolecular bonds into new stabilized positions causes non-recoverable or plastic deformations.

"Extension" refers to an increase in length expressed as a percentage or fraction of the initial length.

By "fineness" is meant the mean diameter of a MaSp-based polymer or filament (e.g., a biofilament), which is usually expressed in microns (micrometers).

MaSp-Based Fibers

The terms "major ampullate spidroin protein" and "spidroin protein" are used interchangeably throughout the description and encompass all known major ampullate spidroin proteins, typically abbreviated "MaSp", or "ADF" in the case of Araneus diadematus. These major ampullate spidroin proteins are generally of two types, 1 and 2. These terms furthermore include non-natural proteins, as disclosed herein, with a high degree of identity and/or similarity to at least the repetitive region of the known major ampullate spidroin proteins. Additional suitable spider silk proteins include MaSp2, MiSp, MiSp2, AcSp, FLYS, FLAS, and flagelliform.

As used herein, the term "repetitive region", "repetitive sequence" or "repeat" refer to a recombinant protein sequence derived from repeat units which naturally occur multiple times in spider silk amino acid sequences (e.g., in the MaSp-1 protein). One skilled in the art will appreciate that the primary structure of the spider silk proteins is considered to consist mostly of a series of small variations of a unit repeat. The unit repeats in the naturally occurring proteins are often distinct from each other. That is, there is little or no exact duplication of the unit repeats along the length of the protein. In some embodiments, the synthetic spider silks of the invention are made wherein the primary structure of the protein comprises a number of exact repetitions of a single unit repeat. In additional embodiments, synthetic spider silks of the invention comprise a number of repetitions of one unit repeat together with a number of repetitions of a second unit repeat. Such a structure would be similar to a typical block copolymer. Unit repeats of several different sequences may also be combined to provide a synthetic spider silk protein having properties suited to a particular application. The term "direct repeat" as used herein is a repeat in tandem (head-to-tail arrangement) with a similar repeat. In another embodiment, the repeat used to form the synthetic spider silk of the invention is a direct repeat. In some embodiments, the repeat is not found in nature (i.e., is not a naturally occurring amino acid sequences).

An exemplary sequence comprising repetitive sequences is

ADF-4:
(SEQ ID NO: 1)
AAAAAAASGSGGYGPENQGPSGPVAYGPGGPVSSAAAAAAAGSGPGGYG

PENQGPSGPGGYGPGGSGSSAAAAAAAASGPGGYGPGSQGPSGPGGSGG

YGPGSQGPSGPGASSAAAAAAAASGPGGYGPGSQGPSGPGAYGPGGPGS

SAAASGPGGYGPGSQGPSGPGGSGGYGPGSQGPSGPGGPGASAAAAAAA

AASGPGGYGPGSQGPSGPGAYGPGGPGSSAAASGPGGYGPGSQGPSGPG

AYGPGGPGSSAAAAAAAGSGPGGYGPGNQGPSGPGGYGPGGPGSSAAAA

AAASGPGGYGPGSQGPSGPGVYGPGGPGSSAAAAAAAGSGPGGYGPGNQ

GPSGPGGYGPGGSGSSAAAAAAAASGPGGYGPGSQGPSGPGGSGGYGPG

-continued
SQGPSGPGASSAAAAAAAASGPGGYGPGSQGPSGPGAYGPGGPGSSAAA

SGPGGYGPGSQGPSGPGAYGPGGPGSSAAAAAAAASGPGGYGPGSQGPSG

PGGSRGYGPGSQGPGGPGASAAAAAAAASGPGGYGPGSQGPSGPGYQG

PSGPGAYGPSPSASAS.

In some embodiments, the synthetic repetitive sequence of the invention is based on (e.g., has a high percentage identity, as defined hereinbelow) one or more repetitive sequences derived from ADF-4 (SEQ ID NO: 1). As used herein, the term "based on" refers to a sequence having a high percentage of homology to a repetitive sequence.

In some embodiments, each repetitive sequence comprises up to 60 amino acids, up to 55 amino acids, up to 50 amino acids, up to 49 amino acids, up to 48 amino acids, up to 47 amino acids, up to 46 amino acids, up to 45 amino acids, up to 44 amino acids, up to 43 amino acids, up to 42 amino acids, up to 41 amino acids, up to 40 amino acids, up to 39 amino acids, up to 38 amino acids, up to 37 amino acids, up to 36 amino acids or up to 35 amino acids, wherein possibility represents a separate embodiment of the present invention. In some embodiments, each repetitive sequence comprises 5 to 60 amino acids, 10 to 55 amino acids, 15 to 50 amino acids, 20 to 45 amino acids, 25 to 40 amino acids, acids, 25 to 39 amino acids or 28 to 36 amino acids, wherein possibility represents a separate embodiment of the present invention. In some embodiments, each repetitive sequence comprises 30 to 40 amino acids, 31 to 39 amino acids, 32 to 38 amino acids, 33 to 37 amino acids, 34 to 36 amino acids, wherein each possibility represents a separate embodiment of the present invention. In an additional embodiment, each repetitive sequence comprises 35 amino acids.

In some embodiments, the repetitive region comprises, independently, an amino acid sequence as set forth in Formula 10: $(X_1)_Z X_2 GPGGYGPX_3 X_4 X_5 GPX_6 GX_7 GGX_8 GPGGPGX_9 X_{10}$; wherein $X_1$ is, independently, at each instance A or G; Z is an integer between 5 to 30; $X_2$ is S or G; $X_3$ is G or E; $X_4$ is G, S or N; $X_5$ is Q or Y; $X_6$ is G or S; $X_7$ is P or R; $X_8$ is Y or Q; $X_9$ is G or S; and $X_{10}$ is S or G. In some embodiments, at least 50% of $(X_1)z$ is A.

In another embodiment, the repetitive region of a MaSP1 protein comprises the amino acid sequence as set forth in SEQ ID NO: 2 (SGPGGYGPGSQGPSGPG-GYGPGGPGSS). In another embodiment, the repetitive region of a MaSP1 protein comprises the amino acid sequence as set forth in SEQ ID NO: 3 (AAAAAAAASGPGGYGPGSQGPSGPG-GYGPGGPGSS).

In another embodiment, there is provided a homolog of the repetitive region of a MaSP1 protein sharing at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98% or at least 99% homology with SEQ ID NO: 1.

In another embodiment, the homolog shares at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98% or at least 99% homology with SEQ ID NO: 2.

In another embodiment, the repetitive region of a MaSP1 protein has the amino acid sequence as set forth in SEQ ID NO: 1.

In another embodiment, the MaSP1 protein comprises a single N-terminal region selected from the group consisting of:

```
                                    SEQ ID NO: 4
(MSYYHHHHHHDYDIPTTENLYFQGAMDPEFKGLRRRAQLV);

SEQ ID NO: 5
(MSYYHHHHHHDYDIPTTENLYFQGAMDPEFKGLRRRAQLVRPLSNLDN
AP);

SEQ ID NO: 6
(MSYYHHHHHHDYDIPTTENLYFQGAMDPEFKGLRRRAQLVDPPGCRNS
ARAGSS);
``` or any functional homolog, variant, derivative, or fragment thereof. In another embodiment, the homolog of the C-terminal region shares at least 70% homology with any one of SEQ ID NOs: 4-6.

In another embodiment, the MaSP1 protein further comprises a single C-terminal region selected from the group consisting of:

```
                                    SEQ ID NO: 7
(VAASRLSSPAASSRVSSAVSSLVSSGPTNGAAVSGALNSLVSQISAS
NPGLSGCDALVQALLELVSALVAILSSASIGQVNVSSVSQSTQMISQA
LS);

SEQ ID NO: 8
(GPSGPGAYGPSPSASASVAASRLSSPAASSRVSSAVSSLVSSGPTNG
AAVSGALNSLVSQISASNPGLSGCDALVQALLELVSALVAILSSASIG
QVNVSSVSQSTQMISQALS);
``` or any functional homolog, variant, derivative, fragment or mutant thereof. In another embodiment, the homolog of the N-terminal region shares at least 70% homology with SEQ ID NO: 7-8.

In some embodiments, the MaSp-based fibers comprising a mixture of proteins, as disclosed under WO2017025964.

In some embodiments, the MaSp-based fiber comprises a mutant protein obtained by expressing a mutant nucleic acid sequence.

In some embodiments, the MaSP1 protein further comprises at least one tag sequence. Non-limiting examples of tags which may be used in the present invention include a His tag, a HA tag, a T7 tag, and the like. The skilled person is well aware of alternative suitable tags or other fusion partners.

"Amino acid" as used herein, refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. "Amino acid analogs" refers to compounds that have the same fundamental chemical structure as a naturally occurring amino acid, i.e., an alpha carbon that is bound to a hydrogen, a carboxyl group, an amino group, and an R group, e.g., homoserine, norleucine, methionine sulfoxide, methionine methyl sulfonium. Such analogs have modified R groups or modified peptide backbones, but retain the same basic chemical structure as a naturally occurring amino acid. "Amino acid mimetics" refers to chemical compounds that have a structure that is different from the general chemical structure of an amino acid, but that functions in a manner similar to a naturally occurring amino acid. Amino acids may be referred to herein by either their commonly known three letter symbols or by the one-letter symbols recommended by the IUPAC-IUB Biochemical Nomenclature Commission.

"Amino acid sequence" or "peptide sequence" is the order in which amino acid residues, connected by peptide bonds, lie in the chain in peptides and proteins. The sequence is generally reported from the N-terminal end containing free amino group to the C-terminal end containing free carboxyl group Amino acid sequence is often called peptide, protein sequence if it represents the primary structure of a protein, however one must discern between the terms "Amino acid sequence" or "peptide sequence" and "protein", since a protein is defined as an amino acid sequence folded into a specific three-dimensional configuration and that had typically undergone post-translational modifications, such as phosphorylation, acetylation, glycosylation, sulfhydryl bond formation, cleavage and the likes.

As used herein, "isolated" or "substantially purified", in the context of synthetic spider silk amino-acid sequences or nucleic acid molecules encoding the same, as exemplified by the invention, means the amino-acid sequences or polynucleotides have been removed from their natural milieu or have been altered from their natural state. As such "isolated" does not necessarily reflect the extent to which the amino-acid sequences or nucleic acid molecules have been purified. However, it will be understood that such molecules that have been purified to some degree are "isolated". If the molecules do not exist in a natural milieu, i.e. it does not exist in nature, the molecule is "isolated" regardless of where it is present. By way of example, amino-acid sequences or polynucleotides that do not naturally exist in humans are "isolated" even when they are present in humans.

The term "isolated" or "substantially purified", when applied to an amino acid sequence or nucleic acid, denotes that the amino acid sequence or nucleic acid is essentially free of other cellular components with which they are associated in the natural state. It may be in a homogeneous state, or alternatively in either a dry or aqueous solution. Purity and homogeneity are typically determined using analytical chemistry techniques such as polyacrylamide gel electrophoresis or high-performance liquid chromatography. An amino acid sequence or nucleic acid which is the predominant species present in a preparation is substantially purified.

In some embodiments, the repeats are of a homolog, variant, derivative of a repetitive region of a MaSp1 protein or fragment thereof. In some embodiments, the repeats are of a homolog, variant, derivative of a repetitive region of an ADF-4 protein or fragment thereof.

As used herein, the term "functional" as in "functional homolog, variant, derivative or fragment", refers to an amino acid sequence which possesses biological function or activity that is identified through a defined functional assay. More specifically, the defined functional assay is the formation of self-assembling fibers in cells expressing the functional homolog, variant, derivative or fragment.

An amino acid sequence or a nucleic acid sequence is the to be a homolog of a corresponding amino acid sequence or a nucleic acid, when the homology is determined to be at least 50%, at least 55%, at least 60%, at least 65%, at least 70%, at least 75%, at least 80%, at least 85%, at least 90%, at least 92%, at least 94%, at least 96%, at least 98% or at least 99%.

Homology, as used herein, may be determined on the basis of percentage identity between two amino acid (peptide) or DNA sequences. In general, the two sequences to be compared are aligned to give a maximum correlation between the sequences. The alignment of the two sequences is examined and the number of positions giving an exact amino acid (or nucleotide) correspondence between the two sequences determined, divided by the total length of the alignment multiplied by 100 to give a percentage identity figure. This percentage identity figure may be determined over the whole length of the sequences to be compared, which is particularly suitable for sequences of the same or very similar lengths and which are highly homologous, or over shorter defined lengths, which is more suitable for sequences of unequal length or which have a lower level of homology. Methods for comparing the identity of two or more sequences are well known in the art. Thus, for instance, programs available in the Wisconsin Sequence Analysis Package, version 9.1, for example the programs GAP and BESTFIT, may be used to determine the percentage identity between two amino acid sequences and the percentage identity between two polynucleotides sequences. BESTFIT uses the "local homology" algorithm of Smith and Waterman and finds the best single region of similarity between two sequences. BESTFIT is more suited to comparing two polypeptide or two polynucleotide sequences which are dissimilar in length, the program assuming that the shorter sequence represents a portion of the longer. In comparison, GAP aligns two sequences finding a "maximum similarity" according to the algorithm of Needleman and Wunsch. GAP is more suited to comparing sequences which are approximately the same length and an alignment is expected over the entire length. Preferably the parameters "Gap Weight" and "Length Weight" used in each program are 50 and 3 for polynucleotide sequences and 12 and 4 for polypeptide sequences, respectively. Preferably, percentage identities and similarities are determined when the two sequences being compared are optimally aligned.

The terms "identical", "substantial identity", "substantial homology" or percent "identity", in the context of two or more amino acids or nucleic acids sequences, refer to two or more sequences or subsequences that are the same or have a specified percentage of amino acid residues or nucleotides that are the same (i.e., about 60% identity, or at least 65%, at least 70%, at least 75%, at least 80%, at least 85%, at least 90%, at least 91%, at least 92%, at least 93%, at least 94%, at least 95%, at least 96%, at least 97%, at least 98%, or 99% identity over a specified region (e.g., amino acid sequence SEQ ID NO: 2 or 3), when compared and aligned for maximum correspondence over a comparison window or designated region) as measured using a BLAST or BLAST 2.0 sequence comparison algorithms with default parameters described below, or by manual alignment and visual inspection. Such sequences are then to be "substantially identical". This definition also refers to, or may be applied to, the compliment of a test sequence. The definition also includes sequences that have deletions and/or additions, as well as those that have substitutions. The preferred algorithms can account for gaps and the like.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

It should be appreciated that the invention further encompasses amino acid sequence comprising 2-70 repeats of a variant of any one of SEQ ID NO: 1, 2, or 3. As used herein, the term "variant" or "substantially similar" comprises sequences of amino acids or nucleotides different from the specifically identified sequences, in which one or more (e.g., 1, 2, 3, 4, 5, 6, 7, 8, 9, 10, 20 or 25) amino acid residues or nucleotides are deleted, substituted or added. The variants may be allelic variants occurring naturally or variants of non-natural origin. The variant or substantially similar sequences refer to fragments of amino acid sequences or nucleic acids that may be characterized by the percentage of the identity of their amino acid or nucleotide sequences with the amino acid or nucleotide sequences described herein, as determined by common algorithms used in the state-of-the-art. The preferred fragments of amino acids or nucleic acids are those having a sequence of amino acids or nucleotides with at least around 40 or 45% of sequence identity, preferentially around 50% or 55% of sequence identity, more preferentially around 60% or 65% of sequence identity, more preferentially around 70% or 75% of sequence identity, more preferentially around 80% or 85% of sequence identity, yet more preferentially around 90%, 91%, 92%, 93%, 94%, 95%, 96%, 97%, 98% or 99% of sequence identity when compared to the sequence of reference.

In one embodiment, the MaSp-based polymer is a fiber.

In one embodiment, the MaSp-based polymer is composed of monomers. In one embodiment, a plurality of monomers are arranged in a nanofibril. In one embodiment, a plurality of nanofibrils are arranged in a fiber or make-up a fiber. In one embodiment, a monomer or a nanofibril within the MaSp-based polymer or a fiber has a diameter of 4 to 16 nm. In one embodiment, a monomer or a nanofibril within the MaSp-based polymer or a fiber has a diameter of 6 to 14 nm. In one embodiment, a monomer or a nanofibril within the MaSp-based polymer or a fiber has a diameter of 8 to 12 nm. In one embodiment, a fiber or the MaSp-based polymer has a diameter of 70 to 450 nm. In one embodiment, a fiber or the MaSp-based polymer of proteins has a diameter of 80 to 350 nm. In one embodiment, a fiber the MaSp-based polymer has a diameter of 80 to 300 nm. In one embodiment, a fiber or the MaSp-based polymer has a diameter of 150 to 250 nm. In one embodiment, a fiber or the MaSp-based polymer is arranged as a coil. In one embodiment, a single fiber or one the MaSp-based polymer is arranged as a coil. In one embodiment, a coil has a diameter of 5 to 800 micrometers. In one embodiment, a coil has a diameter of 5 to 500 micrometers. In one embodiment, a coil has a diameter of 5 to 30 micrometers. In one embodiment, a coil has a diameter of 5 to 20 micrometers. In one embodiment, a fiber or the MaSp-based polymer has a length of 5 to 800 micrometers. In one embodiment, a fiber or the MaSp-based polymer has a length of 30 to 300 micrometers.

In one embodiment, a fiber or the MaSp-based polymer is branched. In one embodiment, a fiber or the MaSp-based polymer comprises 1 to 10 branches. In one embodiment, a fiber or the MaSp-based polymer is free of carbohydrates. In one embodiment, a fiber or the MaSp-based polymer is non-glycosylated. In one embodiment, a fiber or the MaSp-based polymer is free of fat or fatty acids. In one embodiment, a fiber or the MaSp-based polymer is free of phosphorus. In one embodiment, a fiber or the MaSp-based polymer is free of an additional non-MaSp-based protein. In one embodiment, a fiber or the MaSp-based polymer is free of an additional polymer (e.g. a synthetic polymer, a non-MaSp-based peptide, non-MaSp-based protein). In one embodiment, a fiber or the MaSp-based polymer is substantially free of an additional polymer. In one embodiment, "free of" is "devoid of" or essentially "devoid of".

In one embodiment, the aspect ratio of length to diameter of a fiber the MaSp-based polymer is at least 1:10. In one embodiment, the aspect ratio of length to diameter of a fiber or the MaSp-based polymer is at least 1:10 to 1:1500. In one embodiment, the aspect ratio of length to diameter of a fiber or the MaSp-based polymer is at least 1:50 to 1:1000. In one embodiment, the aspect ratio of length to diameter of a fiber or the MaSp-based polymer is at least 1:100 to 1:1200. In one embodiment, the aspect ratio of length to diameter of a fiber or the MaSp-based polymer is at least 1:100 to 1:1000. In one embodiment, the aspect ratio of length to diameter of a fiber or the MaSp-based polymer is at least 1:500 to 1:1000.

The terms derivatives and functional derivatives as used herein mean the amino acid sequence of the invention with any insertions, deletions, substitutions and modifications.

It should be appreciated that by the term "insertions", as used herein it is meant any addition of amino acid residues to the sequence of the invention, of between 1 to 50 amino acid residues, specifically, between 20 to 1 amino acid residues, and more specifically, between 1 to 10 amino acid residues. Most specifically, 1, 2, 3, 4, 5, 6, 7, 8, 9 and 10 amino acid residues. Further, the amino acid sequence of the invention may be extended at the N-terminus and/or C-terminus thereof with various identical or different amino acid residues.

Amino acid "substitutions" are the result of replacing one amino acid with another amino acid having similar structural and/or chemical properties, i.e., conservative amino acid replacements. Amino acid substitutions may be made on the basis of similarity in polarity, charge, solubility, hydrophobicity, hydrophilicity, and/or the amphipathic nature of the residues involved. For example, nonpolar (hydrophobic) amino acids include alanine, leucine, isoleucine, valine, proline, phenylalanine, tryptophan, and methionine; polar neutral amino acids include glycine, serine, threonine, cysteine, tyrosine, asparagine, and glutamine; positively charged (basic) amino acids include arginine, lysine, and histidine; and negatively charged (acidic) amino acids include aspartic acid and glutamic acid.

In another embodiment, the repeat sequence of the invention has 17 or fewer, 16 or fewer, 15 or fewer, 14 or fewer, 13 or fewer, 12 or fewer, 11 or fewer, 10 or fewer, 9 or fewer, 8 or fewer, or 7 or fewer amino acid substitutions to the sequence of any one of SEQ ID NO: 2 or 3. In one embodiment, the repeat sequence of the invention has at least 2, at least 3, at least 4, at least 5, at least 6, at least 7, at least 8, at least 9, at least 10, at least 11, at least 12, or at least 13 amino acid substitutions to the sequence of any one of SEQ ID NO: 2 or 3.

With respect to amino acid sequences, one of skill will recognize that individual substitutions, deletions or additions to an amino acid, nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologues, and alleles of the invention.

For example, substitutions may be made wherein an aliphatic amino acid (G, A, I, L, or V) is substituted with another member of the group, or substitution such as the substitution of one polar residue for another, such as arginine for lysine, glutamic for aspartic acid, or glutamine for asparagine. Each of the following eight groups contains other exemplary amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M).

Conservative nucleic acid substitutions are nucleic acid substitutions resulting in conservative amino acid substitutions as defined above.

Variants of the amino acid sequences of the invention may have at least 80% sequence similarity, at least 85% sequence similarity, 90% sequence similarity, or at least 95%, 96%, 97%, 98%, or 99% sequence similarity at the amino acid level, with a repeating unit denoted by any one of SEQ ID NO: 2 or 3.

The amino acid sequence of the invention may comprise 2-70 repeats of SEQ ID NO. 1 or SEQ ID NO. 3 or of any fragment thereof. A "fragment" constitutes a fraction of the amino acid or DNA sequence of a particular region. A fragment of the peptide sequence is at least one amino acid shorter than the particular region, and a fragment of a DNA sequence is at least one base-pair shorter than the particular region. The fragment may be truncated at the C-terminal or N-terminal sides, or both. An amino acid fragment may comprise at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 24, at least 26, at least 27, at least 28, at least 29, at least 30, at least 31, at least 32, at least 33 or at least 34 amino acids of SEQ ID NO: 1 or 3.

Mutants of the amino acid sequences of the invention are characterized in the exchange of one (point mutant) or more, about up to 10, of its amino acids against one or more of another amino acid. They are the consequence of the corresponding mutations at the DNA level leading to different codons.

Still further, the invention concerns derivatives of the amino acid sequence of the invention. Derivatives of the amino acid sequences of the invention are, for example, where functional groups, such as amino, hydroxyl, mercapto or carboxyl groups, are derivatized, e.g. glycosylated, acylated, amidated or esterified, respectively. In glycosylated derivatives an oligosaccharide is usually linked to asparagine, serine, threonine and/or lysine. Acylated derivatives are especially acylated by a naturally occurring organic or inorganic acid, e.g. acetic acid, phosphoric acid or sulphuric acid, which usually takes place at the N-terminal amino group, or at hydroxy groups, especially of tyrosine or serine, respectively. Esters are those of naturally occurring alcohols, e.g. methanol or ethanol. Further derivatives are salts, especially pharmaceutically acceptable salts, for example metal salts, such as alkali metal and alkaline earth metal salts, e.g. sodium, potassium, magnesium, calcium or zinc salts, or ammonium salts formed with ammonia or a suitable organic amine, such as a lower alkylamine, e.g. triethylamine, hydroxy-lower alkylamine, e.g. 2-hydroxyethylamine, and the like.

In some embodiments, the silk protein of the invention is devoid of post translational modifications.

In some embodiments, the silk protein of the invention is biodegradable. This characteristic may be of importance, for example, in the field of medicine, whenever the silk proteins are intended for an in vivo use, in which biological degradation is desired. This characteristic may in particular find application in suture materials and wound closure and coverage systems.

According to some aspects, the MaSp-based fiber of the invention is manufactured using an expression vector comprising a suitable nucleic acid sequence, wherein the nucleic acid sequence is under expression control of an operably linked promoter and, optionally, regulatory sequences. Exemplary expression systems are known in the art, such as an expression system disclosed in PCT/IL2020/050752.

In some embodiments, the MaSp-based protein results in a self-assembled forming a defined structure. In some embodiments, the MaSp-based protein is in the form of a network. In some embodiments, the MaSp-based protein is in the form of a complex. In some embodiments, the MaSp-based protein induces a defined secondary structure, e.g., a beta turn, gamma turn, beta sheet, alpha helix conformation, and the like.

According to some aspects, the MaSp-based protein or the MaSp-based polymer which are used herein interchangeably, is in the form of a fiber. A "fiber" as used herein, is meant a fine cord of fibrous material composed of two or more filaments twisted together.

By "filament" is meant a slender, elongated, threadlike object or structure of indefinite length, ranging from microscopic length to lengths of a mile or greater. Specifically, the synthetic spider silk filament is microscopic, and is proteinaceous. By "biofilament" is meant a filament created from a protein, including recombinantly produced spider silk protein. In some embodiments, the term "fiber" does not encompass unstructured aggregates or precipitates.

In some embodiments, the fiber of the proteins is characterized by size of at least one dimension thereof (e.g., diameter, length). For example, and without limitation, the diameter of the fiber is between 10 nm-1 µm, 20-100 nm, and 10-50 nm.

In some embodiments, the fiber is composed of nanofibrils. In some embodiments, the nano-fibrils have a diameter of e.g., 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 40 nm, about 42 nm, about 44 nm, about 46 nm, about 48 nm, or about 50 nm, including any value or range therebetween. In one embodiment, the nano-fibrils have a diameter of 3-7 nm. In one embodiment, the nano-fibrils have a diameter of 4-6 nm.

In some embodiments, the length of the disclosed fiber is between 1-200 µm, 10-100 µm, 100 to 500 µm or 200-500 µm.

In some embodiments of any one of the embodiments described herein, the disclosed fiber (e.g. particle) is characterized by a porous structure. In some embodiments, the porous structure is characterized by a porosity of at least 30% (e.g., from 30 to 99%). In some embodiments, the porous structure is characterized by a porosity of at least 50% (e.g., from 50 to 99%). In some embodiments, the porous structure is characterized by a porosity of at least 60% (e.g., from 60 to 99%). In some embodiments, the porous structure is characterized by a porosity of at least 70% (e.g., from 70 to 99%). In some embodiments, the porous structure is characterized by a porosity of at least 80% (e.g., from 80 to 99%). In some embodiments, the porous structure is characterized by a porosity of at least 90% (e.g., from 90 to 99%). In some embodiments, the porous structure is characterized by a porosity of about 90%.

Herein, the term "porosity" refers to a percentage of the volume of a substance (e.g., a "sponge-like" material) which consists of voids. In another embodiment, porosity is measured according to voids or lumens within the surface area divided to the entire surface area (porous and non-porous).

In some embodiments, the porous structure of the disclosed fibers allows absorbing water efficiently on the fiber surface. That is, and without being bound by any particular theory, this surprising discovery can be explained in view of the disclosed fiber structure and its porosity which is in sharp distinction from native spider silk found in nature.

In some embodiments of any one of the embodiments described herein, the disclosed fiber is characterized by a mean diameter is nanosized.

In some embodiments, the disclosed fiber is characterized by a mean diameter is in a range of from 1 to 50 nm. In some such embodiments, the mean diameter is in a range of from 3 to 50 nm. In some such embodiments, the mean diameter is in a range of from 5 to 50 nm. In some such embodiments, the mean diameter is in a range of from 1 to 40 nm. In some such embodiments, the mean diameter is in a range of from 1 to 30 nm. In some such embodiments, the mean diameter is in a range of from 5 to 40 nm.

Figure 19B:
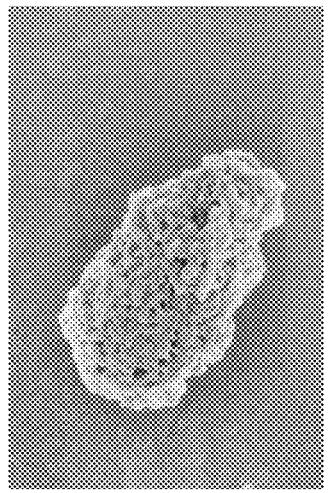
FIGS. 19A-D are SEM images of MaSp-based (SVX) fibers.
Figure 19D:
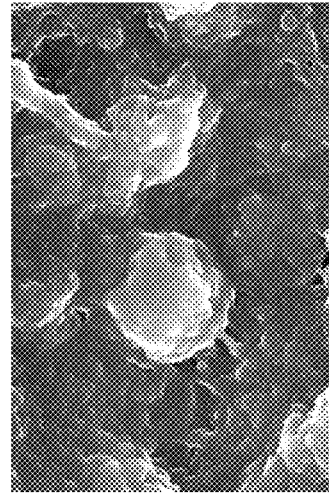
Figure 19A:
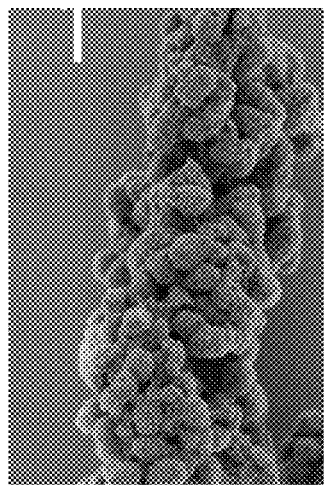
Figure 19C:
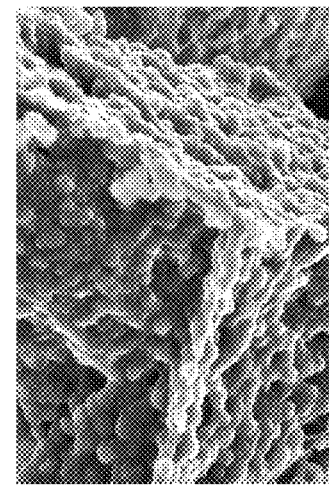

In some embodiments, the MaSp-based fiber comprises a plurality of pores. In some embodiments, the porous MaSp-based fiber comprises a plurality of fibrils (e.g. nano-fibrils), as exemplified hereinbelow (FIGS. 19A and 19B). In some embodiments, the MaSp-based fiber is a form of a particle, as described hereinbelow. In some embodiments, the MaSp-based fiber is as described hereinbelow. In some embodiments, the composition comprises a plurality of MaSp-based fibers. In some embodiments, the plurality of MaSp-based fibers comprises fibers having a different chemical composition and/or a different molecular weight (MW).

As further exemplified in the Examples section below, in some embodiments, a plurality of the disclosed fibers may be in the form of self-assembled structure or matrix. In some embodiments, this matrix can be rendered suitable for biomaterial applications.

In some embodiments, this matrix is suitable for cell growth, and for maintaining or promoting cellular activity, as further demonstrated hereinbelow.

In some embodiments, the term "self-assembled" refers to a resulted structure of a self-assembly process (e.g., spontaneous self-assembly process) based on a series of associative chemical reactions between at least two domains of the fiber(s), which occurs when the associating groups on one domain are in sufficient proximity and are oriented so as to allow constructive association with another domain. In other words, an associative interaction means an encounter that results in the attachment of the domains of a fiber or fibers to one another. In some embodiments, attached domains are not parallel to each other. Also contemplated are arrangements in which there are more than two domains of the self-assembled structure, each engaging a different plane.

It is noteworthy, that in some embodiments, the density of the self-assembled fiber (e.g., about 80% voids) is in the range of from 0.1 g/cm$^3$ to 0.4 g/cm$^3$ or from 0.2 g/cm$^3$ to 0.3 g/cm$^3$. In exemplary embodiments, the density of the self-assembled fiber is about 0.26 g/cm$^3$.

Wettability study of surfaces at nano-scale spatial resolution and high temporal resolution is an emerging field from both theoretical and practical aspects.

As demonstrated in the Examples section that follows, the disclosed fiber exhibited a high degree of surface's wettability exhibiting a remarkable ability to absorb fluids in comparison with their volume and weight.

In some embodiments, the polymer is hydrophobic. In some embodiments the polymer is UV cured.

In some embodiments, the disclosed composite is biostable. In some embodiments, the disclosed composite is biocleavable. In some embodiments, the disclosed composite is biodegradable.

In some embodiments, the term "biostable" describes a compound or a polymer that remains intact under physiological conditions (e.g., is not degraded in vivo, and hence is non-biodegradable or non-biocleavable).

In some embodiments, the term "biodegradable" describes a substance which can decompose under physiological and/or environmental condition(s) into breakdown products. Such physiological and/or environmental conditions include, for example, hydrolysis (decomposition via hydrolytic cleavage), enzymatic catalysis (enzymatic degradation), and mechanical interactions. This term typically refers to substances that decompose under these conditions such that 50 weight percent of the substance decompose within a time period shorter than one year.

In some embodiments, the term "biodegradable" as used in the context of embodiments of the invention, also encompasses the term "bioresorbable", which describes a substance that decomposes under physiological conditions to break down products that undergo bioresorption into the host-organism, namely, become metabolites of the biochemical systems of the host-organism Cosmeceutical Composition In another aspect, there is a cosmeceutical composition comprising an effective amount of the composition and/or the composite of the invention and a cosmetically acceptable carrier. In some embodiments, the composition and/or the composite of the invention is in a form of a cosmetic active ingredient. In some embodiments, the cosmeceutical composition comprises a cosmetic active ingredient and a cosmetically acceptable carrier, wherein the cosmetic active ingredient comprises the composition and/or the composite of the invention.

In some embodiments, a weight per weight (w/w) concentration of the composition and/or the composite of the invention within the composition is between 1 and 95%.

In some embodiments, w/w concentration of the composition and/or the composite of the invention within the cosmeceutical composition is between 1 and 5%, between 5 and 10%, between 10 and 15%, between 15 and 20%, between 20 and 30%, between 30 and 35%, between 35 and 40%, between 40 and 45%, between 45 and 50%, between 50 and 55%, between 55 and 60%, between 60 and 65%, between 65 and 70%, between 70 and 80%, between 80 and 90%, between 90 and 95%, including any range or value therebetween.

In some embodiments, w/w concentration of the cosmetic active ingredient within the cosmeceutical composition is between 1 and 5%, between 5 and 10%, between 10 and 15%, between 15 and 20%, between 20 and 30%, between 30 and 35%, between 35 and 40%, between 40 and 45%, between 45 and 50%, between 50 and 55%, between 55 and 60%, between 60 and 65%, between 65 and 70%, between 70 and 80%, between 80 and 90%, between 90 and 95%, including any range or value therebetween.

In some embodiments, the cosmetic active ingredient is encapsulated by or incorporated within an intertwisted structure (also used herein as a "matrix") of the derivatized MaSp-based fiber. In some embodiments, the cosmetic active ingredient is embedded within the matrix.

In some embodiments, the concentration of the cosmetically acceptable carrier within the cosmeceutical composition is 60% to 95% (w/w), from 60 to 70% w/w, from 70 to 75% w/w, from 75 to 80% w/w, from 80 to 85% w/w, from 85 to 90% w/w, from 90 to 92% w/w, from 92 to 95% w/w, from 95 to 97% w/w including any range or value therebetween. In some embodiments, the term "cosmetically acceptable carrier" and the term "carrier" are used herein interchangeably.

In some embodiments, the carrier is a physiologically suitable carrier. Exemplary physiologically suitable carriers are listed hereinbelow, and additional physiologically suitable carriers are well-known in the art.

In some embodiments, the carrier comprises an emulsifier. Emulsifiers can reduce the interfacial tension between phases and improve the formulation and stability of an emulsion. The emulsifiers can be nonionic, cationic, anionic, and zwitterionic emulsifiers (See McCutcheon's (1986); U.S. Pat. Nos. 5,011,681; 4,421,769; 3,755,560).

Non-limiting examples of emulsifiers include esters of glycerin, esters of propylene glycol, fatty acid esters of polyethylene glycol, fatty acid esters of polypropylene glycol, esters of sorbitol, esters of sorbitan anhydrides, carboxylic acid copolymers, esters and ethers of glucose, ethoxylated ethers, ethoxylated alcohols, alkyl phosphates, polyoxyethylene fatty ether phosphates, fatty acid amides, acyl lactylates, soaps, TEA stearate, DEA oleth-3 phosphate, polyethylene glycol 20 sorbitan monolaurate (polysorbate 20), polyethylene glycol 5 soya sterol, steareth-2, steareth-20, steareth-21, ceteareth-20, PPG-2 methyl glucose ether distearate, ceteth-10, polysorbate 80, cetyl phosphate, potassium cetyl phosphate, diethanolamine cetyl phosphate, polysorbate 60, glyceryl stearate, PEG-100 stearate, or any combination thereof.

In some embodiments, a w/w ratio of the cosmetic active ingredient to the carrier within the cosmeceutical composition is at most 100:1, at most 80:1, at most 60:1, at most 50:1, at most 40:1, at most 30:1, at most 20:1, at most 10:1, at most 9:1, at most 8:1, at most 7:1, at most 6:1, at most 5:1, at most 4:1, at most 3:1, at most 2:1, at most 1:1 including any range therebetween.

In some embodiments, the cosmeceutical composition of the invention is a solid composition. In some embodiments, the cosmeceutical composition of the invention is in a form of a pellet or a powder. In some embodiments, the cosmeceutical composition of the invention is in a form of a film. In some embodiments, the cosmeceutical composition of the invention is in a form of a semisolid (e.g. a gel or a hydrogel). In some embodiments, the cosmeceutical composition of the invention is substantially homogenous. In some embodiments, the cosmetic active ingredient and the carrier are mixed homogenously within the composition.

In some embodiments, the cosmeceutical composition (e.g. the solid composition) is substantially devoid of at least one of a solvent, a surfactant, a carrier, a particle or a combination thereof, wherein substantially is at least 80%, at least 90%, at least 92%, at least 95%, at least 97%, at least 98%, at least 99% by weight of the composition.

In some embodiments, the cosmeceutical composition of the invention further comprises between 0.1 and 95% of any one of a solvent, a film-forming agent, a pigment, a dye, a stabilizer, an oil, and a thickener or any combination thereof.

In some embodiments, the cosmeceutical composition of the invention further comprises a solvent. In some embodiments, the w/w content of the solvent within the composition is between 10 and 90%, between 10 and 20%, between 20 and 30%, between 30 and 40%, between 40 and 50%, between 50 and 60%, between 60 and 70%, between 70 and 80%, between 80 and 90%, between 90 and 95%, including any range or value therebetween.

In some embodiments, the solvent is an aqueous or an organic solvent. In some embodiments, the organic solvent is as described herein.

In some embodiments, the cosmeceutical composition of the invention is a liquid or a semi-liquid composition. In some embodiments, the liquid or a semi-liquid composition is characterized by a viscosity at 25° C. of between 50 and 3000 cP, between 50 and 100 cP, between 100 and 300 cP, between 300 and 500 cP, between 500 and 1000 cP, between 1000 and 2000 cP, between 2000 and 3000 cP, including any range therebetween.

In some embodiments, the cosmeceutical composition of the invention (e.g. the liquid composition) is selected from a solution, a dispersion, an emulsion, a gel, a hydrogel, a semi-liquid, and a foam or a combination thereof. In some embodiments, the composition (e.g. the liquid composition) is substantially devoid of a solvent, a surfactant, a carrier, a particle or a combination thereof, wherein substantially is at least 80%, at least 90%, at least 92%, at least 95%, at least 97%, at least 98%, at least 99% by weight of the composition including any range or value therebetween.

In some embodiments, the cosmeceutical composition of the invention (e.g. the liquid composition) further comprises a thickener. In some embodiments, the w/w content of the thickener within the composition is 1 and 20%, between 1 and 2%, between 2 and 5%, between 5 and 7%, between 4 and 6%, between 6 and 8%, between 8 and 10%, between 10 and 12%, between 12 and 15%, between 15 and 20%, between 20 and 30%, between 30 and 40%, between 40 and 50%, between 50 and 60%, between 60 and 70%, between 70 and 80%, between 80 and 90%, between 90 and 95%, including any range or value therebetween. In some embodiments, the thickener provides a predetermined viscosity to the liquid composition.

Non-limiting examples of thickeners include but are not limited to stearic acid, palmitic acid, stearyl alcohol, cetyl alcohol, behenyl alcohol, palmitic acid, PEG, polyvinyl pyrrolidone, polyacrylate or a deviravitive thereof (such as esters, cross-linked polyacrylates or a combination thereof), polyacrylamide (e.g. multi-block copolymers of acrylamides and substituted acrylamides with acrylic acids and substituted acrylic acids or a combination thereof), and a gum (e.g. cellulose, carboxymethyl, hydroxyethylcellulose, cellulose acetate propionate carboxylate, hydroxyethylcellulose, microcrystalline cellulose, sodium cellulose sulfate, amylopectin, carrageenan, dextrin, guar gum, guar hydroxypropyltrimonium chloride, hydroxypropyl chitosan, kelp, locust bean gum, natto gum, tragacanth gum, xanthan gum, acacia, and agar or a combination thereof) or a combination thereof.

In some embodiments, the cosmeceutical composition further comprises an additive. In some embodiments, the additive is selected from the group consisting of antimicrobial agents, (e.g. methylparaben, propylparaben, butylparaben, ethylparaben, isobutylparaben, etc.), skin conditioning agents (e.g., aloe extracts, allantoin, bisabolol, ceramides, dimethicone, and dipotassium glycyrrhizate).

In some embodiments, the cosmeceutical composition is a cosmetic preparation. In some embodiments, the cosmetic preparation comprises ingredients suitable for use in a cosmetic product.

In some embodiments, the composition and/or the composite of the invention are substantially stable within the cosmeceutical composition.

In some embodiments, the cosmeceutical composition is biocompatible. In some embodiments, the cosmeceutical composition enhances bioaccessibility of a hydrophobic or a hydrophilic cosmetic active ingredient. In some embodiments, the cosmeceutical composition enhances bioaccessibility of a compound within a subject, wherein the compound is a cosmetic active ingredient selected from a polysaccharide, an alpha-hydroxy carboxylic acid, a humectant, etc. (as exemplified hereinbelow). The term "bioaccessibility" as used herein, is directed to ability to release the cosmetic active ingredient in-vitro by any one of the compositions of the present invention. The in-vitro release can be evaluated by using a skin tape test (as described in the Examples section).

In some embodiments, the cosmeceutical composition increases bioavailability and/or bioaccessibility of the cosmetic active ingredient. In some embodiments, the derivatized MaSp-based fiber substantially reduces degradation of the cosmetic active ingredient embedded therewithin.

In some embodiments, the cosmeceutical composition of the present invention is in a form of a cosmetic product. In some embodiments, the cosmeceutical composition of the present invention is in a form of topically spreadable compositions, sprayable compositions, aerosolized compositions, injectable compositions, edible compositions, compositions in tablet, gel cap, or pill form.

In some embodiments, the cosmeceutical composition is a sunscreen composition comprising an effective amount (e.g. cosmetically effective amount) of the composite of the invention. In some embodiments, the sunscreen composition comprises an effective amount of derivatized MaSp-based fiber comprising a functional moiety covalently bound to a metal oxide chelating group, wherein the functional moiety and the metal oxide chelating group are as described herein; and wherein derivatized MaSp-based fiber comprises any MaSp-based fiber (e.g. porous and/or non-porous MaSp-based fiber) covalently bound to the metal oxide chelating group as described herein.

In some embodiments, the sunscreen composition is for absorbing at least a portion of UV radiation. In some embodiments, the sunscreen composition is for reducing UV exposure to a skin of a subject.

In some embodiments, reducing UV exposure by at least 20%, at least 30%, at least 50%, at least 70%, at least 90%, at least 95%, at least 99%, including any range therebetween.

In some embodiments, cosmeceutical composition of the invention is characterized as a sunscreen composition having a sun protection factor (SPF) value of between 1 and 100.

In some embodiments, the sunscreen composition of the invention is characterized by sun protection factor (SPF) value of between 1 and 100, between 1 and 10, between 10 and 20, between 20 and 30, between 30 and 40, between 40 and 50, between 50 and 60, between 60 and 70, between 70 and 100, including any range therebetween.

In some embodiments, the effective amount comprises an amount of the composite sufficient for obtaining a reduction of UV exposure, wherein reduction is as described herein. In some embodiments, the effective amount comprises a w/w concentration of the composite within the sunscreen composition being between 0.01 and 95%, between 0.01 and 0.1%, between 0.1 and 0.5%, between 0.5 and 0.1%, between 0.1 and 0.5%, between 0.5 and 1%, between 1 and 5%, between 5 and 10%, between 10 and 20%, between 20 and 30%, between 30 and 50%, between 50 and 70%, between 70 and 80%, between 80 and 90%, between 90 and 95%, including any range therebetween.

In some embodiments, the cosmeceutical composition is a hair coloring composition comprising an effective amount (e.g. cosmetically effective amount) of the derivatized porous MaSp-based fiber of the invention bound to a dye and/or to a pigment. In some embodiments, the hair coloring composition comprises an effective amount of derivatized MaSp-based fiber bound to a dye and/or to a pigment, wherein derivatized MaSp-based fiber comprises any MaSp-based fiber (e.g. porous and/or non-porous MaSp-based fiber) covalently bound to a functional group (e.g. positively or negatively charged group) as described herein. In some embodiments, the effective amount comprises an amount of the composite sufficient for coloring a hair of a subject, such as for obtaining a hair color (e.g. the derivatized porous MaSp-based fiber of the invention bound to a dye and/or to a pigment) stably bound to a hair of the subject, wherein stable is as described herein.

In some embodiments, the dye and/or the pigment are bound to the derivatized MaSp-based fiber (e.g. porous or non-porous MaSp-based fiber) via a covalent or a non-covalent bond. In some embodiments, the derivatized MaSp-based fiber bound to a dye and/or to a pigment remains stable within the hair coloring composition.

In some embodiments, the hair coloring composition comprises the derivatized porous MaSp-based fiber of the invention bound to a dye or to a pigment as the cosmetic active ingredient.

In some embodiments, the effective amount comprises a w/w concentration of the derivatized porous MaSp-based fiber within the hair coloring composition being between 50 and 99.99% w/w, between 50 and 60% w/w, between 60 and 70% w/w, between 70 and 80% w/w, between 80 and 90% w/w, between 90 and 92% w/w, between 92 and 95% w/w, between 95 and 97% w/w, between 97 and 99% w/w, between 99 and 99.9% w/w, including any range therebetween.

In some embodiments, the effective amount comprises a w/w concentration of the derivatized porous MaSp-based fiber within the hair coloring composition being between 0.01 and 95%, between 0.01 and 0.1%, between 0.1 and 0.5%, between 0.5 and 0.1%, between 0.1 and 0.5%, between 0.5 and 1%, between 1 and 5%, between 5 and 10%, between 10 and 20%, between 20 and 30%, between 30 and 50%, between 50 and 70%, between 70 and 80%, between 80 and 90%, between 90 and 95%, including any range therebetween.

In some embodiments, the hair coloring composition is characterized by a pH value between 3 and 7, between 3 and 4, between 4 and 5, between 5 and 6, between 6 and 7, including any range therebetween.

In some embodiments, the hair coloring composition is for coloring a hair, or an article comprising thereof (e.g. an apparel, a wig, etc.). In some embodiments, the hair coloring composition stably adheres to a hair of a subject in need thereof. In some embodiments, the hair coloring composition provides a hair coating. In some embodiments, the hair coloring composition is capable of providing a stable coating for a hair. In some embodiments, the hair coloring composition reduces or prevents degradation (e.g. chemical degradation or photo bleaching) of the dye and/or pigment. In some embodiments, the coating is stable for at least 1 days (d), at least 5 d, at least 10 d, at least 15 d, at least 20 d, at least 25 d, at least 30 d, including any range therebetween.

Without being bound to any particular theory or mechanism, it is postulated that the human hair (bleached or non-bleached) is negatively charged. Thus, it is expected, that a composition (e.g. the hair coloring composition of the invention) comprising a positively charged polymer will attract to the negatively charged human hair (e.g. via electrostatic interactions), thereby forming a coating thereon.

The inventors successfully implemented various derivatized porous MaSp-based fibers in hair coloring compositions (such as the hair coloring compositions described herein). Some of these hair coloring compositions resulted in a uniform and stable hair coating, upon contacting the hair coloring composition with hair (e.g. human hair). Exemplary hair coloring composition which have been successfully implemented for hair coating include aminated MaSp-based fiber (e.g. chemically modified by 4-(2-aminoethyl) aniline; 3-amonipropyltriethoxysilane or by PEI). One skilled in the art will appreciate, that zeta-potential of the aminated MaSp-based fibers is pH dependent; so that the aminated MaSp-based fibers have a positive zeta-potential at a pH below the pKa of the corresponding amine, wherein the pKa value refers to the pKa of the conjugated acid.

Furthermore, the inventors utilized various MaSp-based fibers for the hair coloring compositions. A stable hair coating has been obtained by using aminated MaSp-based protein and aminated mutant MaSp-based protein.

In some embodiments, the coating is stable upon successive washings (e.g. after 2, 4, 6, 8, 10, 15, 20 washings including any range therebetween). In some embodiments, the coating is characterized by a reduced degradation (e.g. bleaching) compared to a control.

In some embodiments, the present invention is directed to a kit including the cosmeceutical composition. In certain embodiments, the cosmeceutical composition is comprised in a container. The container can be a bottle, dispenser, or package. The container can dispense a pre-determined amount of the composition. In certain aspects, the compositions is dispensed in a spray, dollop, or liquid. The container can include indicia on its surface. The indicia can be a word, an abbreviation, a picture, or a symbol.

Cosmeceutical Composition (Pristine MaSp-Based Fibers)

In another aspect of the invention, there is cosmeceutical composition comprising the MaSp-based polymer or the MaSp-based fiber of the invention (e.g. pristine MaSp-based polymer of the invention, and/or the derivatized MaSp-based polymer of the invention) and a cosmetic active ingredient encapsulated or bound thereto. As used herein, the term "MaSp-based polymer" and the term "MaSp-based fiber" are used herein interchangeably.

In some embodiments, the cosmeceutical composition of the invention comprises an effective amount of the MaSp-based fiber or of the derivatized porous MaSp-based fiber. In some embodiments, the cosmeceutical composition of the invention comprises a cosmeceutical effective amount of the MaSp-based fiber or of the derivatized porous MaSp-based fiber. In some embodiments, the cosmeceutical composition of the invention comprises a cosmeceutical effective amount of the MaSp-based fiber and a cosmeceutical effective amount of a cosmetic active ingredient bound thereto.

In some embodiments, the composition of the invention is a cosmeceutical composition further comprising a cosmetically acceptable carrier. In some embodiments, the term "composition of the invention" and the term "cosmeceutical composition of the invention" are used herein interchangeably.

In some embodiments, the composition of the invention is formulated for application to a skin or to a hair of a subject in need thereof.

In some embodiments, a weight per weight (w/w) concentration of the cosmetic active ingredient within the composition is between 1 and 95%. In some embodiments, w/w concentration of the cosmetic active ingredient within the composition is between 1 and 5%, between 5 and 10%, between 10 and 15%, between 15 and 20%, between 20 and 30%, between 30 and 35%, between 35 and 40%, between 40 and 45%, between 45 and 50%, between 50 and 55%, between 55 and 60%, between 60 and 65%, between 65 and 70%, between 70 and 80%, between 80 and 90%, between 90 and 95%, including any range or value therebetween.

In some embodiments, the cosmetic active ingredient is in contact with or bound to the MaSp-based fiber. In some embodiments, the polymer enriched with the cosmetic active ingredient is physically bound to the MaSp-based fiber. In some embodiments, the cosmetic active ingredient fills at least a portion of the pores on or within the MaSp-based fiber. In some embodiments, the cosmetic active ingredient is encapsulated by the MaSp-based fiber. In some embodiments, the cosmetic active ingredient is in contact with or bound to the fibrils. In some embodiments, the cosmetic active ingredient is encapsulated by an intertwisted structure (also used herein as a "matrix") of the particle. In some embodiments, the cosmetic active ingredient is encapsulated by the particle. In some embodiments, the cosmetic active ingredient is incorporated within the MaSp-based fiber. In some embodiments, the cosmetic active ingredient is embedded within the MaSp-based fiber. In some embodiments, the cosmetic active ingredient is embedded within the matrix. In some embodiments, the matrix is doped by the cosmetic active ingredient. In some embodiments, the cosmetic active ingredient is located within the plurality of pores. In some embodiments, the cosmetic active ingredient is located between the fibrils. In some embodiments, the cosmetic active ingredient is located within a lumen, wherein the lumen is defined by intertwisted fibers of the matrix. In some embodiments, the cosmetic active ingredient is encapsulated by the fibrils.

In some embodiments, bound is via a non-covalent bond, a physical interaction or both.

In some embodiments, the cosmetic active ingredient fills 20% to 100% of the volume of the pores. In some embodiments, the cosmetic active ingredient fill 55% to 100%, 60% to 100%, 55% to 100%, 70% to 100%, 75% to 100%, 80% to 100%, 85% to 100%, 90% to 100%, 95% to 100%, 50% to 99%, 50% to 98%, 50% to 97%, 50% to 95%, 50% to 90%, 70% to 90%, or 70% to 95% of the volume of the pores, including any range therebetween.

In some embodiments, the cosmetic active ingredient fills 20% to 100% of the volume (e.g. lumen) of the particle. In some embodiments, the cosmetic active ingredient fill 55% to 100%, 60% to 100%, 55% to 100%, 70% to 100%, 75% to 100%, 80% to 100%, 85% to 100%, 90% to 100%, 95% to 100%, 50% to 99%, 50% to 98%, 50% to 97%, 50% to 95%, 50% to 90%, 70% to 90%, or 70% to 95% of the volume of the particle, including any range therebetween.

In some embodiments, the content of the MaSp-based fiber or of the derivatized MaSp-based fiber within the composition of the invention is 20% to 60% (w/w). In some embodiments, the content of the first polymer and the first polymer is 25% to 60% (w/w), 30% to 60% (w/w), 35% to 60% (w/w), 30% to 40% (w/w), 40% to 60% (w/w), 40% to 50% (w/w), 50% to 60% (w/w), 40% to 45% (w/w), 45% to 50% (w/w), 50% to 55% (w/w), 55% to 60% (w/w), 20% to 55% (w/w), or 20% to 50% (w/w), including any range therebetween.

In some embodiments, the content of the MaSp-based fiber within the composition is 60% to 95% (w/w), from 60 to 70% w/w, from 70 to 75% w/w, from 75 to 80% w/w, from 80 to 85% w/w, from 85 to 90% w/w, from 90 to 92% w/w, from 92 to 95% w/w, from 95 to 97% w/w including any range or value therebetween.

In some embodiments, the content of the MaSp-based fiber or of the derivatized MaSp-based fiber within the composition of the invention (e.g. cosmeceutical composition) is from 0.1% to 20% (w/w), from 0.1 to 0.5% w/w, from 0.5 to 1% w/w, from 1 to 5% w/w, from 5 to 10% w/w, from 10 to 15 w/w, from 15 to 20% w/w, including any range or value therebetween.

In some embodiments, a w/w ratio of the cosmetic active ingredient to the MaSp-based fiber within the composition of the invention is from 10:1 to 1:10, from 10:1 to 8:1, from 8:1 to 6:1, from 6:1 to 4:1, from 4:1 to 3:1, from 3:1 to 2:1, from 2:1 to 1:1, from 1:1 to 1:2, from 1:2 to 1:3, from 1:3 to 1:5, from 1:5 to 1:10 including any range therebetween.

In some embodiments, a w/w ratio of the cosmetic active ingredient to the MaSp-based fiber within the composition is at most 6:1, at most 5:1, at most 4:1, at most 3:1, at most 2:1, and at most 1:1 including any range therebetween.

In some embodiments, the composition of the invention is a solid composition. In some embodiments, the composition of the invention is in a form of a pellet or a powder. In some embodiments, the composition of the invention is in a form of a film. In some embodiments, the composition of the invention is in a form of a semisolid (e.g. a gel or a hydrogel). In some embodiments, the composition of the invention is substantially homogenous. In some embodiments, the cosmetic active ingredient and the MaSp-based fiber are mixed homogenously within the composition. In some embodiments, the composition (e.g. the solid composition) is substantially devoid of a solvent, a surfactant, a carrier, a particle or a combination thereof, wherein substantially is at least 80%, at least 90%, at least 92%, at least 95%, at least 97%, at least 98%, at least 99% by weight of the composition In some embodiments, the composition of the invention further comprises between 0.1 and 95% of any one of a solvent, a film-forming agent, a pigment, a dye, a stabilizer, an oil, and a thickener or any combination thereof.

In some embodiments, the composition of the invention further comprises a solvent. In some embodiments, the w/w content of the solvent within the composition is between 10 and 90%, between 10 and 20%, between 20 and 30%, between 30 and 40%, between 40 and 50%, between 50 and 60%, between 60 and 70%, between 70 and 80%, between 80 and 90%, between 90 and 95%, including any range or value therebetween.

In some embodiments, the solvent is an aqueous or an organic solvent. In some embodiments, the organic solvent is as described herein.

In some embodiments, the composition of the invention is a liquid or a semi-liquid composition. In some embodiments, the liquid or a semi-liquid composition is characterized by a viscosity at 25° C. of between 50 and 3000 cP, between 50 and 100 cP, between 100 and 300 cP, between 300 and 500 cP, between 500 and 1000 cP, between 1000 and 2000 cP, between 2000 and 3000 cP, including any range therebetween.

In some embodiments, the composition of the invention (e.g. the liquid composition) is selected from a solution, a dispersion, an emulsion, a gel, a hydrogel, a semi-liquid, and a foam or a combination thereof. In some embodiments, the composition (e.g. the liquid composition) is substantially devoid of a solvent, a surfactant, a carrier, a particle or a combination thereof, wherein substantially is at least 80%, at least 90%, at least 92%, at least 95%, at least 97%, at least 98%, at least 99% by weight of the composition including any range or value therebetween.

In some embodiments, the composition of the invention (e.g. the liquid composition) further comprises a film-forming agent. In some embodiments, the w/w content of the film-forming agent within the composition is between 0.1 and 20%, between 0.1 and 1%, between 1 and 2%, between 2 and 5%, between 5 and 7%, between 4 and 6%, between 6 and 8%, between 8 and 10%, between 10 and 12%, between 12 and 15%, between 15 and 20%, including any range or value therebetween. In some embodiments, the film-forming agent is selected from a liquid film-forming agent and/or a solid film-forming agent. In some embodiments, the film-forming agent is a solid film-forming agent.

Non-limiting examples of film forming agents include but are not limited to polyvinyl alcohol (PVA), polyvinylpyrrolidone (PVP), polyvinyl acetate, polyalkyl acrylate; dextrin, cellulose derivatives such as alkyl cellulose and nitrocellulose, siliconized polysaccharides such as pullulan tri (trimethylsiloxy)silylpropylcarbamate; pullulan, agave-based polysaccharide, a polyphenol, a gum; intansyl, acrylic-silicone graft copolymers such as alkyl acrylate-dimethicone copolymers, a mineral oil, a petroleum-based oil, a vegatble oil, silicone resins such as trimethylsiloxysilicic acid, silicone-modified polynorbonene, silicone resins such as fluorine-modified silicone resins, fluorocarbon resins, aromatic hydrocarbon resins, polymer emulsion resins, terpene resins, polybutene, polyisoprene, alkyd resins, polyvinylpyrrolidone-modified polymers, rosin-modified resins and polyurethanes or any combination thereof.

Other non-limiting examples of film forming agents include but are not limited to pullulan tri(trimethylsiloxy) silylpropylcarbamate (e.g. TSPL-30-D5), alkyl acrylate-dimethicone copolymers (e.g. KP-543, 545, 549, 550 and 545L), trimethylsiloxysilicic acid (e.g. KF-7312) and X-21-5250), and silicone-modified polynorbonene or any combination thereof.

In some embodiments, the film-forming agent is in a form of a purified compound, a plant extract, at least partially enriched plant extract or any combination thereof. In some embodiments, the film-forming agent at an appropriate concentration within the composition provides pliability thereto. In some embodiments, the film-forming agent at an appropriate concentration enables applying (e.g. by spreading) the composition on the skin of a subject. In some embodiments, the film-forming agent at an appropriate concentration facilitates film forming properties of the composition. In some embodiments, the appropriate concentration of the film-forming agent is as described herein. Exemplary compositions comprising the film-forming agent are provided in the Examples section.

In some embodiments, the composition of the invention (e.g. the liquid composition) further comprises a thickener. In some embodiments, the w/w content of the thickener within the composition is 1 and 20%, between 1 and 2%, between 2 and 5%, between 5 and 7%, between 4 and 6%, between 6 and 8%, between 8 and 10%, between 10 and 12%, between 12 and 15%, between 15 and 20%, between 20 and 30%, between 30 and 40%, between 40 and 50%, between 50 and 60%, between 60 and 70%, between 70 and 80%, between 80 and 90%, between 90 and 95%, including any range or value therebetween. In some embodiments, the thickener provides a predetermined viscosity to the liquid composition.

In some embodiments, the composition comprises the MaSp-based fiber, the film forming agent, and the cosmetic active ingredient. In some embodiments, the composition comprises between 1 and 20% w/w of the MaSp-based fiber, between 0.1 and 10% w/w of the film forming agent, between 1 and 70% w/w of the cosmetic active ingredient, and optionally between 10 and 95% w/w of the solvent. In some embodiments, the composition comprises between 5 and 15% w/w of the MaSp-based fiber, between 1 and 15% w/w of the film forming agent, between 1 and 50% w/w of the cosmetic active ingredient, and optionally between 50 and 95% w/w of the solvent. In some embodiments, the composition comprises between 1 and 5% of the cosmetic active ingredient (such as an acid selected form alpha-hydroxycarboxylic acid, beta-hydroxycarboxylic acid, citric acid, salicylic acid, etc.). Non-limiting exemplary composition are described in the Examples section hereinbelow.

In some embodiments, the composition further comprises an additive. In some embodiments, the additive is selected from the group consisting of anti-microbial agents, (e.g. methylparaben, propylparaben, butylparaben, ethylparaben, isobutylparaben, etc.), skin conditioning agents (e.g., aloe extracts, allantoin, bisabolol, ceramides, dimethicone, and dipotassium glycyrrhizate).

In some embodiments, the composition is a cosmetic preparation. In some embodiments, the cosmetic preparation comprises ingredients suitable for use in a cosmetic product.

In some embodiments, the cosmeceutical composition of the invention is a solid composition. In some embodiments, the cosmeceutical composition of the invention is in a form of a pellet or a powder. In some embodiments, the cosmeceutical composition of the invention is in a form of a film. In some embodiments, the cosmeceutical composition of the invention is in a form of a semisolid (e.g. a gel or a hydrogel). In some embodiments, the cosmeceutical composition of the invention is substantially homogenous. In some embodiments, the cosmetic active ingredient and the carrier are mixed homogenously within the composition.

In some embodiments, the cosmeceutical composition (e.g. the solid composition) is substantially devoid of at least one of a solvent, a surfactant, a carrier, a particle or a combination thereof, wherein substantially is at least 80%, at least 90%, at least 92%, at least 95%, at least 97%, at least 98%, at least 99% by weight of the composition.

In some embodiments, the cosmeceutical composition of the invention further comprises between 0.1 and 95% of any one of a solvent, a film-forming agent, a pigment, a dye, a stabilizer, an oil, and a thickener or any combination thereof.

In some embodiments, the cosmeceutical composition of the invention further comprises a solvent. In some embodiments, the w/w content of the solvent within the composition is between 10 and 90%, between 10 and 20%, between 20 and 30%, between 30 and 40%, between 40 and 50%, between 50 and 60%, between 60 and 70%, between 70 and 80%, between 80 and 90%, between 90 and 95%, including any range or value therebetween.

In some embodiments, the solvent is an aqueous or an organic solvent. In some embodiments, the organic solvent is as described herein.

In some embodiments, the cosmeceutical composition of the invention is a liquid or a semi-liquid composition. In some embodiments, the liquid or a semi-liquid composition is characterized by a viscosity at 25° C. of between 50 and 3000 cP, between 50 and 100 cP, between 100 and 300 cP, between 300 and 500 cP, between 500 and 1000 cP, between 1000 and 2000 cP, between 2000 and 3000 cP, including any range therebetween.

In some embodiments, the cosmeceutical composition of the invention (e.g. the liquid composition) is selected from a solution, a dispersion, an emulsion, a gel, a hydrogel, a semi-liquid, and a foam or a combination thereof. In some embodiments, the composition (e.g. the liquid composition) is substantially devoid of a solvent, a surfactant, a carrier, a particle or a combination thereof, wherein substantially is at least 80%, at least 90%, at least 92%, at least 95%, at least 97%, at least 98%, at least 99% by weight of the composition including any range or value therebetween.

In some embodiments, the cosmeceutical composition of the invention (e.g. the liquid composition) further comprises a thickener. In some embodiments, the w/w content of the thickener within the composition is 1 and 20%, between 1 and 2%, between 2 and 5%, between 5 and 7%, between 4 and 6%, between 6 and 8%, between 8 and 10%, between 10 and 12%, between 12 and 15%, between 15 and 20%, between 20 and 30%, between 30 and 40%, between 40 and 50%, between 50 and 60%, between 60 and 70%, between 70 and 80%, between 80 and 90%, between 90 and 95%, including any range or value therebetween. In some embodiments, the thickener provides a predetermined viscosity to the liquid composition.

In some embodiments, the cosmeceutical composition further comprises an additive. In some embodiments, the additive is selected from the group consisting of anti-microbial agents, (e.g. methylparaben, propylparaben, butylparaben, ethylparaben, isobutylparaben, etc.), skin conditioning agents (e.g., aloe extracts, allantoin, bisabolol, ceramides, dimethicone, and dipotassium glycyrrhizate).

In some embodiments, the cosmeceutical composition is a cosmetic preparation. In some embodiments, the cosmetic preparation comprises ingredients suitable for use in a cosmetic product.

In some embodiments, the cosmeceutical composition is a sunscreen composition. In some embodiments, the sunscreen composition is for absorbing at least a portion of UV radiation. In some embodiments, the sunscreen composition is for reducing UV exposure to a skin and/or to a hair of a subject.

In some embodiments, reducing UV exposure by at least 20%, at least 30%, at least 50%, at least 70%, at least 90%, at least 95%, at least 99%, including any range therebetween.

In some embodiments, the sunscreen composition is characterized by SPF value of between 1 and 100, between 1 and 10, between 10 and 20, between 20 and 30, between 30 and 40, between 40 and 50, between 50 and 60, between 60 and 70, between 70 and 100, including any range therebetween.

In some embodiments, the effective amount comprises an amount of the MaSp-based fiber of the invention sufficient for obtaining a reduction of UV exposure, wherein reduction is as described herein. In some embodiments, the effective amount comprises a w/w concentration of the MaSp-based fiber of the invention within the sunscreen composition being between 0.01 and 95%, between 0.01 and 0.1%, between 0.1 and 0.5%, between 0.5 and 0.1%, between 0.1 and 0.5%, between 0.5 and 1%, between 1 and 5%, between 5 and 10%, between 10 and 20%, between 20 and 30%, between 30 and 50%, between 50 and 70%, between 70 and 80%, between 80 and 90%, between 90 and 95%, including any range therebetween.

In some embodiments, the cosmeceutical composition is formulated for application to a hair of the subject, also used herein as the "hair composition". In some embodiments, the hair composition comprising an effective amount of the MaSp-based fiber of the invention bound to a dye and/or to a pigment. In some embodiments, the cosmeceutical composition is a hair composition comprising an effective amount of the derivatized porous MaSp-based fiber of the invention bound to a dye and/or to a pigment.

In some embodiments, the hair composition comprises an effective amount of the MaSp-based fiber of the invention bound to a dye and/or to a pigment, wherein bound is via a covalent or a non-covalent bond. In some embodiments, the hair composition comprises any derivatized MaSp-based fiber (e.g. porous and/or non-porous MaSp-based fiber) covalently bound to a functional group (e.g. positively or negatively charged group) as described herein. In some embodiments, the MaSp-based fiber bound to a dye and/or to a pigment remains stable within the hair composition.

In some embodiments, the hair composition comprises the MaSp-based fiber of the invention bound to a dye or to a pigment as the cosmetic active ingredient.

In some embodiments, the effective amount comprises a w/w concentration of the MaSp-based fiber (e.g. derivatized or pristine porous MaSp-based fiber) within the hair composition being between 50 and 99.99% w/w, between 50 and 60% w/w, between 60 and 70% w/w, between 70 and 80% w/w, between 80 and 90% w/w, between 90 and 92% w/w, between 92 and 95% w/w, between 95 and 97% w/w, between 97 and 99% w/w, between 99 and 99.9% w/w, including any range therebetween.

In some embodiments, the effective amount comprises a w/w concentration of the MaSp-based fiber within the hair composition being between 0.01 and 95%, between 0.01 and 0.1%, between 0.1 and 0.5%, between 0.5 and 0.1%, between 0.1 and 0.5%, between 0.5 and 1%, between 1 and 5%, between 5 and 10%, between 10 and 20%, between 20 and 30%, between 30 and 50%, between 50 and 70%, between 70 and 80%, between 80 and 90%, between 90 and 95%, including any range therebetween.

In some embodiments, the hair composition is characterized by a pH value between 3 and 7, between 3 and 4, between 4 and 5, between 5 and 6, between 6 and 7, including any range therebetween.

Figure 1B:

In some embodiments, the hair composition is for coloring a hair of a subject. In some embodiments, the hair composition stably adheres to a hair of a subject in need thereof. In some embodiments, the hair is a damaged hair. In some embodiments, the hair composition has an increased affinity to a damaged hair of the subject, compared to a non-damaged hair, as represented by FIG. 1.

Without being bound to any particular theory or mechanism, it is postulated that the damaged human hair (bleached or non-bleached) is negatively charged. Thus, it is expected, that a composition (e.g. the hair composition of the invention) comprising a positively charged polymer will attract to the negatively charged damaged hair (e.g. via electrostatic interactions), thereby forming a coating thereon.

As used herein, the term "damaged hair" refers to any physical hair damage, such as to a damage to hair scales/cuticles. In some embodiments, the hair scales/cuticles of the damaged hair are jagged, with some of them lifted or broken. In some embodiments, the external layer of the damaged hair is scraped off and the internal cortex is unprotected and vulnerable to damage in some areas of the hair fiber. In some embodiments, the external layer of the damaged hair is almost completely removed, wherein the cortex is exposed and/or weakened. A damaged hair may be characterized by a rough texture, with a dull appearance, an uneven color balance, or with a faded color. Furthermore, a damaged hair may be characterized by the split ends.

In some embodiments, the hair composition provides a hair coating. In some embodiments, the hair composition is capable of providing a stable coating for a hair. In some embodiments, the hair composition reduces or prevents degradation (e.g. chemical degradation or photo bleaching) of the dye and/or pigment.

In some embodiments, the hair composition prevents or reduces hair damage.

In some embodiments, the coating is stable for at least 1 days (d), at least 5 d, at least 10 d, at least 15 d, at least 20 d, at least 25 d, at least 30 d, including any range therebetween.

The inventors successfully implemented various derivatized and pristine porous MaSp-based fibers in hair compositions (such as the hair compositions described herein). Some of these hair compositions resulted in a uniform and stable hair coating, upon contacting the hair composition with hair (e.g. human hair). Exemplary hair composition which have been successfully implemented for hair coating (see for example FIGS. 1 to 9) include aminated MaSp-based fiber (e.g. chemically modified by 4-(2-aminoethyl) aniline; 3-amonipropyltriethoxysilane or by PEI). One skilled in the art will appreciate, that zeta-potential of the aminated MaSp-based fibers is pH dependent; so that the aminated MaSp-based fibers have a positive zeta-potential at a pH below the pKa of the corresponding amine, wherein the pKa value refers to the pKa of the conjugated acid.

In some embodiments, the hair composition comprises between 0.5 and 5% w/w of the aminated MaSp-based fiber, wherein aminated is as described herein. In some embodiments, the hair composition comprises between 2.5 and 5% w/w of the aminated MaSp-based fiber.

Furthermore, the inventors utilized various MaSp-based fibers for the hair compositions. A stable hair coating has been obtained by using aminated MaSp-based protein and aminated mutant MaSp-based protein.

In some embodiments, the hair composition prevents or reduces a damage to a hair, wherein the damage is related to the exposure to a condition selected from UV radiation, thermal radiation, an environmental pollutant, an oxidizing agent, a reducing agent, an irritant, or any combination thereof. In some embodiments, prevention or reduction is by at least 20%, at least 30%, at least 50%, at least 70%, at least 90%, at least 95%, at least 99%, compared to a control including any range therebetween. In some embodiments, the control is a pristine (e.g. untreated hair). In some embodiments, the control comprises a hair treated by a commercially available hair composition.

In some embodiments, the hair composition substantially retains an initial physical property (e.g. mechanical strength) of the hair upon contacting therewith, wherein substantially is as described herein.

Figure 2:
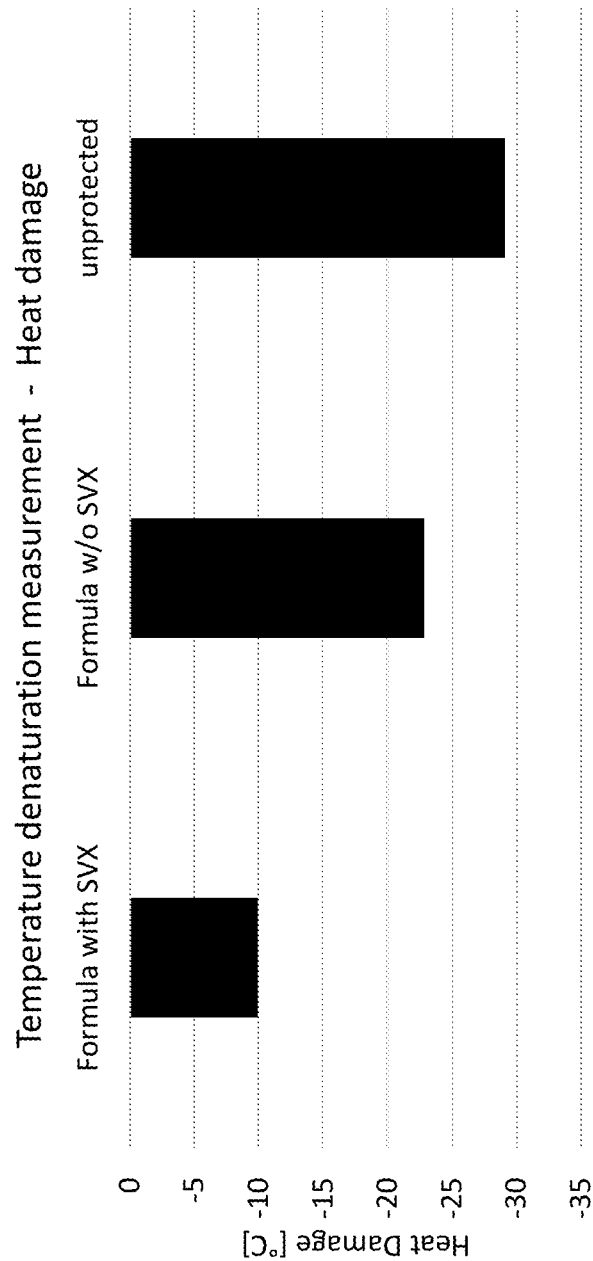
FIG. 2 is a bar graph representing the effect of thermal exposure on the tensile strength of the human hair treated with an exemplary hair composition of the invention comprising 1-10% w/w of an aminated MaSp-based fiber (Formula with SVX), compared to an untreated hair (unprotected) and to hair treated by a carrier (Formula w/o SVX). The results show a superior tensile strength of the human hair treated with an exemplary hair composition of the invention, following 200 cycles of heat treatment at 220° C., compared to the controls.

In some embodiments, the hair composition prevents or reduces a damage to a hair upon exposure to a thermal radiation (e.g. a temperature of about 200° C.), as demonstrated by FIG. 2.

Figure 3:
FIG. 3 is a bar graph representing the effect of thermal exposure on the moisture content of the human hair treated with an exemplary hair composition of the invention comprising 1-10% w/w of an aminated SVX fiber, compared to an untreated hair. The results show a superior water retention of the human hair treated with an exemplary hair composition of the invention, following 200 cycles of heat treatment at 220° C., compared to the controls.

In some embodiments, the hair composition substantially retains a water content of the hair upon contacting therewith, as demonstrated by FIG. 3.

Figure 4:
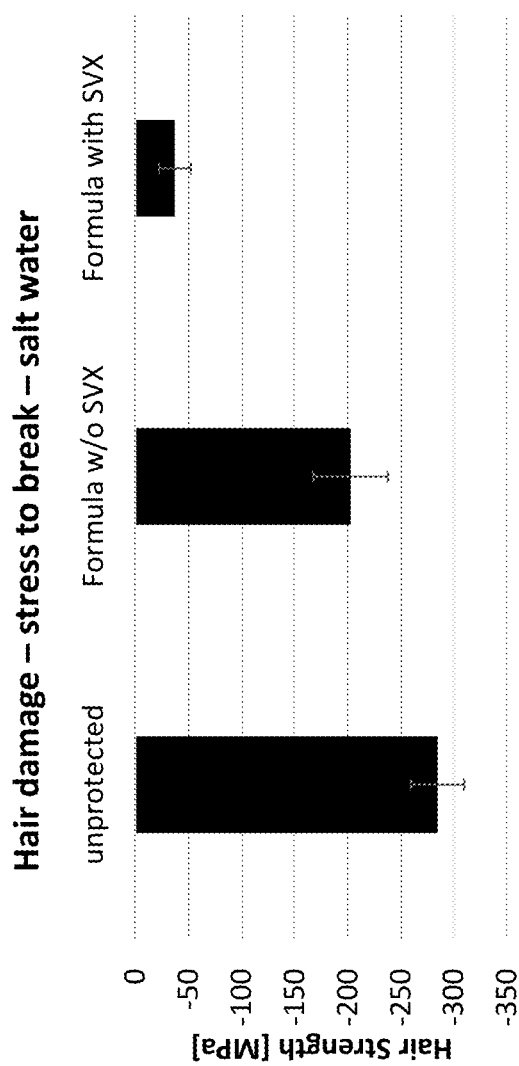
FIG. 4 is a bar graph representing the tensile strength of the human hair treated with an exemplary hair composition of the invention comprising 1-10% w/w of an aminated SVX fiber vs. untreated hair, upon exposure thereof to a sea water or to a chlorinated water. The results show a superior tensile strength of the human hair treated with an exemplary hair composition of the invention after exposure to sea/pool water for 3 days, compared to the controls.

In some embodiments, the hair composition prevents or reduces a damage to a hair upon exposure to a hair damaging chemical composition, such as an oxidizing or a reducing agent (e.g. chlorine, an aqueous hypochlorite solution), seawater or any combination thereof. FIG. 4 exemplifies retention of the mechanical strength of the hair treated with the hair composition of the invention upon exposure to chlorinated water and/or seawater.

Figure 5A:
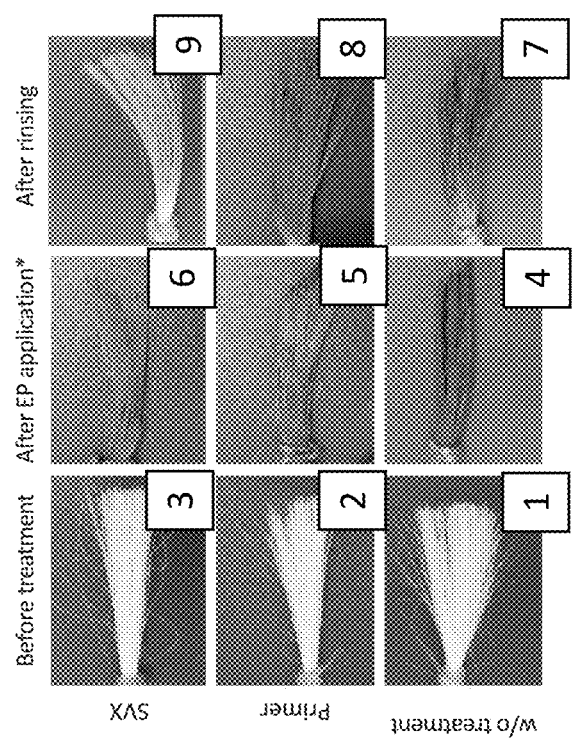
FIGS. 5A-B are bar graphs (FIG. 5B) and images (FIG. 5A) representing a pollution repellent effect of the human hair treated with an exemplary hair composition of the invention comprising 1-10% w/w of an aminated SVX fiber (3, 6, 9), vs. untreated hair (1, 4, 7), and hair treated with a carrier (2, 5, 8) upon exposure thereof to an environmental pollutant (e.g. carbon black). The results show a superior pollution repellent effect of the human hair treated with an exemplary hair composition of the invention, compared to the controls.
Figure 5B:
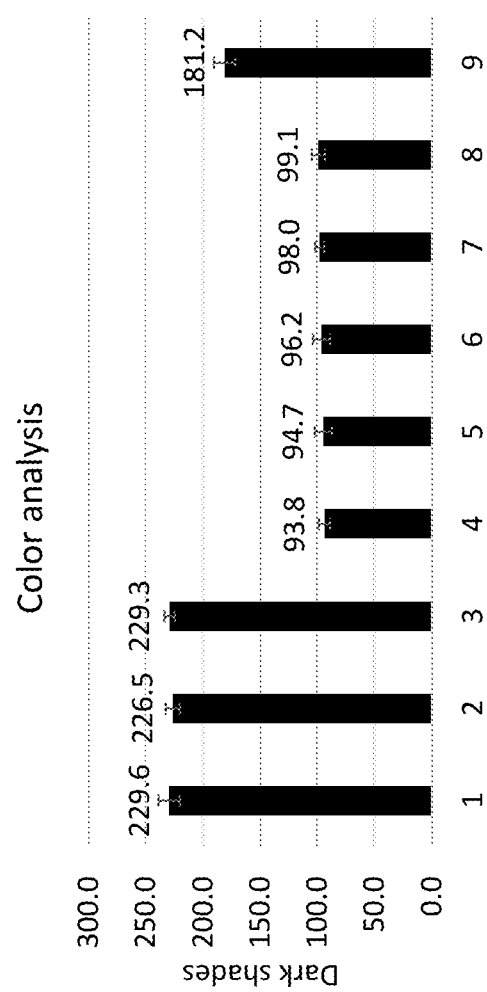

In some embodiments, the hair composition prevents or reduces a damage to a hair upon exposure to an environmental pollutant, e.g. dust, as exemplified by FIG. 5.

Figures 6A, 6B:
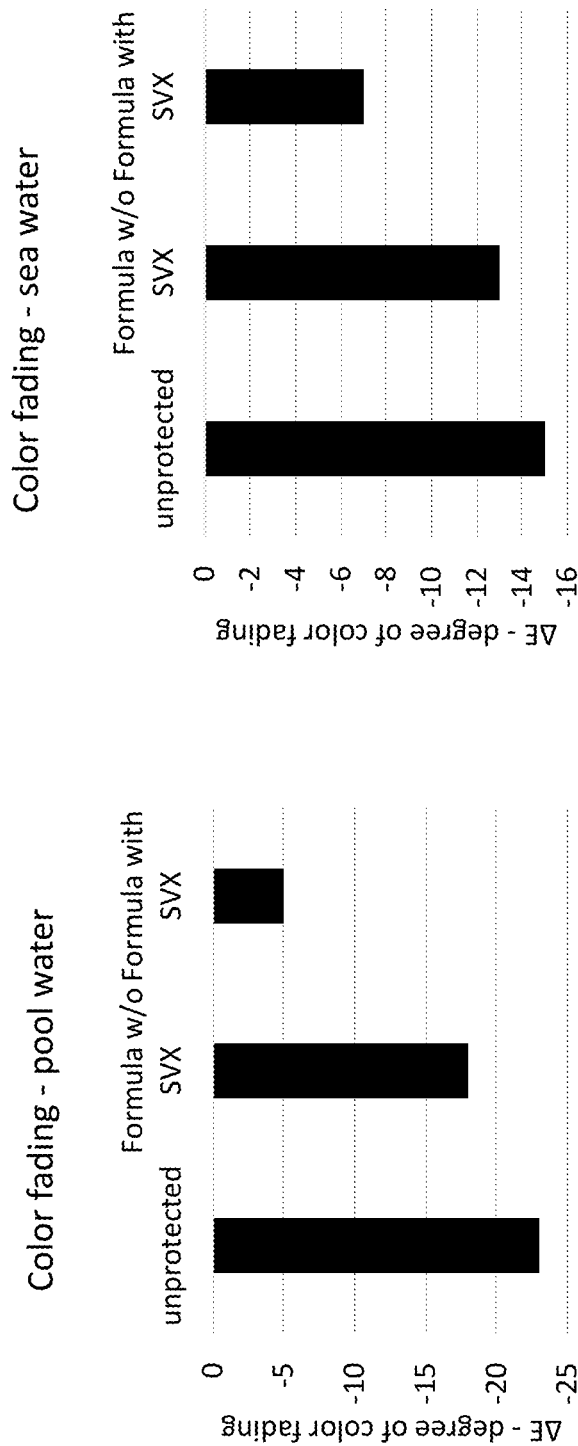
FIGS. 6A-B are bar graphs representing color retention of the human hair treated with an exemplary hair composition of the invention comprising 1-10% w/w of an aminated SVX fiber vs. untreated hair, upon exposure thereof to a sea water (FIG. 6B) or to a chlorinated water (FIG. 6A). Hair samples treated by the composition of the invention showed only minimal fading, compared to almost five times greater fading of the controls.
Figure 7:
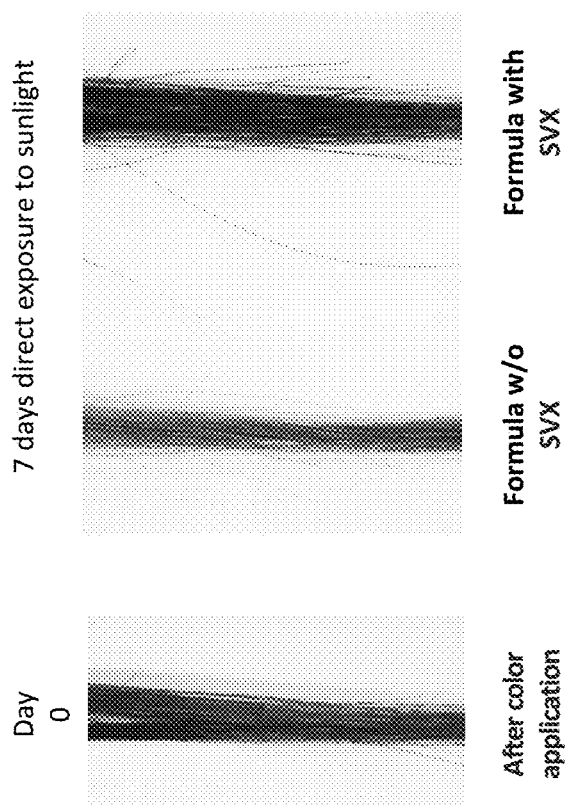
FIG. 7 are images representing color retention of the human hair treated with an exemplary hair composition of the invention comprising 1-10% w/w of an aminated SVX fiber vs. untreated hair, upon exposure thereof to UV radiation for 7 days. SVX provides protection against UV light and free radicals (from UV radiation). Day 0 is a colored hair unexposed to UV light.

In some embodiments, the hair composition prevents or reduces color fading or bleaching of the colored or of the non-colored hair (e.g. upon exposure to a chemical composition, such as an oxidizing or a reducing agent, and/or seawater; upon exposure to UV radiation), as exemplified by FIGS. 6 and 7. In some embodiments, the hair composition prevents or reduces oxidation of the treated hair.

In some embodiments, the coating is stable upon successive washings (e.g. after 2, 4, 6, 8, 10, 15, 20 washings including nay range therebetween). In some embodiments, the coating is characterized by a reduced degradation (e.g. bleaching) compared to a control, as exemplified by FIGS. 6 and 7.

Figure 8:
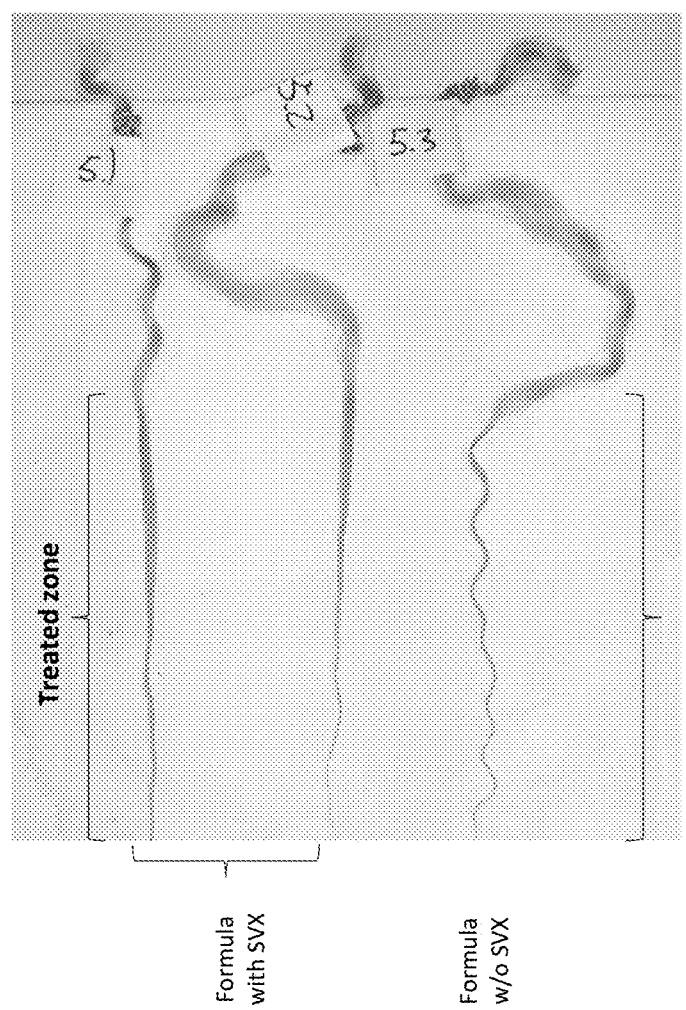
FIG. 8 is an image representing straightening effect of the human hair treated with an exemplary hair composition of the invention comprising about 5% w/w of an aminated SVX fiber vs. untreated hair. SVX coating of curly hair shows straightening effect even without the need for additional heat and chemical treatments.
Figure 9:
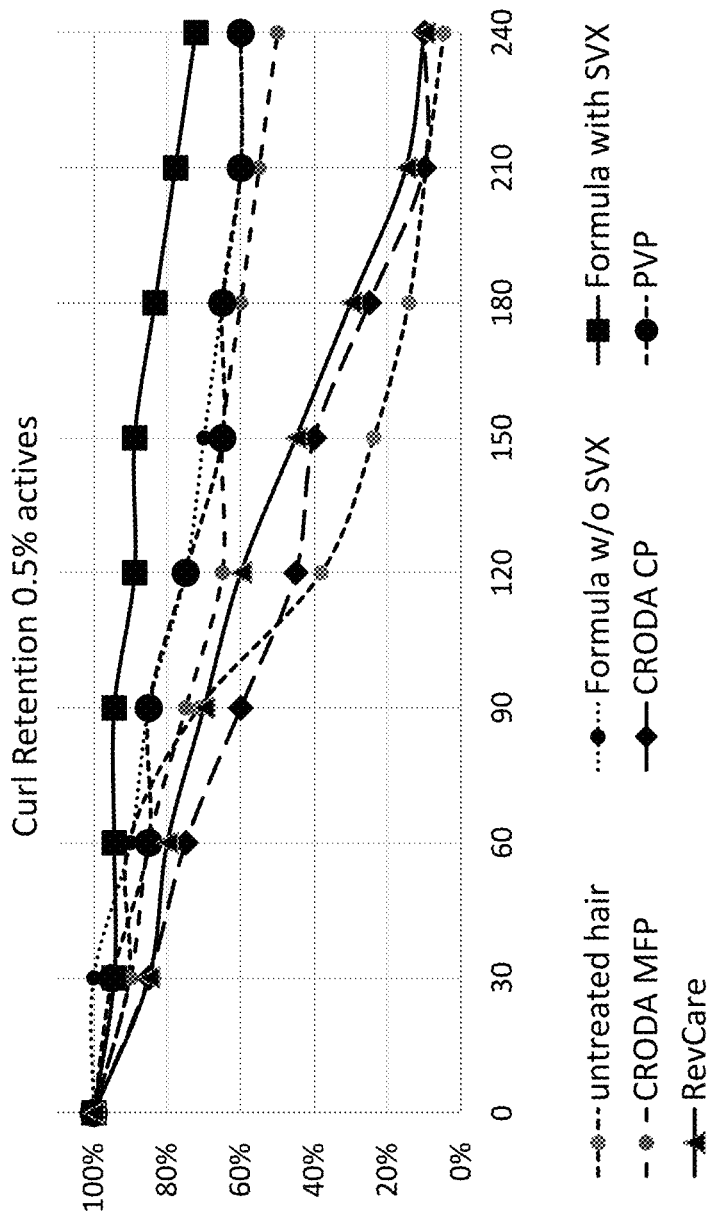
FIG. 9 is a bar graph representing curling effect of the human hair treated with an exemplary hair composition of the invention comprising about 0.5% w/w of an aminated SVX fiber vs. human hair treated with commercially available compositions (Croda MFP, Croda CP, PVP, RevCare). Untreated hair was used as a negative control. As represented by the graph, the hair composition of the invention is characterized by an increased hair curling retention over time, compared to commercially available compositions and to the untreated control.
Figure 10:
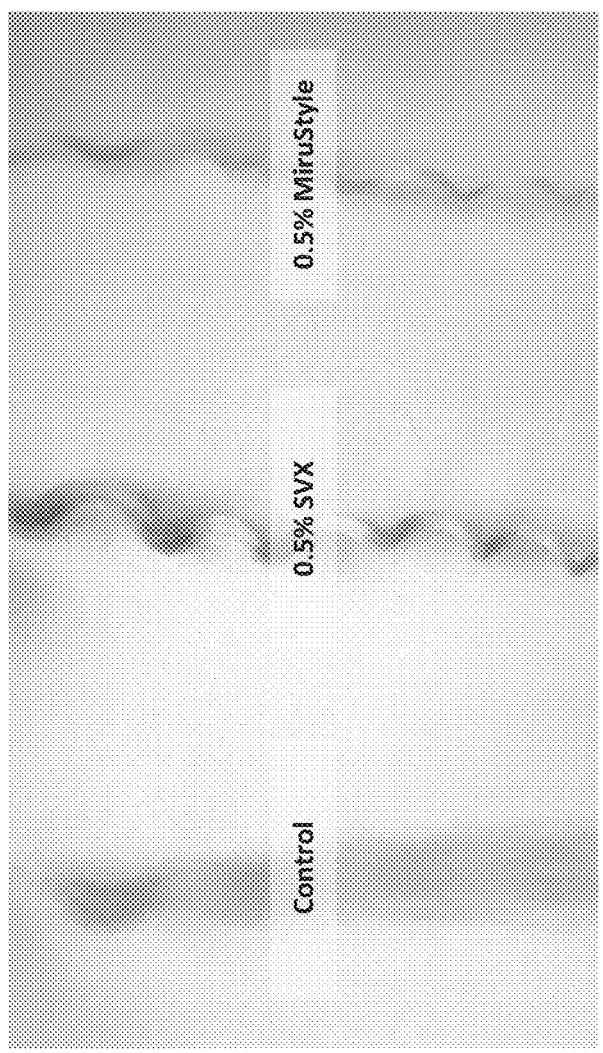
FIG. 10 is an image representing curling effect of the human hair treated with an exemplary hair composition of the invention comprising about 0.5% w/w of pristine MaSp-based fibers (SVX) vs. untreated hair. Coating of curly hair with SVX enhances curl design even without the need for additional heat treatment.

In some embodiments, the hair composition modifies a shape of the hair in contact therewith (e.g. hair straightening or hair curling), as exemplified by FIGS. 8 and 9. In some embodiments, the hair composition substantially retains a shape of the hair in contact therewith, wherein the hair composition comprises between 0.2 and 0.7% w/w of the MaSp-based protein of the invention (e.g. aminated MaSp-based protein, or of the unmodified or pristine MaSp-based protein), as exemplified by FIGS. 9 and 10 respectively. In some embodiments, the hair composition induces curling of the hair in contact therewith.

In some embodiments, the composition of the invention are substantially stable within the cosmeceutical composition.

In some embodiments, the cosmeceutical composition is biocompatible. In some embodiments, the cosmeceutical composition enhances bioaccessibility of a hydrophobic or a hydrophilic cosmetic active ingredient. In some embodiments, the cosmeceutical composition enhances bioaccessibility of a compound within a subject, wherein the compound is a cosmetic active ingredient selected from a polysaccharide, an alpha-hydroxy carboxylic acid, a humectant, etc. (as exemplified hereinbelow). The term "bioaccessibility" as used herein, is directed to ability to release the cosmetic active ingredient in-vitro by any one of the compositions of the present invention. The in-vitro release can be evaluated by using a skin tape test (as described in the Examples section).

In some embodiments, the cosmeceutical composition increases bioavailability and/or bioaccessibility of the cosmetic active ingredient. In some embodiments, the derivatized MaSp-based fiber substantially reduces degradation of the cosmetic active ingredient embedded therewithin.

In some embodiments, the cosmeceutical composition of the present invention is in a form of a cosmetic product. In some embodiments, the cosmeceutical composition of the present invention is in a form of topically spreadable compositions, sprayable compositions, aerosolized compositions, injectable compositions, edible compositions, compositions in tablet, gel cap, or pill form.

In some embodiments, the cosmeceutical composition comprises between 0.1 and 20% by weight of the MaSp-based fiber of the invention. In some embodiments, the cosmeceutical composition comprises between 0.3 and 0.5%, between 0.5 and 1%, between 1 and 5%, between 5 and 10%, between 10 and 15%, by weight of the MaSp-based fiber of the invention. In some embodiments, the cosmeceutical composition comprises between 0.3 and 0.5%, between 0.5 and 1%, between 1 and 5%, between 5 and 10%, between 10 and 15%, by weight of the pristine (e.g. unmodified) MaSp-based fiber of the invention and a cosmetically acceptable carrier.

In some embodiments, the composition is characterized by a prolonged release of the cosmetic active ingredient from the composition, compared to a control. In some embodiments, the composition is characterized by a gradual release of the cosmetic active ingredient therefrom. In some embodiments, the composition is characterized by a sustained release of the cosmetic active ingredient therefrom.

In some embodiments, the cosmetic active ingredient is released under physiological conditions. In some embodiments, the cosmetic active ingredient is released upon contact with skin of a subject. In some embodiments, the cosmetic active ingredient is released in an aqueous solution.

In some embodiments, the release rate of the cosmetic active ingredient from the composition is reduced by at least 10%, compared to a control. In some embodiments, the release rate of the cosmetic active ingredient from the composition is reduced by at least 10%, at least 20%, at least 30%, at least 50%, at least 70%, at least 90%, at least 100%, at least 150%, at least 200%, at least 250%, at least 300%, at least 400%, at least 450%, at least 500%, at least 600%, at least 700%, at least 800%, at least 1000%, including any range or value therebetween.

In some embodiments, the control is a polymer. In some embodiments, the control is devoid of MaSp-based protein. In some embodiments, the control is a silk protein, or a polysaccharide (e.g. cellulose). As exemplified hereinbelow (FIGS. 20, 21 and 22), the composition of the invention is characterized by an improved release profile (i.e. reduced release rate) of the cosmetic active ingredient compared to a control (e.g. cellulose and silk protein).

In some embodiments, the release period is prolonged by at least 50%, at least 100%, at least 200%, at least 300%, at least 400%, at least 500%, at least 600%, at least 700%, at least 800%, at least 1000% compared to a control, including any range or value therebetween.

In some embodiments, the composition is biocompatible. In some embodiments, the composition enhances bioaccessibility of a hydrophobic or a hydrophilic cosmetic active ingredient. In some embodiments, the composition enhances bioaccessibility of a compound within a subject, wherein the compound is a cosmetic active ingredient selected from a polysaccharide, an alpha-hydroxy carboxylic acid, a humectant, etc. (as exemplified hereinbelow). The term "bioaccessibility" as used herein, is directed to ability to release the cosmetic active ingredient in-vitro by any one of the compositions of the present invention. The in-vitro release can be evaluated by using a skin tape test (as described in the Examples section).

Figure 11:
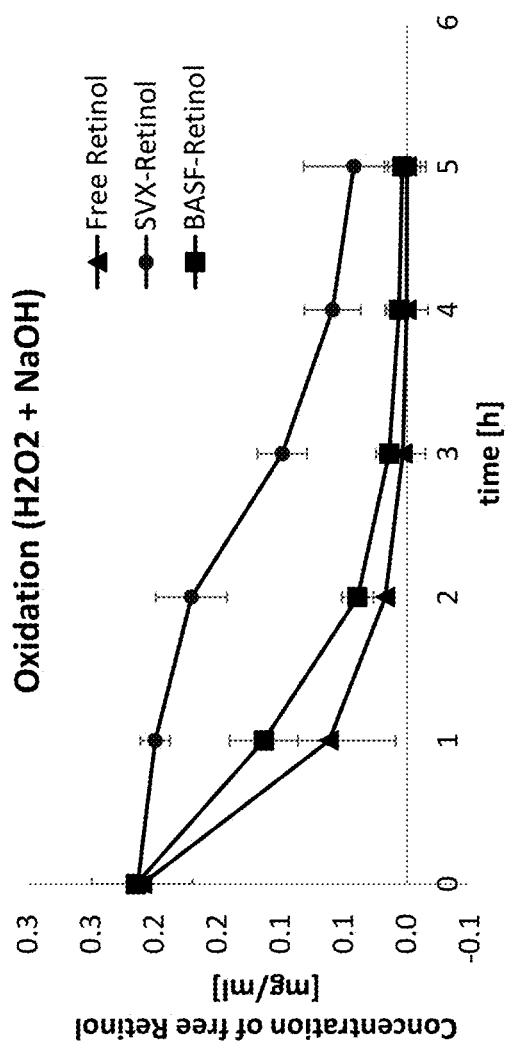
FIG. 11 is a graph representing chemical stability of retinol encapsulated within an exemplary composition of the invention comprising about 0.5% w/w pristine MaSp-based fibers (SVX), compared to commercially available formulations, upon exposure to oxidizer ($H_2O_2$). Retinol encapsulated by SVX is more stable and resistant to oxidative reagent, compared to controls.
Figure 12:
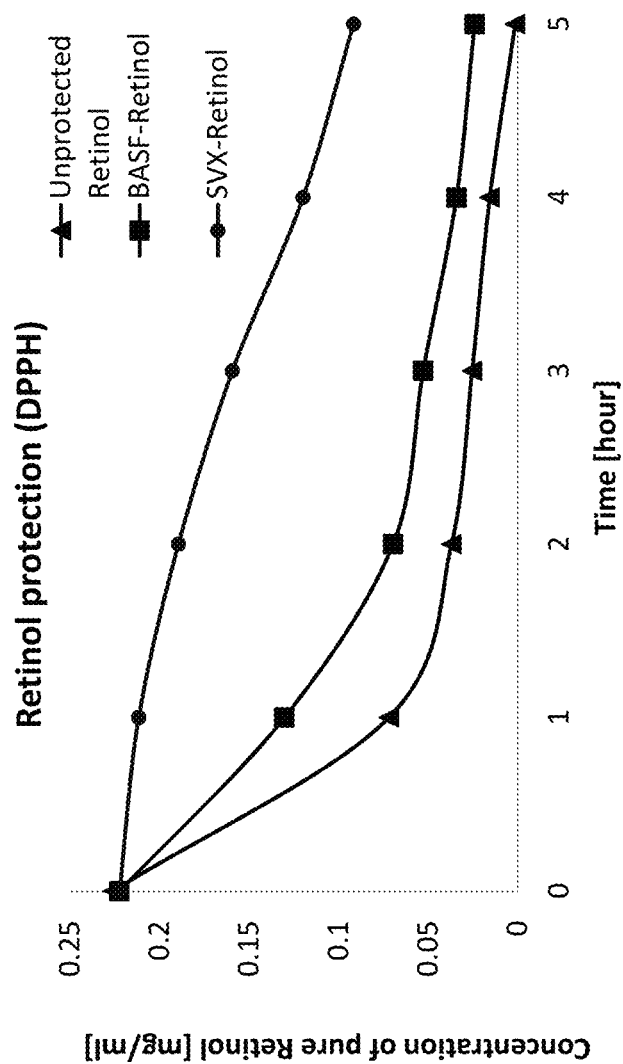
FIG. 12 is a graph representing chemical stability of retinol encapsulated within an exemplary composition of the invention comprising about 0.5% w/w pristine MaSp-based fibers (SVX), compared to commercially available formulations, upon exposure to UV radiation. Retinol encapsulated by SVX is more stable and resistant to UV radiation, compared to controls.

In some embodiments, the composition increases bioavailability and/or bioaccessibility of the cosmetic active ingredient. In some embodiments, the cosmetic active ingredient bound to or encapsulated by the MaSp-based fiber is characterized by increased stability compared to a pristine (e.g. non-encapsulated) cosmetic active ingredient. In some embodiments, the MaSp-based fiber substantially reduces degradation of the cosmetic active ingredient. In some embodiments, the MaSp-based fiber substantially reduces degradation of the cosmetic active ingredient, wherein the degradation is associated with a chemical or a physical damage (e.g. oxidation, free radicals, UV radiation), as exemplified in FIGS. 11-12.

Figure 13:
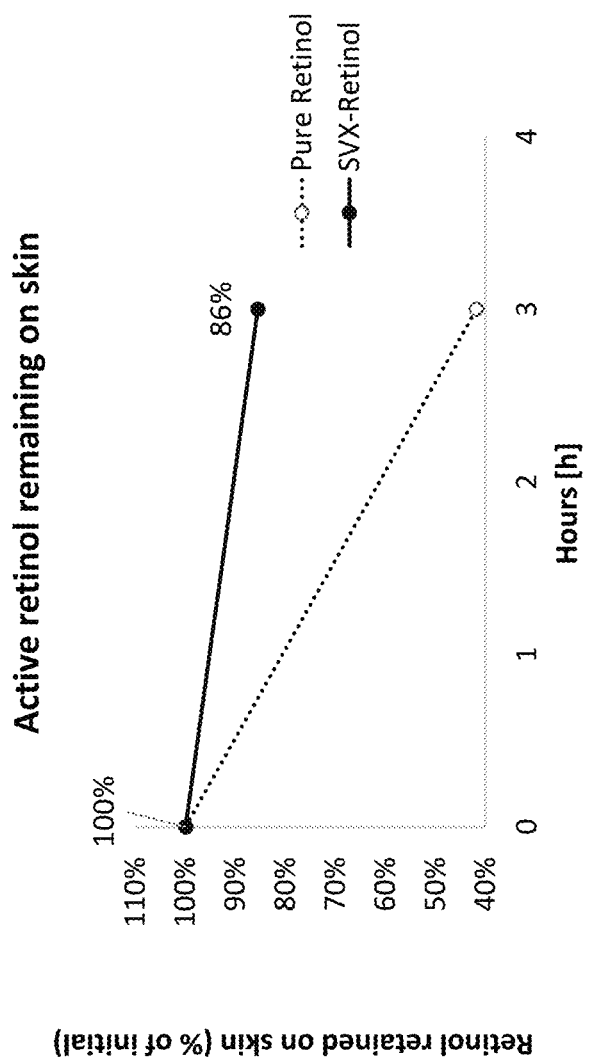
FIG. 13 is a graph representing skin retention time of retinol encapsulated within an exemplary composition of the invention comprising about 1% w/w pristine MaSp-based fibers (SVX), compared to commercially available retinol formulation. SVX encapsulated retinol remained more stable, compared to unprotected retinol.
Figure 14B:
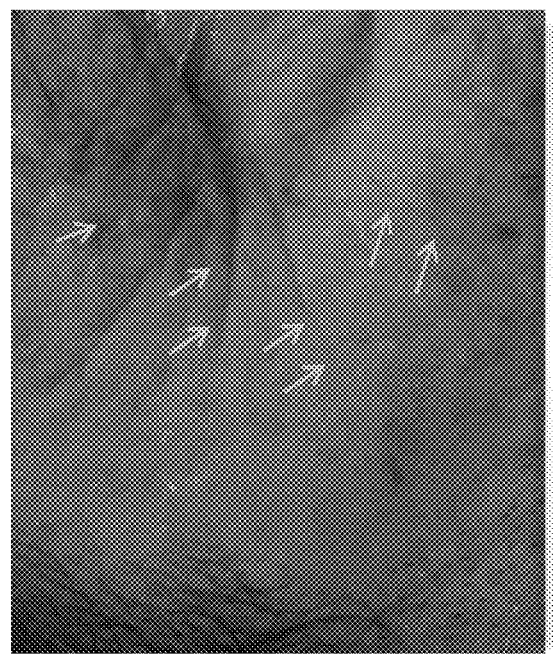
FIGS. 14A-B are images representing skin wrinkles reduction of a skin treated with an exemplary composition of the invention comprising about 10% w/w pristine MaSp-based fibers (SVX) and a film former (FIG. 14B), compared to untreated skin (FIG. 14A).
Figure 14A:
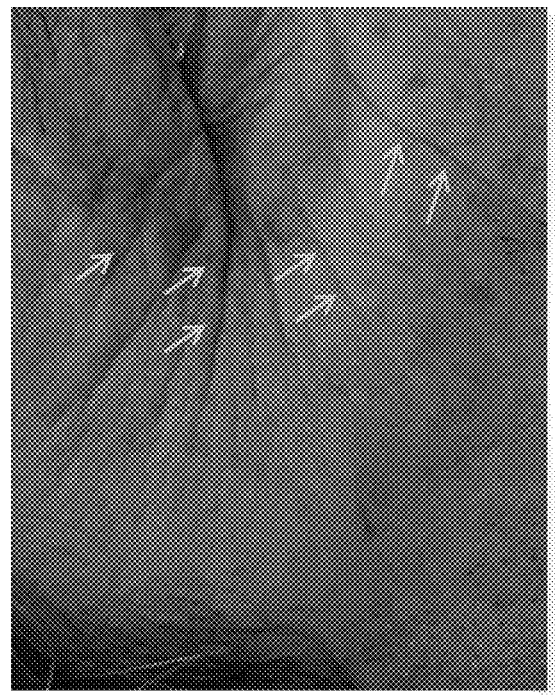
Figure 15A:
FIGS. 15A-C are depth map representing skin wrinkles reduction of a skin treated with an exemplary composition of the invention comprising about 10% w/w pristine MaSp-based fibers (SVX) and a film former after 15 min (FIG. 15B) and after 60 min (FIG. 15C), compared to untreated skin (FIG. 15A).
Figure 15B:
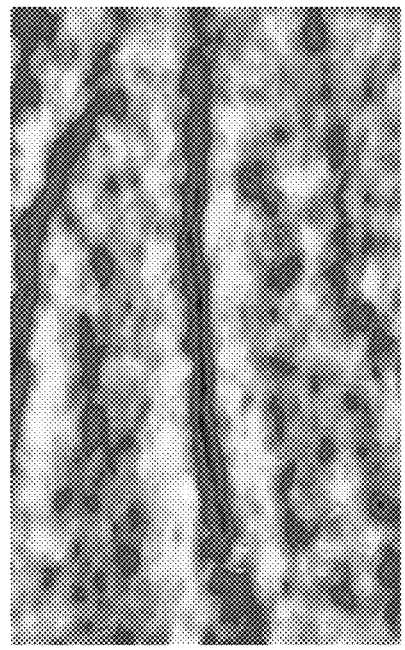
Figure 15C:
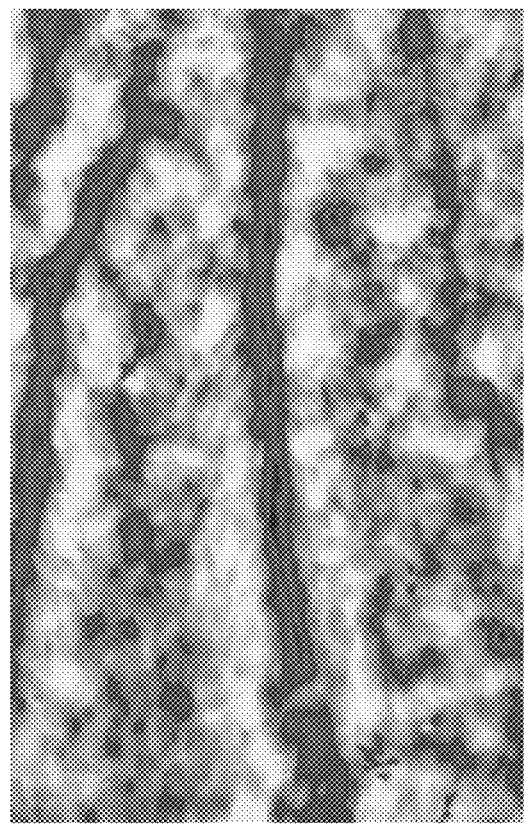
Figure 16:
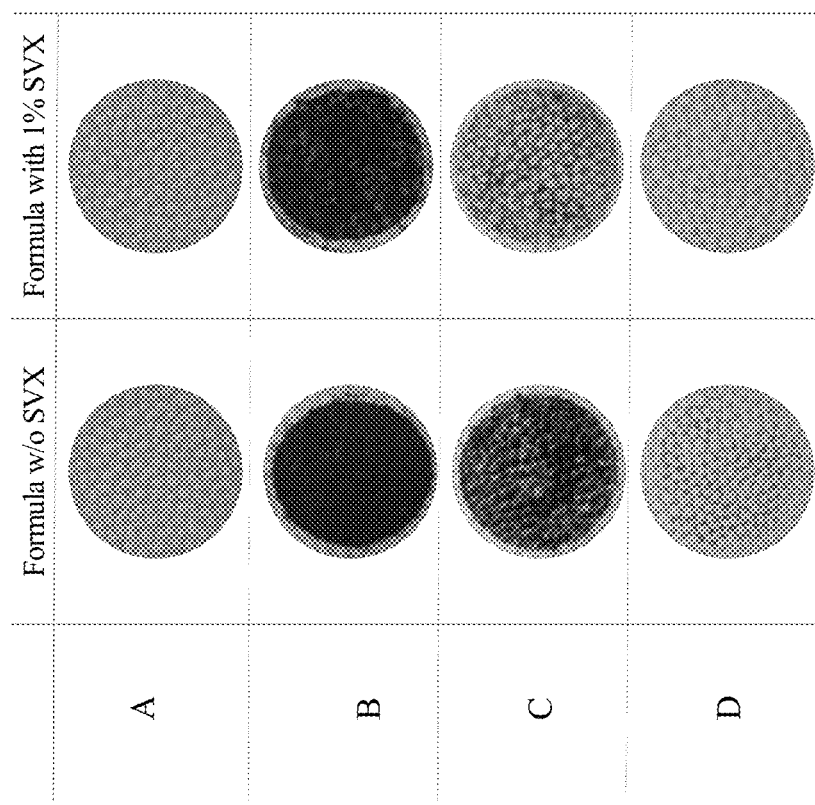
FIG. 16 represents pollution protection of a skin model treated with an exemplary composition of the invention comprising about 1% w/w of pristine MaSp-based fibers (SVX), compared to untreated control. A: 100 mg of formula (with and without SVX) was spread evenly on polyurethane skin model; B: 3 mg/cm$^2$ of carbon particles were applied onto the surface. Pollution particles are less adherent to SVX; C After surface was washed 5 times under running water Following thorough washing cycles and gentle scrubbing.
Figure 17:
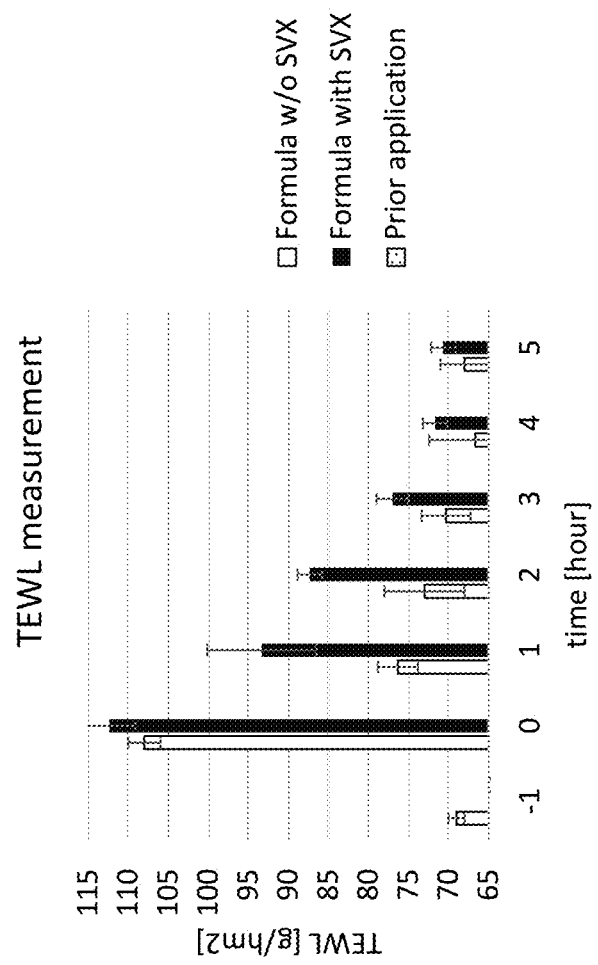
FIG. 17 is a graph representing skin moisture retention of a skin treated with an exemplary composition of the invention comprising about 1% w/w pristine MaSp-based fibers (SVX), compared to untreated skin (w/o SVX), analyzed by trans-epidermal water loss (TEWL) measurements. TEWL analysis shows that applying a thin layer of the demo formulation containing SVX on the skin may prevent trans-epidermal water loss and helps to reduce the appearance and/or existence of dry, flaky, dull skin.

In some embodiments, the composition increases the retention time of the cosmetic active ingredient on the skin, as exemplified by FIG. 13.

In some embodiments, the composition of the present invention is in a form of topically spreadable compositions, sprayable compositions, aerosolized compositions, injectable compositions, edible compositions, compositions in tablet, gel cap, or pill form.

In some embodiments, the present invention is directed to a kit including the composition. In certain embodiments, the composition is comprised in a container. The container can be a bottle, dispenser, or package. The container can dispense a pre-determined amount of the composition. In certain aspects, the compositions is dispensed in a spray, dollop, or liquid. The container can include indicia on its surface. The indicia can be a word, an abbreviation, a picture, or a symbol. In another aspect, there is a sunscreen composition comprising an effective amount of the composite of the invention.

In one embodiment, the sunscreen composition of the invention further comprises a carrier.

In one embodiment, the sunscreen composition of the invention has a SPF value of between 1 and 100.

In one embodiment, effective amount comprises a w/w concentration of the composite within the sunscreen composition being between 10% w/w and 50% w/w.

In one embodiment, the sunscreen composition of the invention being in a form of a cosmetic product.

In another aspect, there is a hair coloring composition comprising an effective amount of the derivatized porous MaSp-based fiber of any one of the invention bound to a dye or to a pigment.

In one embodiment, the hair coloring composition comprises a carrier.

In one embodiment, the effective amount comprises a w/w concentration of the derivatized porous MaSp-based fiber within the hair coloring composition being between 50% and 99.9% w/w.

In one embodiment, the hair coloring composition is characterized by a pH value between 3 and 7.

In one embodiment, the hair coloring composition is in a form of a cosmetic product.

Cosmeceutical Ingredients

As used herein, the terms "MaSp-based fiber" and "porous MaSp-based fiber" are used herein interchangeably.

In some embodiments, the composition is a composite, wherein the composite comprises the MaSp based fiber bound to the cosmetic active ingredient, wherein bound is via a non-covalent bond, a covalent bond, a physical interaction or any combination thereof.

In some embodiments, the cosmetic active ingredient comprises a compound selected from the group consisting of a polysaccharide, a sunscreen agent, a humectant, an antioxidant, an essential oil, a vitamin (e.g., A, B, B3, B12, C, D, E, and K), an acid (including alpha-, and beta-hydroxycarboxylic acids described hereinbelow), a plant extract, an exfoliant or any combination thereof. In some embodiments, the cosmetic active ingredient is a biologically active compound. Biologically active compounds are well-known in the art.

In some embodiments, the cosmetic active ingredient is in a form of a purified compound, a plant extract, at least partially enriched plant extract or any combination thereof.

Non-limiting examples of polysaccharides include but are not limited to: hyaluronic acid and/or a salt thereof, alginic acid and/or a salt thereof, chitosan, including any derivative (e.g. salt) or any combination thereof.

Other useful polysaccharides include scleroglucans comprising a linear chain of (1-3) linked glucose units with a (1-6) linked glucose every three unit.

In some embodiments, the sunscreen agent is a UV absorption agent and/or a UV reflection agent that can be used within the composition of the present invention, including a chemical sunblock and/or a physical sunblock.

Non-limiting examples of chemical sunblocks include but are not limited to: para-aminobenzoic acid (PABA), PABA esters (glyceryl PABA, amyldimethyl PABA and octyldimethyl PABA), butyl PABA, ethyl PABA, ethyl dihydroxypropyl PABA, benzophenones (oxybenzone, sulisobenzone, benzophenone, and benzophenone-1 through 12), cinnamates (octyl methoxycinnamate, isoamyl p-methoxycinnamate, octylmethoxy cinnamate, cinoxate, diisopropyl methyl cinnamate, DEA-methoxycinnamate, ethyl diisopropylcinnamate, glyceryl octanoate dimethoxycinnamate and ethyl methoxycinnamate), cinnamate esters, salicylates (homomethyl salicylate, benzyl salicylate, glycol salicylate, isopropylbenzyl salicylate, etc.), anthranilates, ethyl urocanate, homosalate, octisalate, dibenzoylmethane derivatives (e.g., avobenzone), octocrylene, octyl triazone, digalloy trioleate, glyceryl aminobenzoate, lawsone with dihydroxyacetone, ethylhexyl triazone, dioctyl butamido triazone, benzylidene malonate polysiloxane, terephthalylidene dicamphor sulfonic acid, disodium phenyl dibenzimidazole tetrasulfonate, diethylamino hydroxybenzoyl hexyl benzoate, bis diethylamino hydroxybenzoyl benzoate, bis benzoxazoylphenyl ethylhexylimino triazine, drometrizole trisiloxane, methylene bis-benzotriazolyl tetramethylbutyiphenol, and bis-ethylhexyloxyphenol methoxyphenyltriazine, 4-methylbenzylidenecamphor, and isopentyl 4-methoxycinnamate, including any derivative (e.g. salt) or any combination thereof.

Non-limiting examples of physical sunblocks include but are not limited to: kaolin, talc, petrolatum and metal oxides (e.g., titanium dioxide and zinc oxide), or any combination thereof.

Compositions of the present invention can have UVA and UVB absorption properties. The compositions can have a sun protection factor (SPF) of 2, 3, 4, 5, 6, 7, 8, 9, 10, 11, 12, 13, 14, 15, 20, 25, 30, 35, 40, 45, 50, 55, 60, 70, 80, 90 or more, including any range or value therebetween.

Non-limiting examples of humectants include but are not limited to: retinol, retinyl acetate, an amino acid, lactic acid, chondroitin sulfate, diglycerin, erythritol, fructose, glucose, glycerin (or glycerol), glycerol ethylene glycol, propylene glycol, 1,2,6-hexanetriol, honey, hydrogenated honey, hydrogenated starch hydrolysate, inositol, lactitol, maltitol, maltose, mannitol, natural moisturizing factor, polyethylene glycol (PEG), PEG-15 butanediol, polyglyceryl sorbitol, propylene glycol, sorbitol, sucrose, trehalose, urea, and xylitol including any derivative (e.g. salt) or any combination thereof.

Other examples of humectants include but are not limited to: acetylated lanolin, an enzyme, acetylated lanolin alcohol, acrylates/C10-30 alkyl acrylate crosspolymer, acrylates copolymer, algae extract, aloe-barbadensis extract, apricot kernel oil, ascorbic acid, ascorbyl palmitate, avocado oil, barrier sphingolipids, butyl alcohol, beeswax, behenyl alcohol, beta-sitosterol, birch bark extract, borage extract, butcherbroom extract, butylene glycol, *Calendula officinalis* oil, candelilla (*Euphorbia* cerifera) wax, canola oil, caprylic/capric triglyceride, cardamon oil, carnauba wax, carrageenan (*Chondrus crispus*), carrot (*Daucus carota sativa*) oil, castor oil, ceramides, ceresin, ceteareth-5, ceteareth-12, ceteareth-20, cetearyl octanoate, ceteth-20, ceteth-24, cetyl acetate, cetyl octanoate, cetyl palmitate, chamomile oil, cholesterol, cholesterol esters, cholesteryl hydroxystearate, clary (*Salvia sclarea*) oil, cocoa butter, coco-caprylate/caprate, coconut (*Cocos nucifera*) oil, collagen, collagen amino acids, corn (*Zea mays*) oil, fatty acids, decyl oleate, dextrin, diazolidinyl urea, dimethicone copolyol, dimethiconol, dioctyl adipate, dioctyl succinate, dipentaerythrityl hexacaprylate/hexacaprate, DMDM hydantoin, erythritol, ethoxydiglycol, ethyl linoleate, *Eucalyptus globulus* oil, evening primrose oil, fatty acids, fructose, gelatin, geranium *maculatum* oil, glucosamine, glucose glutamate, glutamic acid, glycereth-26, glycerin, glycerol, glyceryl distearate, glyceryl hydroxystearate, glyceryl laurate, glyceryl linoleate, glyceryl myristate, glyceryl oleate, glyceryl stearate, glyceryl stearate, glycol stearate, glycosaminoglycans, grape (*Vitis vinifera*) seed oil, hazel (*Corylus americana*) nut oil, hexylene glycol, hybrid safflower (Carthamus tinctorius) oil, hydrogenated castor oil, hydrogenated coco-glycerides, hydrogenated coconut oil, hydrogenated lanolin, hydrogenated lecithin, hydrogenated palm glyceride, hydrogenated palm kernel oil, hydrogenated soybean oil, hydrogenated tallow glyceride, hydrogenated vegetable oil, hydrolyzed collagen, hydrolyzed elastin, hydrolyzed glycosaminoglycans, hydrolyzed keratin, hydrolyzed soy protein, hydroxylated lanolin, hydroxyproline, imidazolidinyl urea, iodopropynyl butylcarbamate, isocetyl stearate, isocetyl stearoyl stearate, isodecyl oleate, isopropyl isostearate, isopropyl lanolate, isopropyl myristate, isopropyl palmitate, isopropyl stearate, isostearamide DEA, isostearic acid, isostearyl lactate, isostearyl neopentanoate, jasmine oil, jojoba oil, kelp, kukui nut oil, lactamide MEA, laneth-16, laneth-10 acetate, lanolin, lanolin acid, lanolin alcohol, lanolin oil, lanolin wax, lavender oil, lecithin, lemon (*Citrus medica* limonum) oil, linoleic acid, linolenic acid, macadamia *ternifolia* nut oil, magnesium stearate, magnesium sulfate, maltitol, *matricaria* (*Chamomilla recutita*) oil, methyl glucose sesquistearate, microcrystalline wax, mineral oil, mink oil, *mortierella* oil, myristyl lactate, myristyl myristate, myristyl propionate, neopentyl glycol dicaprylate/dicaprate, octyldodecanol, octyldodecyl myristate, octyldodecyl stearoyl stearate, octyl hydroxystearate, octyl palmitate, octyl salicylate, octyl stearate, oleic acid, olive (*Olea europaea*) oil, orange (*Citrus aurantium dulcis*) oil, palm (*Elaeis guineensis*) oil, palmitic acid, pantethine, panthenol, panthenyl ethyl ether, paraffin, peach (*Prunus persica*) kernel oil, peanut (*Arachis hypogaea*) oil, PEG-8 C12-18 ester, PEG-15 cocamine, PEG-150 distearate, PEG-60 glyceryl isostearate, PEG-5 glyceryl stearate, PEG-30 glyceryl stearate, PEG-7 hydrogenated castor oil, PEG-40 hydrogenated castor oil, PEG-60 hydrogenated castor oil, PEG-20 methyl glucose sesquistearate, PEG40 sorbitan peroleate, PEG-5 soy sterol, PEG-10 soy sterol, PEG-2 stearate, PEG-8 stearate, PEG-20 stearate, PEG-32 stearate, PEG40 stearate, PEG-50 stearate, PEG-100 stearate, PEG-150 stearate, pentadecalactone, peppermint oil, petrolatum, phospholipids, polyamino sugar condensate, polyglyceryl-3 diisostearate, polyquaternium-24, polysorbate 20, polysorbate 40, polysorbate 60, polysorbate 80, polysorbate 85, potassium myristate, potassium palmitate, potassium sorbate, potassium stearate, propylene glycol, propylene glycol dicaprylate/dicaprate, propylene glycol dioctanoate, propylene glycol dipelargonate, propylene glycol laurate, propylene glycol stearate, propylene glycol stearate SE, PVP, pyridoxine dipalmitate, quaternium-15, quaternium-18 hectorite, quaternium-22, retinyl palmitate, rice (*Oryza sativa*) bran oil, rosemary oil, rose oil, safflower (Carthamus tinctorius) oil, sage (*Salvia officinalis*) oil, sandalwood (Santalum album) oil, serum protein, sesame (*Sesamum indicum*) oil, shea butter, sodium chondroitin sulfate, sodium palmitate, sodium PCA, sodium polyglutamate, sodium stearate, soluble collagen, sorbic acid, sorbitan laurate, sorbitan oleate, sorbitan palmitate, sorbitan sesquioleate, sorbitan stearate, sorbitol, soybean (*Glycine soja*) oil, sphingolipids, squalane, squalene, stearamide MEA-stearate, stearic acid, stearoxy dimethicone, stearoxytrimethylsilane, stearyl alcohol, stearyl glycyrrhetinate, stearyl heptanoate, stearyl stearate, sunflower (*Helianthus annuus*) seed oil, sweet almond oil, synthetic beeswax, tocopherol, tocopheryl acetate, tocopheryl linoleate, tribehenin, tridecyl neopentanoate, tridecyl stearate, triethanolamine, tristearin, water, waxes, wheat (*Triticum vulgare*) germ oil, and ylang ylang oil, including any derivative (e.g. salt) or any combination thereof.

Non-limiting examples of antioxidants include but are not limited to: acetyl cysteine, ascorbic acid, a polypeptide (e.g. Dipeptide-2, Palmitoyl Tripepitde-5, Palmitoyl Oligopeptide/Palmitoyl Hexapeptide, Carnosine, Pentapeptide-18), ascorbyl dipalmitate, ascorbyl methylsilanol pectinate, ascorbyl palmitate, ascorbyl stearate, BHA, DMAE (dimethyl amino ethanol), BHT, t-butyl hydroquinone, diamylhydroquinone, di-t-butylhydroquinone, dicetyl thiodipropionate, dioleyl tocopheryl methylsilanol, disodium ascorbyl sulfate, distearyl thiodipropionate, ditridecyl thiodipropionate, dodecyl gallate, erythorbic acid, esters of ascorbic acid, ethyl ferulate, ferulic acid, gallic acid esters, hydroquinone, isooctyl thioglycolate, kojic acid, magnesium ascorbate, magnesium ascorbyl phosphate, methylsilanol ascorbate, natural botanical anti-oxidants such as green tea or grape seed extracts, nordihydroguaiaretic acid, octyl gallate, phenylthioglycolic acid, potassium ascorbyl tocopheryl phosphate, potassium sulfite, propyl gallate, quinones, rosmarinic acid, sodium ascorbate, sodium bisulfate, sodium erythorbate, sodium metabisulfite, sodium sulfite, superoxide dismutase, sodium thioglycolate, sorbityl furfural, thiodiglycol, thiodiglycolamide, thiodiglycolic acid, thioglycolic acid, thiolactic acid, thiosalicylic acid, tocophereth-5, tocophereth-10, tocophereth-12, tocophereth-18, tocophereth-50, tocopherol, tocophersolan, tocopheryl acetate, tocopheryl linoleate, tocopheryl nicotinate, tocopheryl succinate, and tris(nonylphenyl)phosphite including any derivative (e.g. salt) or any combination thereof.

Non-limiting examples of plant extracts include but are not limited to: *Haseolus vulgaris, Persea Americana, Prunus armeniaca, Arnica montana, Althea officinalis, Citris sinensis, Citrus medica limonum, Citrus aurantium dulcis, Mentha piperita, Betula alba, Borago officinalis, Ruscus aculeatus, Calendula officinalis, Wedelia trilobata, Copernicia cerifera, Ricinus communis, Elettaria cardamomum, Rosmarinus officinalis, Burretiodendron hsienmu, Theobroma cacao, Jasminum officinale, Oenothera biennis, Vitis vinifera, Anthemis nobilis, Butyrospermum parkii, Prunus amygdalus dulcis, Aleurites moluccana, Lavandula angustifolia, Buxus chinensis, Bauhinia brachycarpa* var. *cavaleriei, Cystacanthus paniculatus, Caesalpinia minax, Cananga odorata, Pueraria wallichii, Tetracentron sinense, Bridelia insulana, Hedyotis verticillata, Syzygium fruticosum, Chamomilla recutita, Cercidiphyllum japonicum, Bauhinia glauca, Rhododendron siderophyllum, Cudrania pubescens, Cajanus cajan, Wendlandia uvariifolia, Aloe vera, Aloe barbadensis, Siegesbeckia glabrescens, Azolla imbricate, Juncus bufonius, Poikilospermum suaveolens, Clerodendrum trichotomum* var. *fargesii, Porandra ramosa, Annona glabra, Sterculia pexa, Phoebe puwenensis, Myriopteron extensum, Croton lachnocarpa, Dillenia turbinata, Alpinia blepharocalyx, Crotalaria spectabilis, Ficus lacor, Ravenala madagascariensis, Cocculus orbiculatus, Panax ginseng, Drynaria fortunei, Acrachne racemosa, Pseuderanthemum polyanthum, Eriobotrys serrata, Vernonia arborea, Adianthum caudatum, Phaseolus lunatus, Ipomoea cairica, Alopecurus aequalis, Arenga pinnata, Rhynchosia yunnanensis, Syzygium cumini, Clausena dunniana, Cyclosurus parasiticus,* and *Solanum carolinense*, or any combination thereof.

In some embodiments, the composition comprises a plant, a plant part, and/or extracts thereof. The plant part can be the whole plant or part of the plant (e.g., root, bark, sap, stem, leaf, flower, seed, leaf, stem, root, flower, seed, sap, bark, etc.).

In some embodiments, the extract is a whole plant extract. In some embodiments, the extract is an extract of a part of the plant (e.g., root, bark, sap, stem, leaf, flower, seed, leaf, stem, root, flower, seed, sap, bark, etc.). In some embodiments, the extract is an aqueous extract or a non-aqueous extract. In some embodiments, the non-aqueous extract comprises an organic solvent (e.g., methanol, ethanol propanol, butanol, chloroform, dichloromethane, chlorobenzene, propylene glycol, ethylene glycol, ethyl acetate, DMF, DMSO etc.), and an oil, or any combination thereof.

Essential oils include oils derived from herbs, flowers, trees, and other plants. Such oils are typically present as tiny droplets between the plant's cells, and can be extracted by several method known to those of skill in the art (e.g., steam distilled, enfleurage (i.e., extraction by using fat), maceration, solvent extraction, or mechanical pressing). When these types of oils are exposed to air they tend to evaporate (i.e., a volatile oil). As a result, many essential oils are colorless, but with age they can oxidize and become darker. Essential oils are insoluble in water and are soluble in organic solvents, such as alcohols, ether, fixed oils (vegetal), and other organic solvents. Essential oils typically are named by the plant from which the oil is found. For example, rose oil or peppermint oil are derived from rose or peppermint plants, respectively. Non-limiting examples of essential oils that can be used in the context of the present invention include sesame oil, macadamia nut oil, tea tree oil, evening primrose oil, Spanish sage oil, Spanish rosemary oil, coriander oil, thyme oil, pimento berries oil, rose oil, anise oil, balsam oil, bergamot oil, rosewood oil, cedar oil, chamomile oil, sage oil, clary sage oil, clove oil, cypress oil, Eucalyptus oil, fennel oil, sea fennel oil, frankincense oil, geranium oil, ginger oil, grapefruit oil, jasmine oil, juniper oil, lavender oil, lemon oil, lemongrass oil, lime oil, mandarin oil, marjoram oil, myrrh oil, neroli oil, orange oil, patchouli oil, pepper oil, black pepper oil, petitgrain oil, pine oil, rose otto oil, rosemary oil, sandalwood oil, spearmint oil, spikenard oil, vetiver oil, wintergreen oil, or ylang ylang. Other essential oils known to those of skill in the art are also contemplated as being useful within the context of the present invention.

Non-limiting examples of exfoliants include but are not limited to: salicylic acid, citric acid, alpha-hydroxycarboxylic acids (such as lactic acid, glycolic acid, lactobionic tartaric acid, malic acid), and beta-hydroxycarboxylic acids (such as propionic acid, α-hydroxypropionic acid, β-hydroxypropionic acid, β-hydroxybutyric acid, β-hydroxy β-methylbutyric acid and carnitine), and an acid (e.g. azelaic acid, oleic acid, linoleic acid, kojic acid, ferulic acid, mandelic acid, shikimic acid) including any salt or any combination thereof.

Other cosmetic active ingredients are extensively used in cosmetic preparation and are well-known to those skilled in the art.

In some embodiments, the cosmetic active ingredient is substantially devoid of any additional biologically active ingredient. In some embodiments, the cosmetic active ingredient of the invention consisting essentially of the compounds listed hereinabove. In some embodiments, the cosmetic active ingredient is substantially devoid of a MaSp-based fiber. In some embodiments, the cosmetic active ingredient is substantially devoid of a protein.

Article

In another aspect of the invention, there is an article comprising the composition of the invention. In some embodiments, the article is a topical care product. In some embodiments, the article is a cosmetic product (e.g. a color cosmetic product, a powder, a face cleanser).

The cosmetic product can be those described in other sections of this specification or those known to a person of skill in the art. Non-limiting examples of products include a moisturizer, a cream, a lotion, a skin softener, a foundation, a night cream, a lipstick, a cleanser, a toner, a sunscreen, a mask, an anti-aging product, a deodorant, an antiperspirant, a perfume, a cologne, etc.

In some embodiments, the article comprising the composition of the invention and a carrier. In some embodiments, the carrier is a physiologically suitable carrier. Exemplary physiologically suitable carriers are listed hereinbelow, and additional physiologically suitable carriers are well-known in the art.

In some embodiments, the carrier comprises an emulsifier. Emulsifiers can reduce the interfacial tension between phases and improve the formulation and stability of an emulsion. The emulsifiers can be nonionic, cationic, anionic, and zwitterionic emulsifiers (See McCutcheon's (1986); U.S. Pat. Nos. 5,011,681; 4,421,769; 3,755,560).

Method

In another aspect, there is a method for coloring a hair comprising providing the hair (e.g. a human hair, a wig, or an article comprising the hair, etc) and contacting the hair with the hair coloring composition of the invention.

In some embodiments, the hair is a human hair. In some embodiments, the hair is a damaged hair (e.g. as a result of hair dyeing, or bleaching). In some embodiments, the method comprises applying a sufficient amount of the hair coloring composition of the invention to the hair. In some embodiments, the amount is sufficient so as to obtain a colored hair. In some embodiments, the amount is sufficient so as to obtain a predetermined hair color. In some embodiments, the amount is sufficient so as to obtain a stable hair coloring, wherein stable is as described herein.

In another aspect, there is a method for supplementing a subject with a cosmetic active ingredient, comprising administering to the subject the composition or the article of the invention; thereby supplementing the subject with the cosmetic active ingredient.

In some embodiments, the subject is selected from a human subject or an animal subject.

Figure 18A:
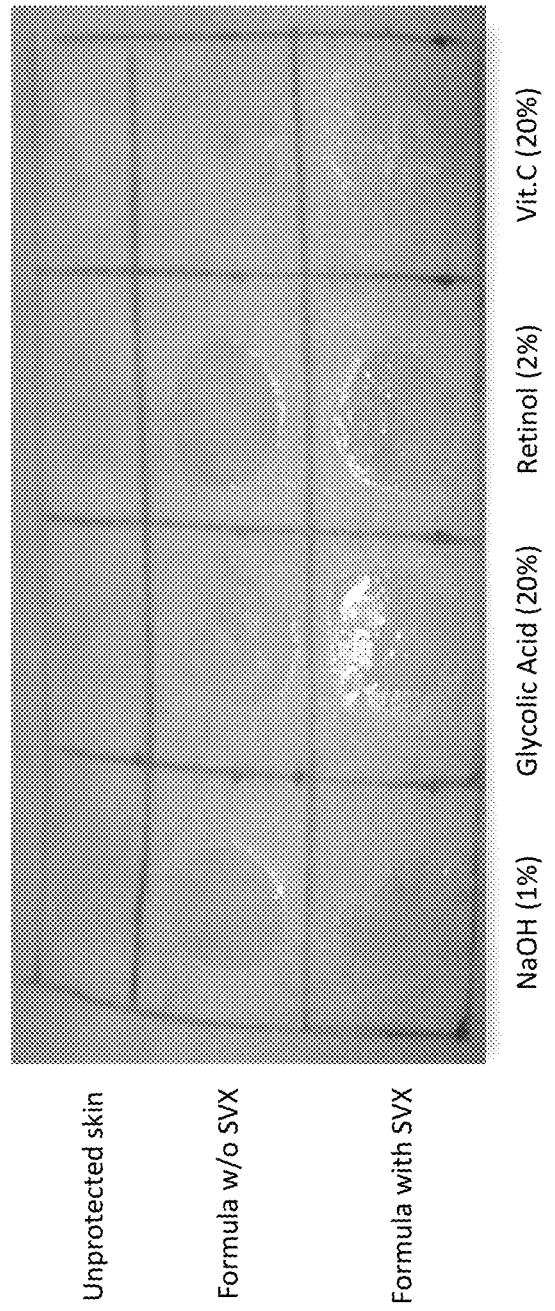
FIGS. 18A-B are images representing irritation test performed by application of various irritants on a skin treated with an exemplary composition of the invention comprising about 1% w/w pristine MaSp-based fibers (SVX), compared to untreated skin.
Figure 18B:
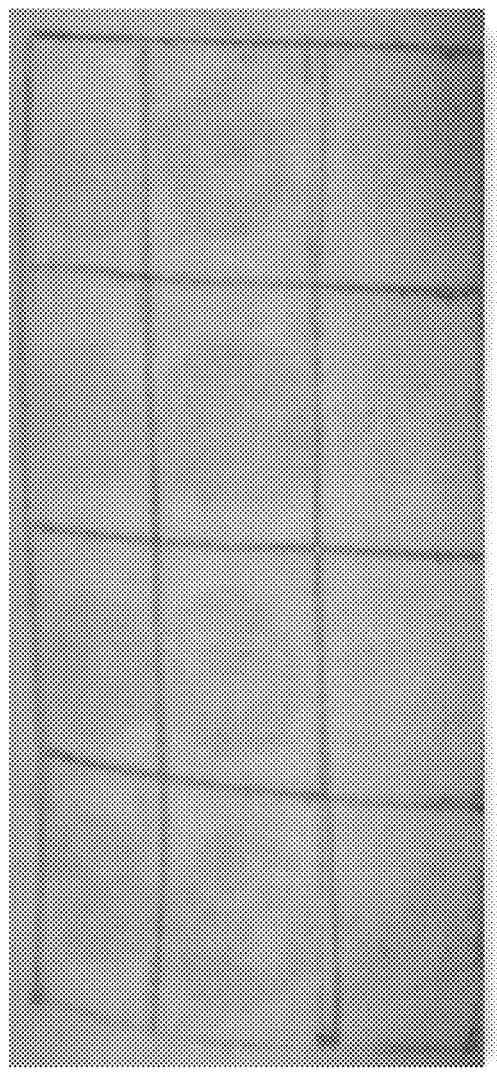

In some embodiments, the method is for skin rejuvenation, skin moisturizing, skin moisture retention, skin conditioning, wrinkles reduction, prevention of skin irritation, protection of skin pollution, and skin relief or any combination thereof, as demonstrated by FIGS. 14-17, and by FIGS. 18A-B. In some embodiments, the method is as described herein, wherein the composition or the article of the invention comprises between 0.1 and 20% w/w of the MaSp-based protein, as described herein.

In some embodiments, there is a method for improving one or more skin parameters in a subject in need thereof, comprising the step of administering to the subject a therapeutically effective amount of any one of the compositions or of the articles disclosed herein. In another embodiment, the present invention provides a method for treating a subject afflicted with skin-related conditions.

In some embodiments, the one or more skin parameters are selected from: face skin lines/wrinkles, skin aging, skin moisture content, skin elasticity, skin radiance, skin luminosity, skin oil content (e.g. reduction compensation), and ultraviolet (UV)-induced damage.

In another aspect, there is a method for reducing or preventing a UV-related damage to a subject, comprising applying the sunscreen composition of the invention on a skin of the subject; thereby reducing or preventing the UV-related damage to the subject.

In another aspect, there is a method for coloring a hair, comprising contacting at least a portion of the hair with the hair coloring composition of the invention under suitable conditions, thereby coloring the hair.

In one embodiment, "skin-related conditions" refers to skin damage caused by exogenous factors such as exposure to ultraviolet radiation. In one embodiment, a skin condition is caused by an irritant. In one embodiment, a skin condition is caused by a chemical or any other toxic factor. In one embodiment, skin-related conditions include, without being limited thereto, skin thickness, sunburn cells, erythema, skin irritation, redness, dryness, stinging, skin peeling and detachment, acne-like skin eruptions, skin spots and skin color tone non-uniformity, infection and loss of fluids, or any combination thereof.

While in the above-disclosed methods, the therapeutic composition may be administered by any convenient means, in one embodiment the composition is administered in a pharmaceutical, a nutraceutical, nutritional, or oral dosage form.

In one embodiment, the composition of the present invention can be provided to the individual per-se. In one embodiment, the composition of the present invention can be provided to the individual as part of a further pharmaceutical composition or a nutraceutical composition (e.g. the article), where it is mixed with a pharmaceutically acceptable carrier.

In one embodiment, a "pharmaceutical composition", a "cosmeceutical composition" or a "nutraceutical composition" refers to a preparation of a composition as described herein with other chemical components such as physiologically suitable carriers and excipients. The purpose of a pharmaceutical composition, cosmeceutical composition, or a nutraceutical composition is to facilitate administration of the composition to an organism.

In one embodiment, "a combined preparation" defines especially a "kit of parts" in the sense that the combination partners as defined above can be dosed independently or by use of different fixed combinations with distinguished amounts of the combination partners i.e., simultaneously, concurrently, separately or sequentially. In some embodiments, the parts of the kit of parts can then, e.g., be administered simultaneously or chronologically staggered, that is at different time points and with equal or different time intervals for any part of the kit of parts. The ratio of the total amounts of the combination partners, in some embodiments, can be administered in the combined preparation. In one embodiment, the combined preparation can be varied, e.g., in order to cope with the needs of a patient subpopulation to be treated or the needs of the single patient which different needs can be due to a particular disease, severity of a disease, age, sex, or body weight as can be readily made by a person skilled in the art.

In one embodiment, the phrases "physiologically acceptable carrier" and "pharmaceutically acceptable carrier" which be interchangeably used refer to a carrier or a diluent that does not cause significant irritation to a mammal and does not abrogate the biological activity and properties of the administered composition. An adjuvant is included under these phrases.

In one embodiment, "excipient" refers to an inert substance added to a composition to further facilitate administration of an active ingredient. In one embodiment, excipients include calcium carbonate, calcium phosphate, various sugars and types of starch, cellulose derivatives, gelatin, vegetable oils and polyethylene glycols.

Techniques for formulation and administration of drugs are found in "Remington's Pharmaceutical Sciences," Mack Publishing Co., Easton, PA, latest edition, which is incorporated herein by reference in its entirety.

In one embodiment, suitable routes of administration, for example, include topical, dermal, transdermal, oral, rectal, transmucosal, trans nasal, intestinal or parenteral delivery, as well as intrathecal, direct intraventricular, intraperitoneal, intranasal, or intraocular injections.

General

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the term "stably encapsulated" refers to the ability of the composition to substantially prevent a release of the active ingredient therefrom. AS used herein, the term "substantially prevent" is referred to a total amount of the active ingredient removed by the first tape strip and by the second tape strip, as measured by a skin tape test (as described in the Examples section).

In some embodiments, substantially comprises at least 50%, at least 60%, at least 70%, at least 75%, at least 80%, at least 85%, at least 90%, at least 95%, at least 97%, at least 99%, by weight of the cosmetic active ingredient. In some embodiments, substantially comprises at least 50%, at least 60%, at least 70%, at least 75%, at least 80%, at least 85%, at least 90%, at least 95%, at least 97%, at least 99%, by weight of cosmetic active ingredient is bound to the MaSp-based fiber via a non-covalent bond, via a physical interaction or both. Non-covalent bonds are well-known in the art and include inter alia hydrogen bonds, p-p stacking, Van der Waals interactions, etc.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Definitions

As used herein, the term "alkyl" describes an aliphatic hydrocarbon including straight chain and branched chain groups. Preferably, the alkyl group has 1 to 20 carbon atoms, and more preferably 1 to 10 or 1 to 6 carbon atoms.

The term "alkyl", as used herein, also encompasses saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The term "cycloalkyl" describes an all-carbon monocyclic or fused ring (i.e. rings which share an adjacent pair of carbon atoms) group where one or more of the rings does not have a completely conjugated pi-electron system. The cycloalkyl group may be substituted or unsubstituted, as indicated herein.

The term "aryl" describes an all-carbon monocyclic or fused-ring polycyclic (i.e. rings which share adjacent pairs of carbon atoms) groups having a completely conjugated pi-electron system. The aryl group may be substituted or unsubstituted, as indicated herein.

The term "alkoxy" describes both an O-alkyl and an —O-cycloalkyl group, as defined herein.

The term "aryloxy" describes an —O-aryl, as defined herein.

Each of the alkyl, cycloalkyl and aryl groups in the general formulas herein may be substituted by one or more substituents, whereby each substituent group can independently be, for example, halide, alkyl, alkoxy, cycloalkyl, nitro, amino, hydroxyl, thiol, thioalkoxy, carboxy, amide, aryl and aryloxy, depending on the substituted group and its position in the molecule. Additional substituents are also contemplated.

The term "halide", "halogen" or "halo" describes fluorine, chlorine, bromine, or iodine.

The term "haloalkyl" describes an alkyl group as defined herein, further substituted by one or more halide(s).

The term "substituted" or the term "substituent" is referred to 1, 2, 3, 4 or 5 substituents, wherein each substituent is independently selected from ($C_0$-$C_6$)alkyl-aryl, ($C_0$-$C_6$)alkyl-heteroaryl, ($C_0$-$C_6$)alkyl-($C_3$-$C_8$) cycloalkyl, optionally substituted $C_3$-$C_8$ heterocyclyl, halogen, —$NO_2$, —CN, —OH, —$CONH_2$, —$CONR_2$, —$CNNR_2$, —$CSNR_2$, —CONH—OH, —CONN—$NH_2$, —NHCOR, —NHCSR, —NHCNR, —NC(=O)OR, —NC(=O)NR, —NC(=S) OR, —NC(=S)NR, —$SO_2$R, —SOR, —SR, —$SO_2$OR, —$SO_2$N(R)$_2$, —$NHNH_2$, —NNR, $C_1$-$C_6$ haloalkyl, optionally substituted $C_1$-$C_6$ alkyl, —$NH_2$, —NH($C_1$-$C_6$ alkyl), —N($C_1$-$C_6$ alkyl)$_2$, $C_1$-$C_6$ alkoxy, $C_1$-$C_6$ haloalkoxy, hydroxy($C_1$-$C_6$ alkyl), hydroxy($C_1$-$C_6$ alkoxy), alkoxy($C_1$-$C_6$ alkyl), alkoxy($C_1$-$C_6$ alkoxy), $C_1$-$C_6$ alkyl-$NR_2$, $C_1$-$C_6$ alkyl-SR, —CONH($C_1$-$C_6$ alkyl), —CON($C_1$-$C_6$ alkyl)$_2$, —$CO_2$H, —$CO_2$R, —OCOR, —OCOR, —OC (=O)OR, —OC(=O)NR, —OC(=S)OR, —OC(=S)NR, including nay combination thereof.

The term "haloalkoxy" describes an alkoxy group as defined herein, further substituted by one or more halide(s).

The term "hydroxyl" or "hydroxy" describes a —OH group.

The term "mercapto" or "thiol" describes a —SH group.

The term "thioalkoxy" describes both an —S-alkyl group, and a —S-cycloalkyl group, as defined herein.

The term "thioaryloxy" describes both an —S-aryl and a —S-heteroaryl group, as defined herein.

The term "amino" describes a —NR'R" group, with R' and R" as described herein.

The term "heterocyclyl" describes a monocyclic or fused ring group having in the ring(s) one or more atoms such as nitrogen, oxygen, and sulfur. The rings may also have one or more double bonds. However, the rings do not have a completely conjugated pi-electron system. Representative examples are piperidine, piperazine, tetrahydrofuran, tetrahydropyran, morpholino and the like.

The term "carboxy" or "carboxylate" describes a —C(O)OR' group, where R' is hydrogen, alkyl, cycloalkyl, alkenyl, aryl, heteroaryl (bonded through a ring carbon) or heterocyclyl (bonded through a ring carbon) as defined herein.

The term "carbonyl" describes a —C(O)R' group, where R' is as defined hereinabove.

The above-terms also encompass thio-derivatives thereof (thiocarboxy and thiocarbonyl).

The term "thiocarbonyl" describes a —C(S)R' group, where R' is as defined hereinabove.

A "thiocarboxy" group describes a —C(S)OR' group, where R' is as defined herein.

A "sulfinyl" group describes an —S(O)R' group, where R' is as defined herein.

A "sulfonyl" or "sulfonate" group describes an —S(O)2R' group, where R' is as defined herein.

A "carbamyl" or "carbamate" group describes an —OC(O)NR'R" group, where R' is as defined herein and R" is as defined for R'.

A "nitro" group refers to a —NO$_2$ group.

The term "amide" as used herein encompasses C-amide and N-amide.

The term "C-amide" describes a —C(O)NR'R" end group or a —C(O)NR'-linking group, as these phrases are defined hereinabove, where R' and R" are as defined herein.

The term "N-amide" describes a —NR"C(O)R' end group or a —NR'C(O)— linking group, as these phrases are defined hereinabove, where R' and R" are as defined herein.

The term "carboxylic acid derivative" as used herein encompasses carboxy, amide, carbonyl, anhydride, carbonate ester, and carbamate.

A "cyano" or "nitrile" group refers to a —CN group.

The term "azo" or "diazo" describes an —N=NR' end group or an —N=N— linking group, as these phrases are defined hereinabove, with R' as defined hereinabove.

The term "guanidine" describes a —R'NC(N)NR"R'" end group or a —R'NC(N) NR"-linking group, as these phrases are defined hereinabove, where R', R" and R'" are as defined herein.

As used herein, the term "azide" refers to a —N3 group.

The term "sulfonamide" refers to a —S(O)2NR'R" group, with R' and R" as defined herein.

The term "phosphonyl" or "phosphonate" describes an —OP(O)—(OR')2 group, with R' as defined hereinabove.

The term "phosphinyl" describes a —PR'R" group, with R' and R" as defined hereinabove.

The term "alkylaryl" describes an alkyl, as defined herein, which substituted by an aryl, as described herein. An exemplary alkylaryl is benzyl.

The term "heteroaryl" describes a monocyclic (e.g. C5-C6 heteroaryl ring) or fused ring (i.e. rings which share an adjacent pair of atoms) group having in the ring(s) one or more atoms, such as, for example, nitrogen, oxygen, and sulfur and, in addition, having a completely conjugated pi-electron system. In some embodiments, the terms "heteroaryl" and "C5-C6 heteroaryl" are used herein interchangeably. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted by one or more substituents, as described hereinabove. Representative examples are thiadiazol, pyridine, pyrrole, oxazole, indole, purine, and the like.

As used herein, the terms "halo" and "halide", which are referred to herein interchangeably, describe an atom of a halogen, that is fluorine, chlorine, bromine, or iodine, also referred to herein as fluoride, chloride, bromide, and iodide.

The term "haloalkyl" describes an alkyl group as defined above, further substituted by one or more halide(s).

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Skin Tape Test

Tape stripping is a simple and efficient method for the assessment of quality and efficacy of cosmetic and dermatological formulations. After topical application and penetration of formulations, the cell layers of the stratum corneum are successively removed from the same skin area using adhesive films. Each ten minutes a tape was attached and then removed from the skin surface where the formula was applied. Each tape strip was analyzed by FTIR techniques. Peaks at 1450 cm' corresponding to Cellophane polymer of the tape were normalized for the same high.

Example 1

Derivatized MaSp-Based Fibers

Amination of MaSp based fibers has been performed as follows:

Aqueous dispersion comprising MaSp based fibers (also used herein as "SVX") together with an anionic surfactant, was centrifuged and re-dispersed in deionized (DI) water. Furthermore, MaSp based fibers have been substantially dried according to a well-established procedure and re-dispersed in DI water, so as to obtain a MaSp suspension.

Aqueous solution (1-20% w/w) of 2-(4-aminophenyl) ethylamine (APEA) has been prepared, followed by acidification with HCl (1M).

2-10 molar excess of $NaNO_2$ has been added to the 2-(4-aminophenyl)ethylamine solution and kept at a temperature between 1 and 10° C. for 10-60 minutes, so as to obtain diazotation solution. Then, the diazotation solution was added dropwise to the MaSp suspension while cooling. The resulting mixture has been stirred under completion of the reaction.

Then, the supernatant has been discarded and the remaining derivatized MaSp-based fibers have been extensively washed with DI water, followed by drying of the aminated fibers.

The modification efficiency (yield) has been determined by calculating the amount of unreacted APEA in the reaction mixture. The calculation has been performed by determining the UV absorption of APEA (via UV-spectrophotometry). Up to 60% tyrosine diazotation was observed.

Conjugation of the aminated MaSp based fibers with polyglutaraldehyde (PGA) has been performed as follows:

Preparation of polyglutaraldehyde (average M.W. of between 500 and 2000, or of about 1000 Da):

20 ml of glutaraldehyde aquatic solution 25% was added to $K2CO3$ 1M aquatic solution and heated to 50° C. for 2 hours. Then cooled to R.T. (room temperature, between 20 and 25 deg. C.) and pH was set to 7 using HCl 37%. Then it was centrifuged at 7000 rpm for 10 min and the soup was diluted with acetone to 10 times of its volume. The $K2CO_3$ powder was filtered out and acetone was allowed to vaporize. The aquatic PGA solution was lyophilized and kept at −20° C.

Aminated MaSp based fibers have been added to 1-10 ml of polyglutaraldehyde (PGA) solution [at a concentration of 0.01-2 M] in an aqueous buffer. Then, the resulting suspension was cooled to R.T. and the pH was neutralized using HCl (37%). The reaction was kept at 1-10° C. overnight under stirring to result the desired product: SVX-PGA.

The inventors successfully synthesized an aminated MaSp-based fiber bound to PGA, wherein PGA is further bound to a metal oxide chelating group (salicylic acid), as represented by Formula 4.

Conjugation of the Metal Oxide Chelating Group (Salicylic Acid, SA) to the Polyglutaraldehyde (PGA)

The inventors successfully synthesized PGA-derivatized MaSp-based fiber modified with the metal oxide chelating agent (succinic acid), as represented by Formula 4.

The modified MaSp-based fiber of Formula 4 (SVX-PGA-SA) has been synthesized by reacting SVX-PGA (prepared according to the procedure of Example 1) with 4-amino salicylic acid as follows:

300 mg of SVX-PGA in water dispersion at pH of 10.5 were mixed with 150 mg (excess) of 4-amino salicylic acid for 1-10 hours at 20-40 degrees C. The color of the reaction mixture changed to orange. Then the reaction mixture has been centrifuged, and the solid SVX-PGA-SA was washed several times to remove any unreacted amino salicylic acid.

Complexation of Titania Particles by PGA-SA Modified MaSp-Based Fibers

Titania particles (particle sized of between 300 and 500 nm) have been complexed by SVX-PGA-SA to result in a composite $TiO_2$— SVX-PGA-SA as follows:

200 mg of SVX-PGA-SA in water dispersion at pH of 3.5 were mixed with 200 mg Titanium Oxide for 10 hours at 40 degrees C. The color of the reaction mixture changed to deep red. Then the reaction mixture has been centrifuged, and the solid $TiO_2$— SVX-PGA-SA was washed several times to remove any unreacted materials.

Figure 24A:
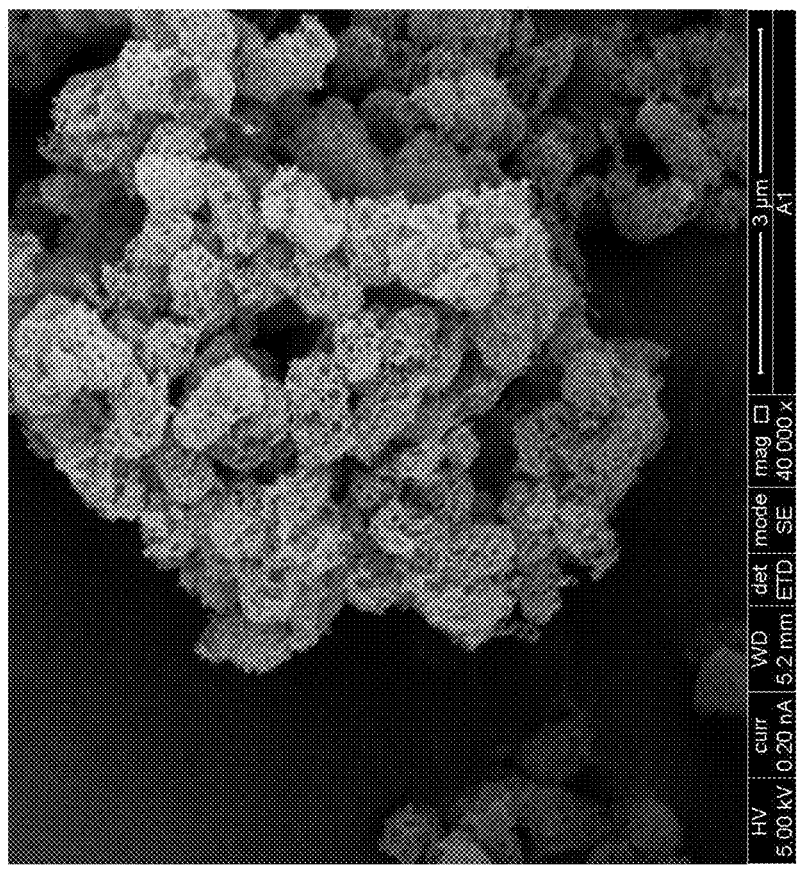
FIGS. 24A-B are SEM images of porous MaSp-based fibers conjugated with polyacrylate (FIG. 24A) or with polyglutaraldehyde (FIG. 24B).
Figure 24B:
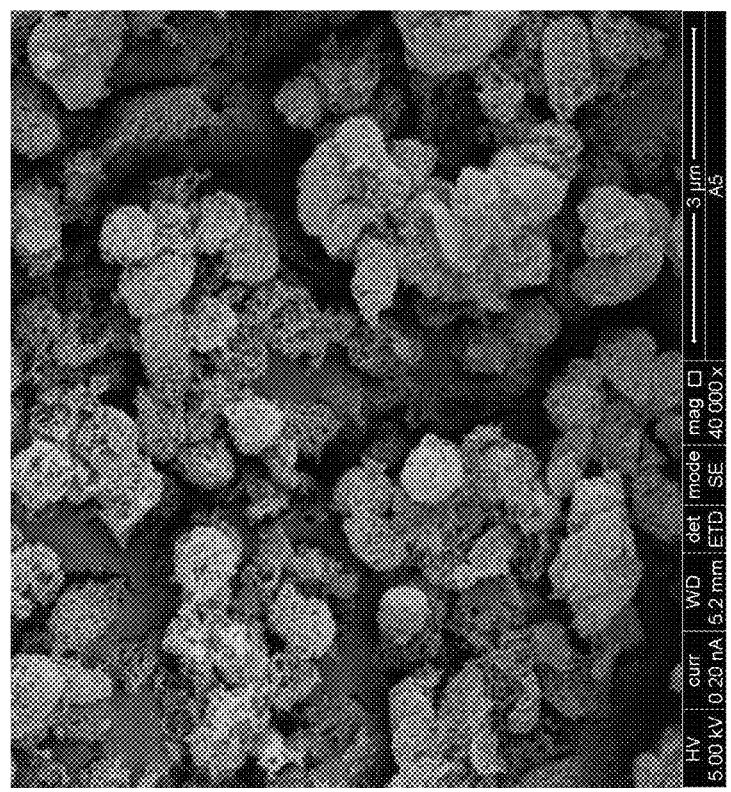

SEM images of the derivatized MaSp-based fibers are represented in FIGS. 24A and 24B, representing outstanding porosity (e.g. defined by a BET surface area of at least 10 m2/g) of the derivatized MaSp-based fibers.

Figure 23:
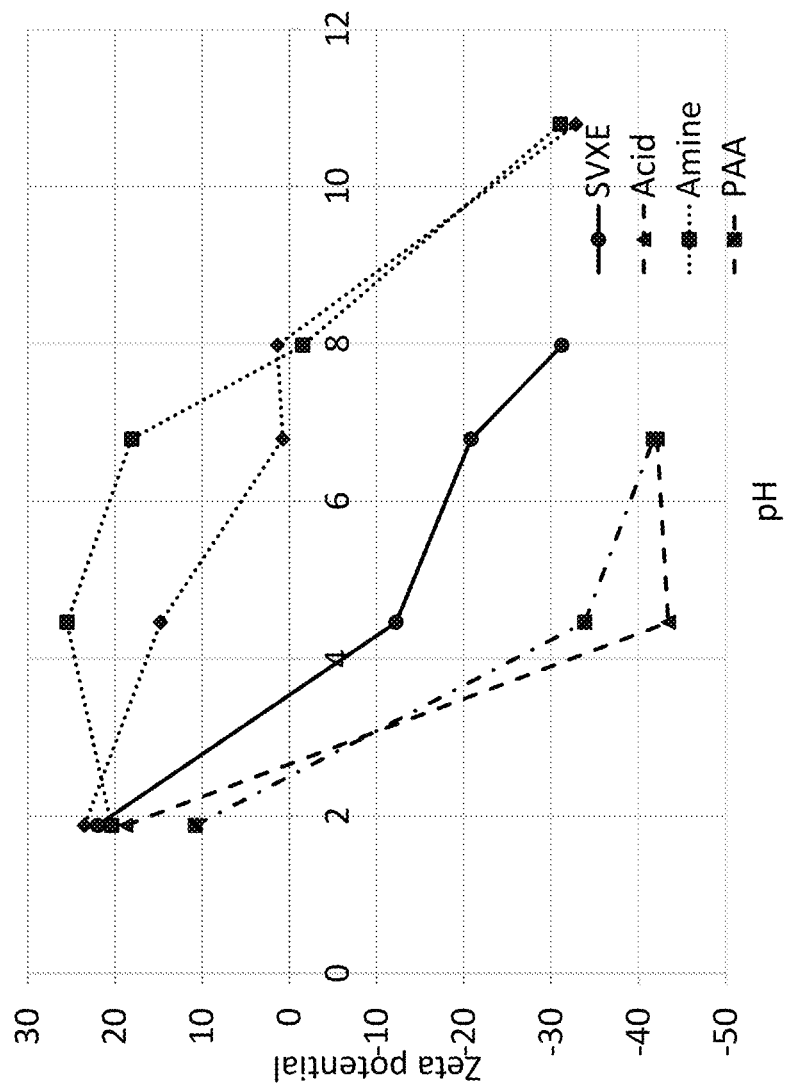
FIG. 23 is a graph representing and zeta potential of an aminated MaSp based fiber (Amine), carboxylated MaSp based fiber (Acid), PAA modified aminated MaSp based fiber (PAA), PEI modified carboxylated MaSp based fiber (PEI), and pristine MaSp based fiber (SVXE).

Exemplary graphs representing zeta potential of the derivatized fibers are shown in FIG. 23. As represented by FIG. 23, zeta potential of the derivatized fibers of the invention is modified, as compared to the pristine fiber. Furthermore, FIG. 23 shows that the zeta potential is predetermined by the chemical modification (functional moiety) of the derivatized fibers.

Example 2

Hair Coloring Compositions

Inventors successfully implemented various derivatized porous MaSp-based fibers in hair coloring compositions (such as the hair coloring compositions described herein). Some of these hair coloring compositions resulted in a uniform and stable hair coating, upon contacting the hair coloring composition with hair (e.g. human hair). Exemplary hair coloring composition which have been successfully implemented for hair coating include aminated MaSp-based fiber (e.g. chemically modified by 4-(2-aminoethyl) aniline (APEA); 3-amonipropyltriethoxysilane (APTES), or by PEI). Additionally, several dyes (cationic and anionic dyes) have been implemented into hair coating, resulting in a colored hair. The colored hair formed upon application of the hair coloring composition described herein, retained its color even upon extensive washings.

Furthermore, the inventors utilized various MaSp-based fibers for the hair coloring compositions. A stable hair coating has been obtained by using aminated MaSp-based protein and aminated mutant MaSp-based protein.

Figure 25A:
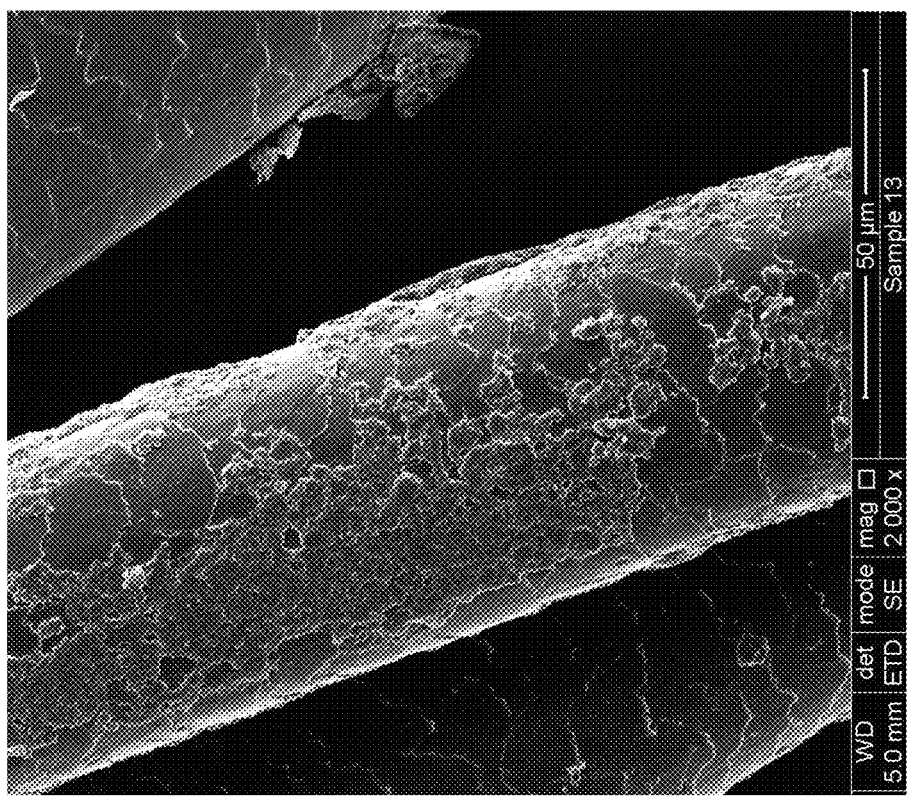
FIGS. 25A-B are SEM images of PEI modified porous MaSp-based fibers applied to a human hair under acidic conditions, pH=3.5, (FIG. 25A) and at basic conditions, pH=10.5 (FIG. 25B).
Figure 25B:
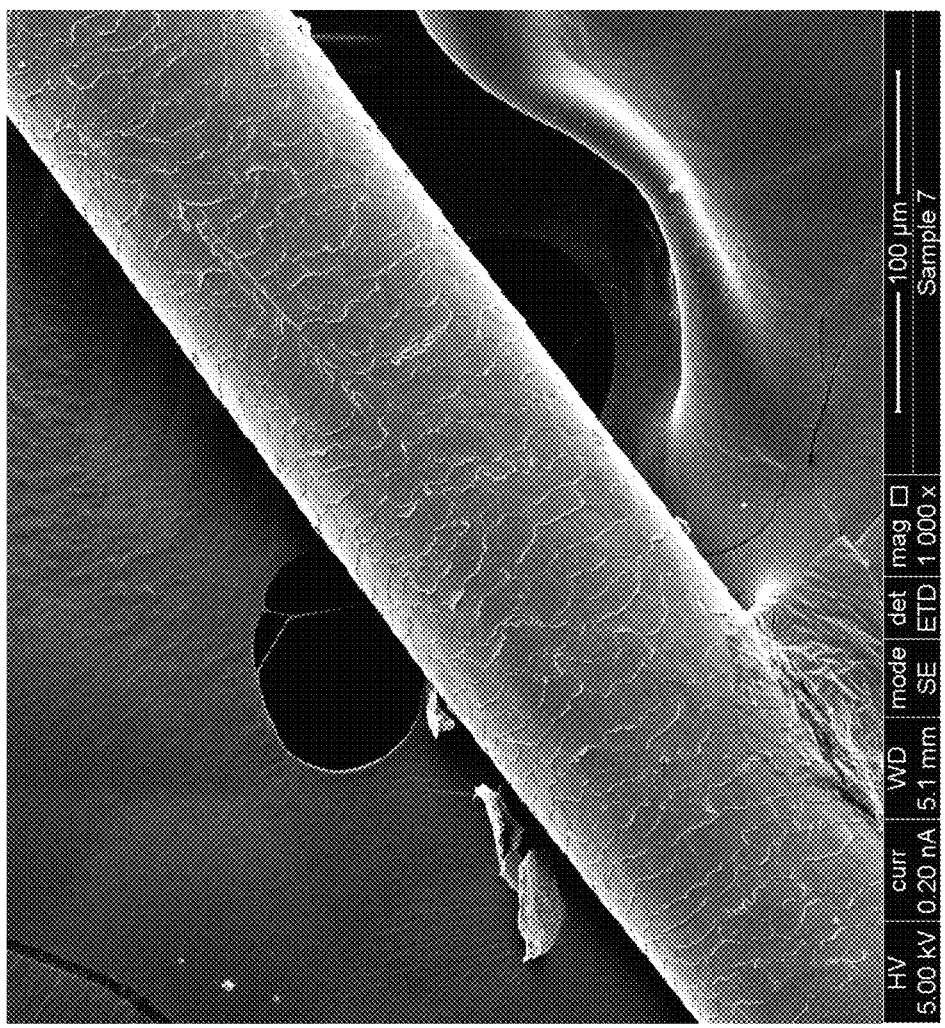

Furthermore, as represented in FIG. 25, applying of the hair coating composition to a human hair under acid conditions (pH below the pKa of the amine, e.g. pH of less than 8, less than 7, less than 6, less than 5, less than 4) resulted in a sufficient coating layer. In contrast, by applying the same hair coating composition to a human hair under basic conditions (e.g. at a pH of above 10), the fibers didn't attach to the human hair, thus no coating layer was obtained (FIG. 25B).

Figure 26A:
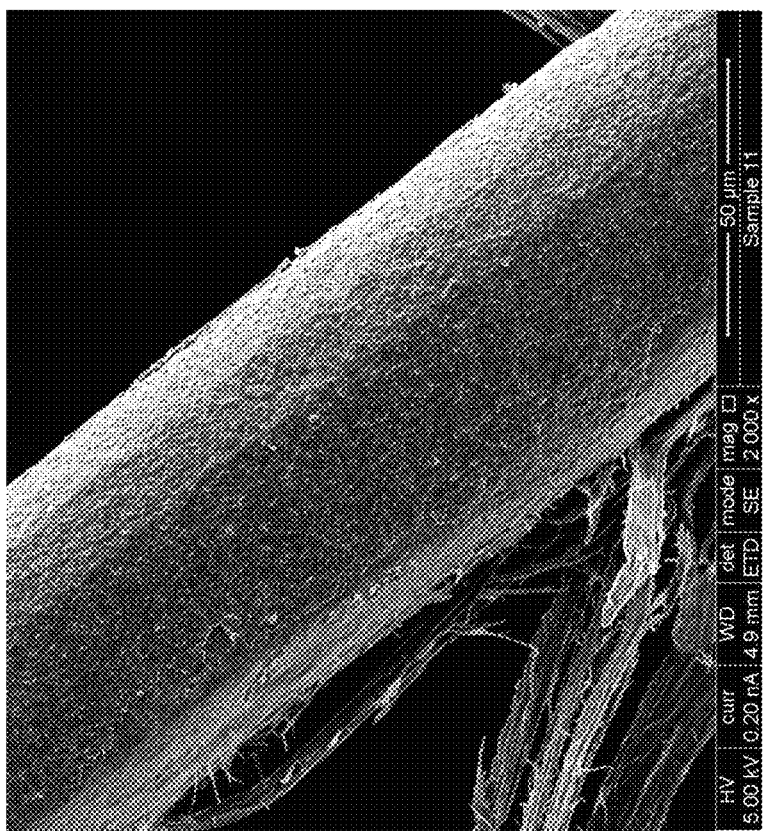
FIGS. 26A-B are SEM images (different magnification) of aminated (via 4-(2-aminoethyl)aniline (APEA) MaSp based fibers applied to a human hair under acidic conditions, pH=3.5.
Figure 26B:
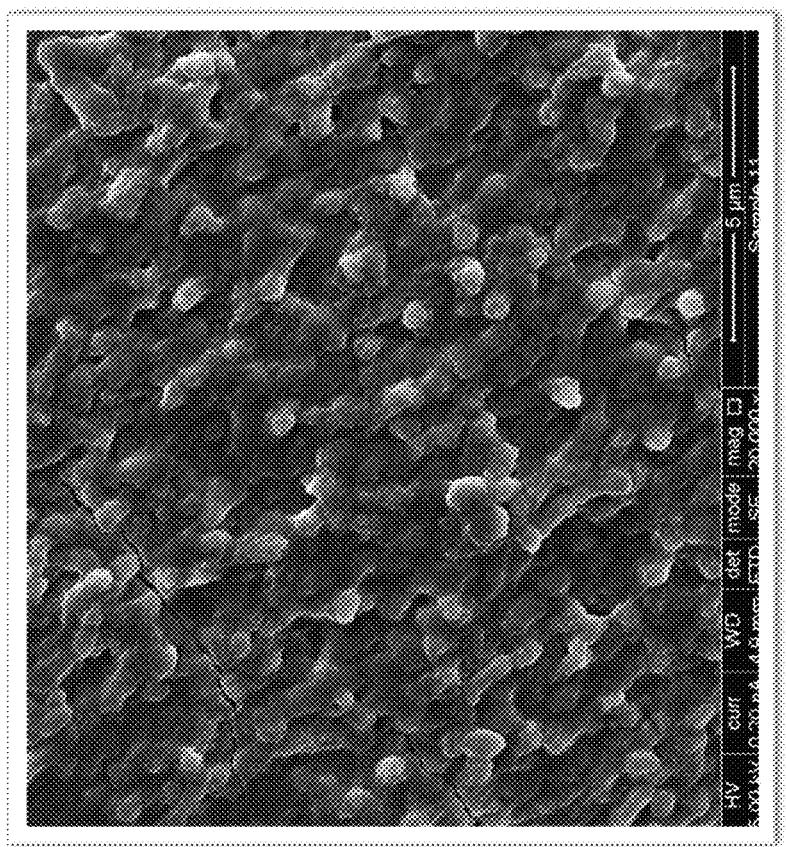
Figure 27A:
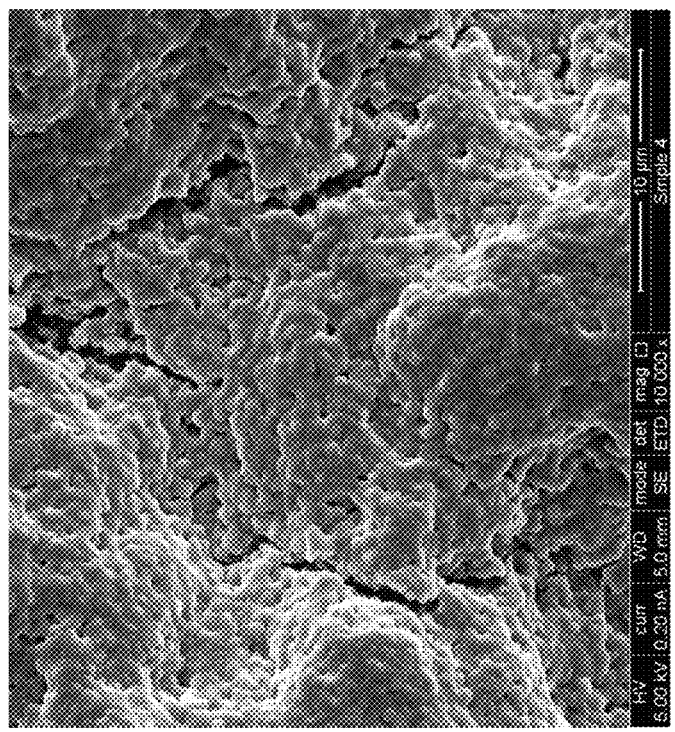
FIGS. 27A-B are SEM images (different magnification) of aminated (via 3-amonipropyltriethoxysilane (APTES)) MaSp based fibers applied to a human hair under acidic conditions, pH=3.5.
Figure 27B:
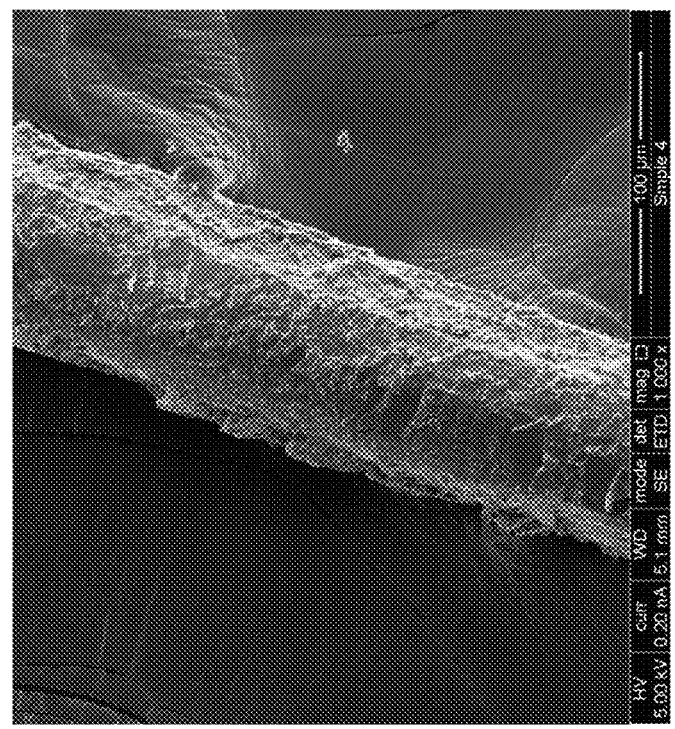

The inventors successfully implemented various derivatized fibers of the invention (e.g. comprising cationic functional moieties) in the hair coating compositions, such as PEI-modified, amino-modified (via APEA), and aminosilane-modified (via APTES), derivatized MaSp-based fibers. The derivatized fibers have been applied at acidic pH, thereby obtaining a stable coating layer on top of human's hair, as exemplified by FIGS. 25-27.

Example 3

Sunscreen Compositions

A composite of the invention comprising titanium oxide particles having a particle size of above 300 nm (synthesized as described in Example 1) exhibited a significantly improved dispersibility in an aqueous solution and/or organic solution, compared to pristine titania particles. An aqueous dispersion comprising titanium dioxide nanoparticles bound (complexed) via salicylate bound to PGA-derivatized MaSp-based fiber (e.g. as represented by Formula 4) exhibited superior sunscreen effect, compared to pristine titanium dioxide nanoparticles. Furthermore, a composite comprising titanium dioxide particles bound to salicylate-derivatized MaSp-based fibers demonstrated superior dispersibility (e.g. capable of forming a stable dispersion), wherein a w/w ratio of the titanium oxide particles to the derivatized MaSp-based fibers is about 1:1.

The abovementioned composites have been utilized for reducing UV-exposure (e.g. to the human skin).

Example 4

Loading and Release of Hyaluronic Acid

Spider silk fibers (SVX) or spider silk fibers expressed in bacteria (SVX-E) washed twice with ethanol and then with water (as described hereinabove). 10 mg of hyaluronic acid (HA) were added to 10 mg of SVX dispersed in 1-20 mL water. pH was adjusted with HCl or Phosphate Buffer and water added so as to reach the desired volume. The mixture was shaken and centrifuged. The supernatant was discarded, and a small sample of pellet was dried on glass slide, resulting in HA+SVX-E or HA+SVX pellets. The pellets have been subsequently tested by FTIR (Nicolet iS5 FTIR Spectrometer, Thermo Fisher Scientific). The remaining pellet was resuspended in water, and the suspension was shaken for 1-30 mins at 200 rpm at 25° C. For each pellet sample analyzed by FTIR, the fraction of HA out of the total dry weight was calculated by dividing the intensity of a peak unique to HA by the intensity of a peak unique to the polymers (Table 1). These results confirm the capability of MaSp-based fibers (e.g. SVX or SVX-E) to stably encapsulate an additional compound (e.g. HA), wherein the w/w ratio of the encapsulated compound to the fiber (e.g. SVX or SVX-E) is about 1:1.

TABLE 1

| Pellet | HA peak (FTIR) | Polymer peak (FTIR) |
| --- | --- | --- |
| HA + SVX or HA + SVX-E | 1040 cm$^{-1}$ | 1640 cm$^{-1}$ |
| HA + silk | 1040 cm$^{-1}$ | 1550 cm$^{-1}$ |

Figure 20:
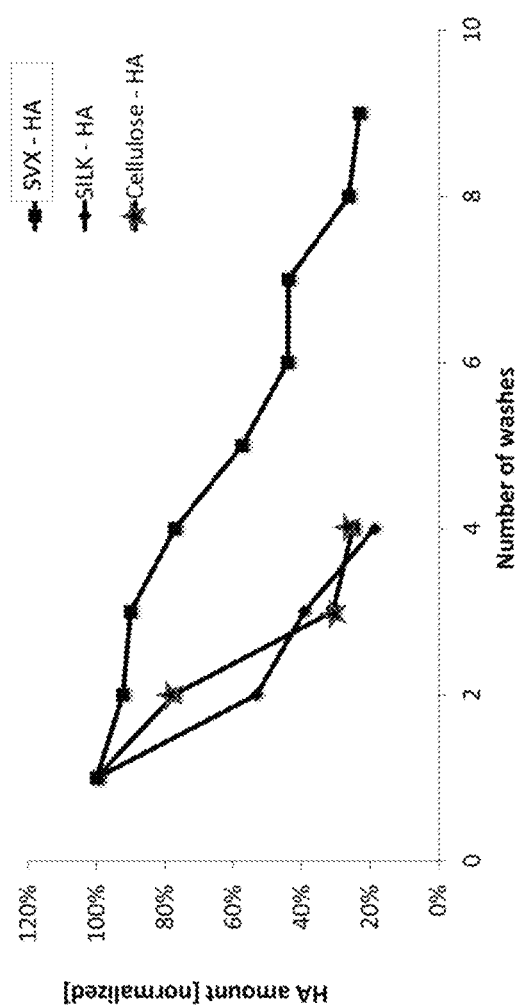
FIG. 20 is a graph representing the release of hyaluronic acid (HA) from SVX-E fiber, compared to Cellulose, and Silk. The graph shows the calculated ratio between HA specific peak and SVX-E/silk/cellulose specific peak (Y axis) vs. the wash number (X axis).

The release profile of HA from SVX, SVX-E, silk and cellulose is demonstrated in FIG. 20. FIG. 20 exhibits a sustained release of HA from SVX, SVX-E compared to a fast release from silk and cellulose fibers.

Example 5

Loading and Release of Retinyl Acetate and Glycerol from SVX-E Fibers

Figure 22A:
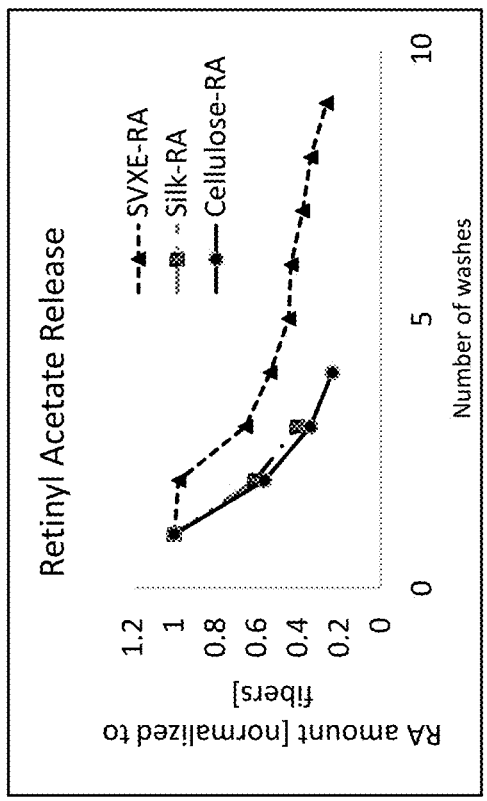
FIGS. 22A-B are graphs representing the release of retinyl acetate (RA) and glycerol from SVX-E fiber compared to a control.
Figure 22B:
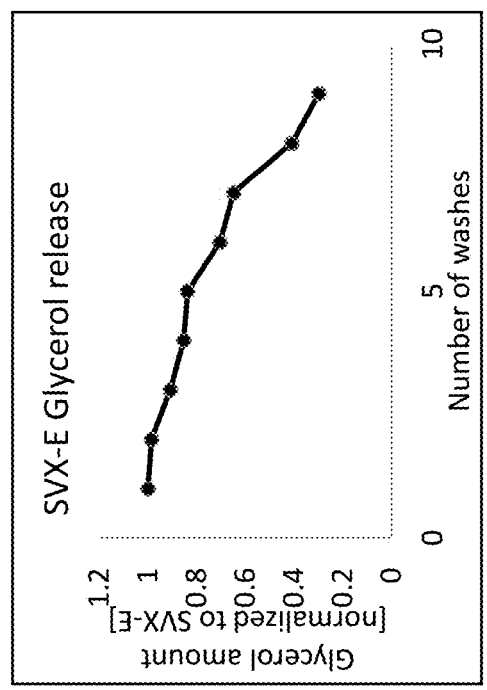

Spider silk fibers expressed in bacteria (SVX-E) were pretreated, as described hereinabove. Subsequently, pretreated SVX-E was combined either with retinyl acetate or with glycerol, so as to form pellets according to the procedure described in Example 1. The release of active agents (retinyl acetate or glycerol) was estimated by FTIR, according to the procedure described in Example 1. Graphs, showing a release profile of the active agents are represented in FIGS. 22A-B.

Example 6

Loading and Release of Alpha-Hydroxycarboxylic Acids and of HA

In order to evaluate the release of HA and of alpha-hydroxycarboxylic acids (such as glycolic acid, GA and lactic acid, LA) from SVX-E-based formulations, following exemplary liquid compositions have been prepared by the inventors according to a protocol described hereinbelow. The tested compositions and negative controls are summarized in Table 2.

TABLE 2

| Composition | Water (% w/w) | Film forming agent (% w/w) | Acid (% w/w) | SVX-E (% w/w) |
| --- | --- | --- | --- | --- |
| LA + SVX-E | 83 | 5 | 2 | 10 |
| Control 1 | 93 | 5 | 2 | — |
| GA + SVX-E | 70 | 5 | 5 | 10 |
| Control 2 | 80 | 5 | 5 | — |
| HA + SVX-E | 84 | 5 | 1 | 10 |
| Control 3 | 94 | 5 | 1 | — |

The tested compositions and negative controls have been prepared as follows: CONTROL 1: 10 ml of control 1 have been prepared by dissolving 0.5 gr of film former (pullulan) in 9.3 gr water, following by addition of 0.2 gr of Lactic acid.

CONTROL 2: 10 ml of control 2 have been prepared by dissolving 0.5 gr of film former (pullulan) in 8.0 gr water, following by addition of 1.5 gr of glycolic acid solution (33%). CONTROL 3: 10 ml of control 3 have been prepared by dissolving 0.5 gr of film former (pullulan) in 9.5 gr of HA solution (1%). LA+SVX-E sample has been prepared by mixing 0.5 g film former (pullulan), 1.0 gr SVX-E, 0.2 gr LA and 8.3 gr water. GA+SVX-E sample has been prepared by mixing 0.5 gr film former (pullulan), 1.0 gr SVX-E, 1.5 gr GA solution (33%) and 7.0 gr water. HA+SVX-E sample has been prepared by mixing 0.5 g film former (pullulan), 1.0 gr SVX-E and 8.5 gr of HA solution (1%).

Figure 21A:
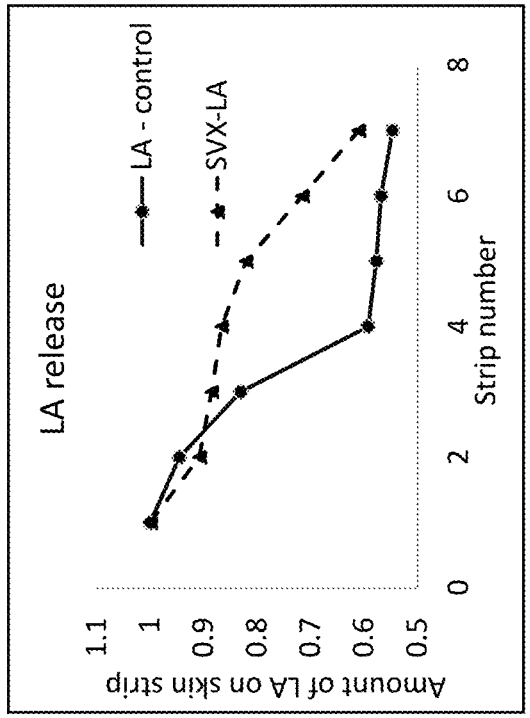
FIGS. 21A-C are graphs representing the release of acids from SVX-E fiber compared to a control, as determined by tape strip test.
Figure 21B:
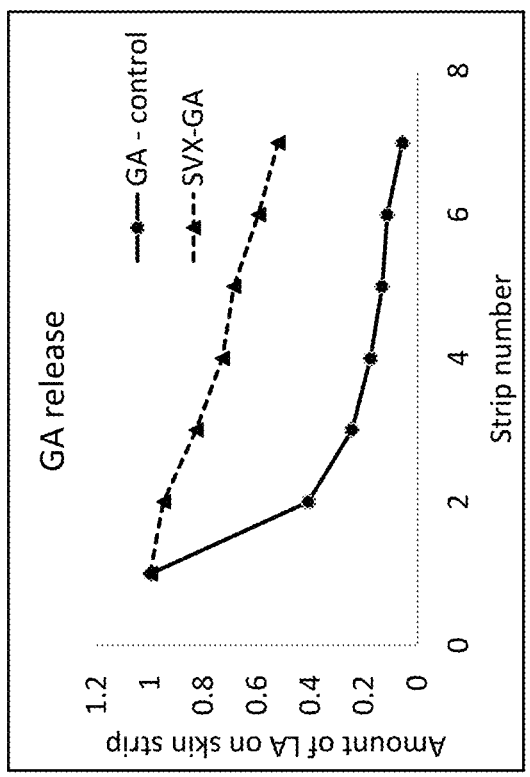
Figure 21C:
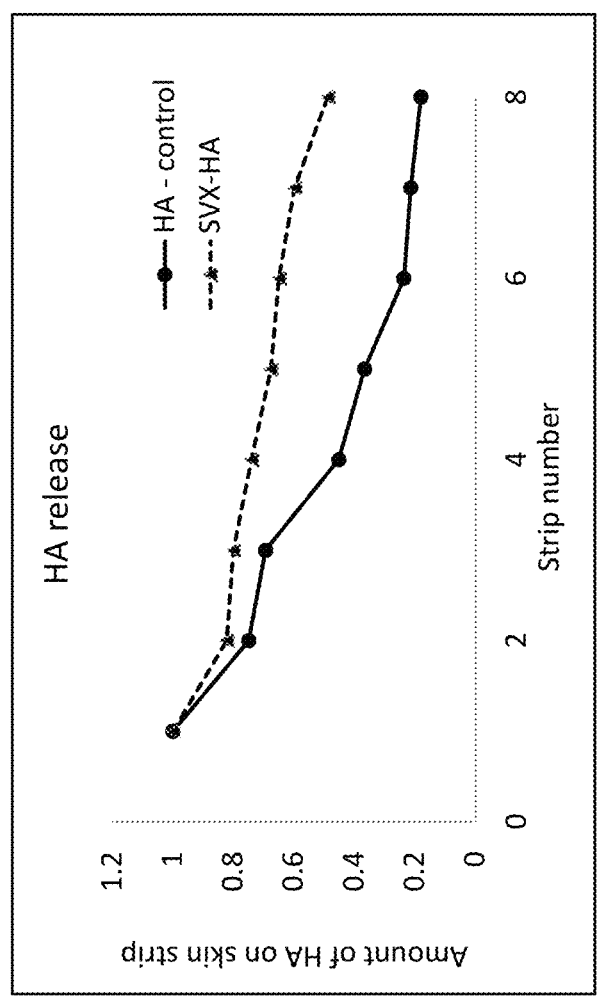

As shown in FIG. 21, the release rate of cosmetic active ingredients (such as LA, GA and HA) was slower for the SVX-E fibers-based liquid compositions compared to control. As exemplified herein, SVX-E fibers-based liquid compositions enable a prolonged residence time of various cosmetic ingredients on the skin surface. In some embodiments, the release rate of the compounds is predetermined by the size and molecular weight of each compound (i.e. cosmetic ingredient).

Furthermore, it was found that SVX-E fibers-based liquid compositions having a concentration of the film forming agent greater than 10% w/w were too viscous and had non-homogenous texture, thus being non-suitable for cosmetic application. Additionally, SVX-E fibers-based liquid compositions having a concentration of the film forming agent of less than 1% w/w were characterized by insufficient viscosity, thus being non-suitable for cosmetic application. In some embodiments, the liquid composition comprising between 1 and 15% w/w of the film forming agent are characterized by a viscosity appropriate for cosmetic application. In some embodiments, the liquid composition comprising between 1 and 15% w/w of the film forming agent is capable of film formation. In some embodiments, the film forming agent being at a concentration between 1 and 15% w/w within the liquid composition provides a sufficient pliability thereto. A cosmetic composition having a sufficient pliability can be applied (e.g. by spreading) on the skin of a subject.

According to the data obtained by inventors, 10% of SVX-E fibers from the total weight of the liquid composition were required so as to obtain a significant reduction of wrinkle depth and for providing a significant skin relief. Additionally, it was found that the liquid composition enriched by 1 to 20% (preferably 10%) w/w of SVX-E fibers loaded with a cosmetic ingredient (e.g. GA, LA, and/or HA), is suitable for supplementing a skin of the subject with the cosmetic ingredient. In some embodiments, the amount of the cosmetic ingredient is sufficient, so as to induce a significant cosmeceutical effect (such as described in Methods section).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A cosmeceutical composition comprising a cosmeceutical effective amount of a composite, wherein the composite comprises a derivatized porous major ampullate spidroin protein (MaSp)-based fiber bound to a metal oxide particle, wherein:
   said metal oxide particle is characterized by a particle size between 10 and 900 nm;
   said derivatized porous MaSp-based fiber is insoluble in an aqueous solution;
   said derivatized porous MaSp-based fiber is in a form of particles having an average particle size between 0.5 μm and 1.5 μm and is characterized by a BET surface area of at least 10 m²/g;
   said derivatized porous MaSp-based fiber comprises a functional moiety covalently bound to a tyrosine of the derivatized porous MaSp-based fiber via a diazo bond;
   said functional moiety comprises a polymer bound to a plurality of metal oxide chelating groups;
   said metal oxide particle is bound to the derivatized porous MaSp-based fiber via said metal oxide chelating groups.

2. The cosmeceutical composition of claim 1, further comprising a cosmetically acceptable carrier; wherein said metal oxide particle is characterized by a particle size between 100 and 500 nm; and wherein said metal oxide particle is a titania particle.

3. The cosmeceutical composition of claim 1, characterized as a sunscreen composition.

4. The cosmeceutical composition of claim 1, wherein said cosmeceutical effective amount is between 10% w/w and 50% w/w of the composite within the composition.

5. The cosmeceutical composition of claim 1, wherein a w/w ratio of said derivatized porous MaSp-based fiber to said metal oxide particle within said composition is between 0.01:1 and 2:1.

6. The cosmeceutical composition of claim 1, wherein said polymer comprises polyglutaraldehyde (PGA), and wherein a w/w ratio of said polymer to said derivatized porous MaSp-based fiber is between 0.001 and 5.

* * * * *